US012652424B2

(12) United States Patent
Park et al.

(10) Patent No.: US 12,652,424 B2
(45) Date of Patent: Jun. 9, 2026

(54) MEDIA DATA PROCESSING METHOD AND MEDIA DATA PROCESSING APPARATUS

(71) Applicant: LG ELECTRONICS INC., Seoul (KR)

(72) Inventors: Jonghwan Park, Seoul (KR); Joonhee Yoon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/851,932

(22) PCT Filed: Apr. 3, 2023

(86) PCT No.: PCT/KR2023/004463
§ 371 (c)(1),
(2) Date: Sep. 27, 2024

(87) PCT Pub. No.: WO2023/191601
PCT Pub. Date: Oct. 5, 2023

(65) Prior Publication Data
US 2025/0220254 A1      Jul. 3, 2025

(30) Foreign Application Priority Data

Apr. 1, 2022     (KR) ........................ 10-2022-0041216
Apr. 6, 2022     (KR) ........................ 10-2022-0043004

(51) Int. Cl.
*H04N 21/2362*          (2011.01)
*H04N 21/462*          (2011.01)
(52) U.S. Cl.
CPC ..... *H04N 21/2362* (2013.01); *H04N 21/4622* (2013.01)

(58) Field of Classification Search
CPC ........... H04N 21/2362; H04N 21/4622; H04N 21/4345; H04N 21/482; H04N 21/25841; H04H 60/46; H04H 60/65; H04H 60/39; H04H 60/82
See application file for complete search history.

(56) References Cited

U.S. PATENT DOCUMENTS

2008/0002674 A1*     1/2008   Lubbers .............. H04L 61/4511
                                                           370/352

FOREIGN PATENT DOCUMENTS

KR       10-2018-0019068 A       2/2018
KR       10-2018-0039626 A       4/2018
KR       10-2019-0107741 A       9/2019
KR       10-2020-0098537 A       8/2020
WO          2022045656 A1       3/2022

OTHER PUBLICATIONS

ETSI TS 103 770 V1.1.1 (Published on Nov. 2020)—Digital Video Broadcasting (DVB); Service Discovery and Programme Metadata for DVB-I (Year: 2020).*

* cited by examiner

*Primary Examiner* — Nasim N Nirjhar
(74) *Attorney, Agent, or Firm* — Bryan Cave Leighton Paisner LLP

(57)          ABSTRACT
A media data processing method according to embodiments may comprise the steps of: generating media data; generating a service list related to the media data; and transmitting the media data and the service list on the basis of a network. The media data processing method according to embodiments may comprise the steps of: receiving a service list related to media data on the basis of a network; and processing the media data on the basis of the service list.

5 Claims, 66 Drawing Sheets

FIG. 5a

```
[DVBiServiceListType]

<element name="ServiceList" type="dvbisd:DVBiServiceListType"/>
<complexType name="DVBiServiceListType">
    <sequence>
        <element name="Name" type="mpeg7:TextualType" maxOccurs="unbounded"/>
        <element name="ProviderName" type=" mpeg7:TextualType " maxOccurs="unbounded"/>
        <element name="RelatedMaterial" type="tva:RelatedMaterialType" minOccurs="0" maxOccurs="unbounded"/>
        <element name="RegionList" type="dvbisd:RegionListType" minOccurs="0"/>
        <element name="TargetRegion" type="dvbisd:RegionIdRefType" minOccurs="0" maxOccurs="unbounded"/>
        <element name="LCNTableList" type="dvbisd:LCNTableListType" minOccurs="0"/>
        <element name="Service" type="dvbisd:DVBiServiceType" minOccurs="0" maxOccurs="unbounded"/>
        <any namespace="##other" processContents="lax" minOccurs="0" maxOccurs="unbounded"/>
    </sequence>
    <attribute name="version" type="positiveInteger" use="required"/>
</complexType>
```

FIG. 5b

| Name | Semantic Definition | Constraints |
|---|---|---|
| ServiceList | A list of the details and locations of IP services offered by the service provider. A service provider can divide their services into multiple service lists for administrative convenience. | Mandatory |
| Name | The name of this service list in a human readable form. Multiple service list names can be specified as long as they have different xml:lang values. | Mandatory 1..∞ |
| ProviderName | The name of the provider of this service list in a human readable form. Multiple values for the provider name can be specified as long as they have different xml:lang values. | Mandatory 1..∞ |
| RelatedMaterial | Additional material related to the service. Use to signal the following · Service list logos, see clause 5.2.5.1 | Optional 0..∞ |
| RegionList | A list of geographic regions with logical identifiers that are used to provide regionalization of the service list or services in the service list. | Optional |
| TargetRegion | The identifiers of those regions specified in the RegionList for which this service list is targeted. | Optional 0..∞ |
| LCNTableList | The list of tables that define regionalized and packaged logical channel numbers for the services in this service list. | Optional |
| Service | The services that are part of this service list. | Optional 0..∞ |
| @version | The version number of the service list. Must be incremented for every published change. | Mandatory |

FIG. 6a

```
[DVBiServiceType]

<complexType name="DVBiServiceType">
    <sequence>
        <element name="UniqueIdentifier" type="dvbisd:ServiceIdentifierType"/>
        <element name="ServiceInstance" type="dvbisd:ServiceInstanceType" minOccurs="0" maxOccurs="unbounded"/>
        <element name="TargetRegion" type="dvbisd:RegionIdRefType" minOccurs="0" maxOccurs="unbounded"/>
        <element name="ServiceName" type="mpeg7:TextualType" maxOccurs="unbounded"/>
        <element name="ProviderName" type="mpeg7:TextualType" maxOccurs="unbounded"/>
        <element name="RelatedMaterial" type="tva:RelatedMaterialType" minOccurs="0" maxOccurs="unbounded"/>
        <element name="ServiceGenre" type="dvbisd-base:Genre" minOccurs="0"/>
        <element name="ServiceType" type="dvbisd-base:ServiceType" minOccurs="0"/>
        <element name="RecordingInfo" type="tva:ControlledTermType" minOccurs="0"/>
        <element name="GuideSource" type="dvbisd-base:BCGOffering" minOccurs="0"/>
    </sequence>
    <attribute name="version" type="positiveInteger" use="required"/>
</complexType>
```

FIG. 6b

| Name | Semantic Definition | Constraints |
|---|---|---|
| ServiceList | A list of the details and locations of IP services offered by the service provider. A service provider can divide their services into multiple service lists for administrative convenience. | Mandatory |
| Name | The name of this service list in a human readable form. Multiple service list names can be specified as long as they have different xml:lang values. | Mandatory 1..∞ |
| ProviderName | The name of the provider of this service list in a human readable form. Multiple values for the provider name can be specified as long as they have different xml:lang values. | Mandatory 1..∞ |
| RelatedMaterial | Additional material related to the service. Use to signal the following · Service list logos, see clause 5.2.5.1 | Optional 0..∞ |
| RegionList | A list of geographic regions with logical identifiers that are used to provide regionalization of the service list or services in the service list. | Optional |
| TargetRegion | The identifiers of those regions specified in the RegionList for which this service list is targeted. | Optional 0..∞ |
| LCNTableList | The list of tables that define regionalized and packaged logical channel numbers for the services in this service list. | Optional |
| Service | The services that are part of this service list. | Optional 0..∞ |
| @version | The version number of the service list. Must be incremented for every published change. | Mandatory |

FIG. 7a

```
[ServiceInstanceType]

<complexType name="ServiceInstanceType">
    <sequence>
        <element name="DisplayName" type="mpeg7:TextualType" minOccurs="0" maxOccurs="unbounded"/>
        <element name="RelatedMaterial" type="tva:RelatedMaterialType" minOccurs="0" maxOccurs="unbounded"/>
        <element name="DRMSystemId" type="string" minOccurs="0"    maxOccurs="unbounded"/>
        <element name="ContentAttributes" type="dvbisd-base:ContentAttributesType" minOccurs="0"/>
        <element name="Availability" type="dvbisd-base:ServiceAvailabilityType" minOccurs="0"/>
        <element name="SubscriptionPackage" type="string" minOccurs="0" maxOccurs="unbounded"/>
        <element name="FTAContentManagement" type="dvbisd:FTAContentManagementType" minOccurs="0"/>
        <element name="SourceType" type="anyURI"/>
        <choice minOccurs="0" maxOccurs="unbounded">
            <element name="DVBTDeliveryParameters" type="dvbisd:DVBTDeliveryParametersType"/>
            <sequence>
                <element name="DVBSDeliveryParameters" type="dvbisd:DVBSDeliveryParametersType"/>
                <element name="SATIPDeliveryParameters" type="dvbisd:SATIPDeliveryParametersType" minOccurs="0"/>
            </sequence>
            <element name="DVBCDeliveryParameters" type="dvbisd:DVBCDeliveryParametersType"/>
            <element name="RTSPDeliveryParameters" type="dvbisd:RTSPDeliveryParametersType"/>
            <element name="MulticastTSDeliveryParameters" type="dvbisd:MulticastTSDeliveryParametersType"/>
            <sequence>
                <element name="DASHDeliveryParameters" type="dvbisd:DASHDeliveryParametersType"/>
                <element name="MulticastTSDeliveryParameters" type="dvbisd:MulticastTSDeliveryParametersType"
                    minOccurs="0"/>
            </sequence>
            <any namespace="##other" processContents="lax"/>
        </choice>
    </sequence>
    <attribute name="priority" type="integer" default="0"/>
</complexType>
```

FIG. 7b

| Name | Semantic Definition | Constraints |
|------|---------------------|-------------|
| DisplayName | Human-readable name of the service associated to this specific Service Location. Multiple service names may be provided as long as they all have different xml:lang attributes. When not present, ServiceName is used. | Optional<br>0..∞ |
| RelatedMaterial | Additional material related to the service. Use to signal the following<br>• Out of service banners, see clause 5.2.4.3<br>• Service related applications, see clause 5.2.3<br>• Service logos, see clause 5.2.5.2<br>Any related material with a particular value of HowRelated that is provided within a ServiceInstance element supersedes any corresponding related material with that value of HowRelated that is provided within a Service element. | Optional<br>0..∞ |
| DRMSystemId | Denotes any content protection schemes being used for this service. The value shall be the same as the @schemeIdURI defined in clause 8.4 of DVB A168 [10] | Optional<br>0..∞ |
| ContentAttributes | Refer to Annex D.1.3.2 of ETSI TS 103 205 [2] for semantic definition. | Optional<br>0..1 |
| Availability | Indicates the period(s) in time when this service location is expected to be active. | Optional<br>0..1 |
| SubscriptionPackage | Identifies the subscription packages in which this service is included. | Optional<br>0..∞ |
| FTAContentManagement | DVB-I service instances not using DRM may carry a FTAContentManagement element to define the content management policy for the ServiceInstance. The semantics of each attribute are those defined for the correspondingly named fields of the FTA_content_management_descriptor defined in clause 6.2.18.0 of ETSI EN 300 468 [6]. | Optional<br>0..1 |

FIG. 8

```
[DASHDeliveryParameters]
<complexType name="DASHDeliveryParametersType">
    <sequence>
        <element name="UriBasedLocation" type="dvbisd-base:dvbExtendedURIType" maxOccurs="unbounded"/>
        <element name="MinimumBitRate" type="unsignedInt" minOccurs="0"/>
    </sequence>
</complexType>
```

| Name | Semantic Definition | Constraints |
| --- | --- | --- |
| UriBasedLocation | Refer to Annex D.1.3.2 of ETSI TS 103 205 [2] for semantic definition. | Mandatory 1..∞ |
| MinimumBitRate | Threshold bit-rate under which an alternative source for the same service should be preferred, if available. | Optional |

FIG. 9

```
<1의> <complexType name="DASHDeliveryParametersType">
          <sequence>
            <element name="UriBasedLocation" type="dvbisd-base:dvbExtendedURIType" maxOccurs="unbounded" />
            <element name="MinimumBitRate" type="unsignedInt" minOccurs="0"/>
            <element name="ComparisonBitRate" type="unsignedInt" minOccurs="0"/>
            <element name="ComparisonContentAttributeType " type="dvbisd-base:ContentAttributesType" minOccurs="0"/>
          </sequence>
        </complexType>
        <complexType name=" ComparisonContentAttributeType ">
          <sequence>
            <element name="AudioAttributes" type="tva:AudioAttributesType" minOccurs="0" maxOccurs="unbounded"/>
            <element name="VideoAttributes " type="tva:VudioAttributesType" minOccurs="0" maxOccurs="unbounded"/>
            <element name="CaptionLanguage" type="tva:CaptionLanguageType" minOccurs="0" maxOccurs="unbounded"/>
            <element name="SignLanguage" type="tva:SignLanguageType" minOccurs="0" maxOccurs="unbounded"/>
          </sequence>
        </complexType>

<2의> <complexType name="DASHDeliveryParametersType">
          <sequence>
            <element name="UriBasedLocation" type="dvbisd-base:dvbExtendedURIType" maxOccurs="unbounded" />
            <element name="MinimumBitRate" type="unsignedInt" minOccurs="0"/>
            <element name=" ComparisonContentAttributeType " type="dvbisd-base:ContentAttributesType" minOccurs="0"/>
          </sequence>
        </complexType>
        <complexType name=" ComparisonContentAttributeType ">
          <sequence>
            <element name="AudioAttributes" type="tva:AudioAttributesType" minOccurs="0" maxOccurs="unbounded"/>
            <element name="VideoAttributes " type="tva:VudioAttributesType" minOccurs="0" maxOccurs="unbounded"/>
            <element name="CaptionLanguage" type="tva:CaptionLanguageType" minOccurs="0" maxOccurs="unbounded"/>
            <element name="SignLanguage" type="tva:SignLanguageType" minOccurs="0" maxOccurs="unbounded"/>
            <element name="ComparisonBitRate" type="unsignedInt" minOccurs="0"/>
          </sequence>
        </complexType>
```

FIG. 10

```
<ServiceInstance priority="0">
<DisplayName> ABC drama </DisplayName>
<ContentAttributes>
<dvbisd-base:AudioAttributes>
<tva:Coding href="urn:mpeg:mpeg7:cs:AudioCodingFormatCS:2001:3.2">
<tva:Name>MPEG-1 Audio Layer II</tva:Name>
</tva:Coding>
</dvbisd-base:AudioAttributes>
<dvbisd-base:AudioAttributes>
<tva:Coding href="urn:dvb:metadata:cs:AudioCodecCS:2007:3.1">
<tva:Name>AC3</tva:Name>
</tva:Coding>
</dvbisd-base:AudioAttributes>
<dvbisd-base:VideoAttributes>
<tva:Coding href="urn:mpeg:mpeg7:cs:VideoCodingFormatCS:2001:2.2.2">
<tva:Name>MPEG-2 Video Main Profile @ Main Level</tva:Name>
</tva:Coding>
</dvbisd-base:VideoAttributes>
</ContentAttributes>
<SourceType>urn:dvb:source:dvb-s</SourceType>
<DVBSDeliveryParameters>
<DVBTriplet origNetId="1" tsId="1101" serviceId="28106"/>
<OrbitalPosition>19.2</OrbitalPosition>
<Frequency>11836</Frequency>
<Polarization>horizontal</Polarization>
</DVBSDeliveryParameters>
</ServiceInstance>
```
56000

```
<ServiceInstance priority="1">
<DisplayName> ABC drama </DisplayName>
<SourceType>urn:dvb:source:dvb-dash</SourceType>
<DASHDeliveryParameters>
<UriBasedLocation contentType="application/dash+xml">
<dvbisd-base:URI>https://live.daserste.de/0001 Das%20Erste.mpd</dvbisd-base:URI>
</UriBasedLocation>
<MinimumBitrate> 1M </MinimumBitrate>
<ComparisonBitRate> 7M </ComparisonBitRate>
<ComparisonContentAttribute>
<dvbisd-base:VideoAttributes>
<tva:Coding href="urn:mpeg:mpeg7:cs:VideoCodingFormatCS:2001:2.2.2">
<tva:Name>HEVC Video Main10 Profile @ Main Level</tva:Name> : UHD enable
</tva:Coding>
</dvbisd-base:VideoAttributes>
</ComparisonContentAttribute>
</DASHDeliveryParameters>
</ServiceInstance>
```
56010

FIG. 14

```xml
<?xml version="1.0" encoding="UTF-8"?>
<schema xmlns="http://www.w3.org/2001/XMLSchema" xmlns:dvbisld="urn:dvb:metadata:
servicelistdiscovery:2020" xmlns:mpeg7="urn:tva:mpeg7:2008" xmlns:tva="urn:tva:metadata:2019"
xmlns:dvbisd="urn:dvb:metadata:servicediscovery:2020" targetNamespace="urn:dvb:metadata:
servicelistdiscovery:2020" elementFormDefault="qualified" attributeFormDefault="unqualified">
        <import namespace="urn:tva:metadata:2019" schemaLocation="tva_metadata_3-1.xsd"/>
        <import namespace="urn:tva:mpeg7:2008" schemaLocation="tva_mpeg7.xsd"/>
        <import namespace="urn:dvb:metadata:servicediscovery:2020" schemaLocation=
        "dvbi_v2.0.xsd"/>
        <element name="ServiceListEntryPoints" type="dvbisld:ServiceListEntryPointsType"/>
        <complexType name="ServiceListEntryPointsType">
                <sequence>
                        <element name="ServiceListRegistryEntity" type="dvbisld:
                        OrganizationType"/>
                        <element name="ProviderOffering" type="dvbisld:ProviderOfferingType"
                        minOccurs="0" maxOccurs="unbounded"/>
                        <element name="Extension" type="dvbisd:ExtensionBaseType" minOccurs="0"
                        maxOccurs="unbounded"/>
                </sequence>
        </complexType>
```

FIG. 15

|  | Semantic Definition | Constraints |
|---|---|---|
| OSName | Supportable OS version and name | |
| ServiceCode | Supportable service code within the device | |
| TargetLocation2 | A target location where the device is made, e.g., UK, Nordic | |
| Sourcelocation | A location of a streaming server that provides each service | |
| PublishedDate | Service list publish data | |
| ReleasedDate | Service list release data | |
| Manufacturer | A service list implementation company | |
| ManufacturerURL | URL of the service list implementation company | |
| ServiceDescription | A brief description of the service list. e.g. List indicating text | |
| ServiceReport | A service list issue or consumption report | |

<FirmwareUpgrade>

|  | Semantic Definition | Constraints |
|---|---|---|
| Version | Firmware version number that the platform should support | |
| UpdateLocationURL | URL accessible for firmware update | |

<ServiceAvailability>

|  | Semantic Definition | Constraints |
|---|---|---|
| Version | Current version in which the service list is provided | |
| ServiceAvailability SearchURL | URL for moving to a web page where service search is available such that additional services provided by the service list provider may be added | |
| ServiceAvailability DBUpdateURL | Link URL for service data base update. Schema to support XML update based on IETF RFC 5261 is downloaded, and fetching may be performed through the corresponding information. | |

FIG. 16a

```
<?xml version="1.0" encoding="UTF-8"?>
<!DOCTYPE xml>
<!-- Example of ServiceListEntryPoint published by a DVB-mfr Servicelist Server -->
<ServiceListEntryPoints xmlns="urn:dvb:metadata:servicelistdiscovery:2020" xmlns:xsi=
"http://www.w3.org/2001/XMLSchema-instance"xsi:schemaLocation="urn:dvb:metadata:dvbmfr-
extensions:2020 ../dvbmfr_extensions_v1.0.xsd" xsi:dvbmfr="urn:dvb:metadata:dvbmfr-extensions:
2020"xmlns:dvbisd="urn:dvb:metadata:servicediscovery:2020" xmlns:tva="urn:tva:metadata:2019">
          //DVB-I discovery scheme compatible
          <ServiceListRegistryEntity>
       <Name>DVB-I Manufacturer Server Registry</Name>
   </ServiceListRegistryEntity>
   <ProviderOffering>
     <Provider>
        <Name>DVB-I Manufacturer Server #1</Name>
     </Provider>
     <ServiceListOffering>
        <ServiceListName>LG channels </ServiceListName>
        <ServiceListURI contentType="application/xml">
           <dvbisd:URI>https://www.LgChannels/dvbmfr/UK/servicelist.xml</dvbisd:URI>
        </ServiceListURI>
                        <Language> Eng </Language>
                        <TargetCountry> UK </TargetCountry>
     </ServiceListOffering>
   </ProviderOffering>

<!--Properties for checking whether a list is receivable -->
<Extension xmlns:dvbmfr="urn:dvb:metadata:dvbmfr-extensions:2020" xsi:type="dvbmfrx:
   mfrServiceListEntryPointsType" extensionName="DVB-I mfr">
        <dvbmfr:mfrServiceListRegistryEntity specVersion="1">

//addtional information for mfrs
                    <dvbmfr:OSName> webOS 4.5 </dvbmfr:OSName>
                    <dvbmfr:ServiceCode> 55UM7811C3NA.AKRYLH </dvbmfr:ServiceCode>
                    <dvbmfr:TargetLocation> UK enable </dvbmfr:TargetLocation>
                    <dvbmfr:Sourcelocation> UK WeyBridge </dvbmfr:Sourcelocation>
                    <dvbmfr:PublishedDate> 2020.2 </dvbmfr:PublishedDate>
                    <dvbmfr:ReleasedDate> 2019.11 </dvbmfr:ReleasedDate>
                    <dvbmfr:Manufacturer>LG Electronics</dvbmfr:Manufacturer>
                    <dvbmfr:ManufacturerURL> https://www.lge.com </dvbmfr:
                    ManufacturerURL>
                    <dvbmfr:ServiceDescription> LG channels Dec 2019 version </dvbmfr:
                    ServiceDescription>
```

FIG. 16b

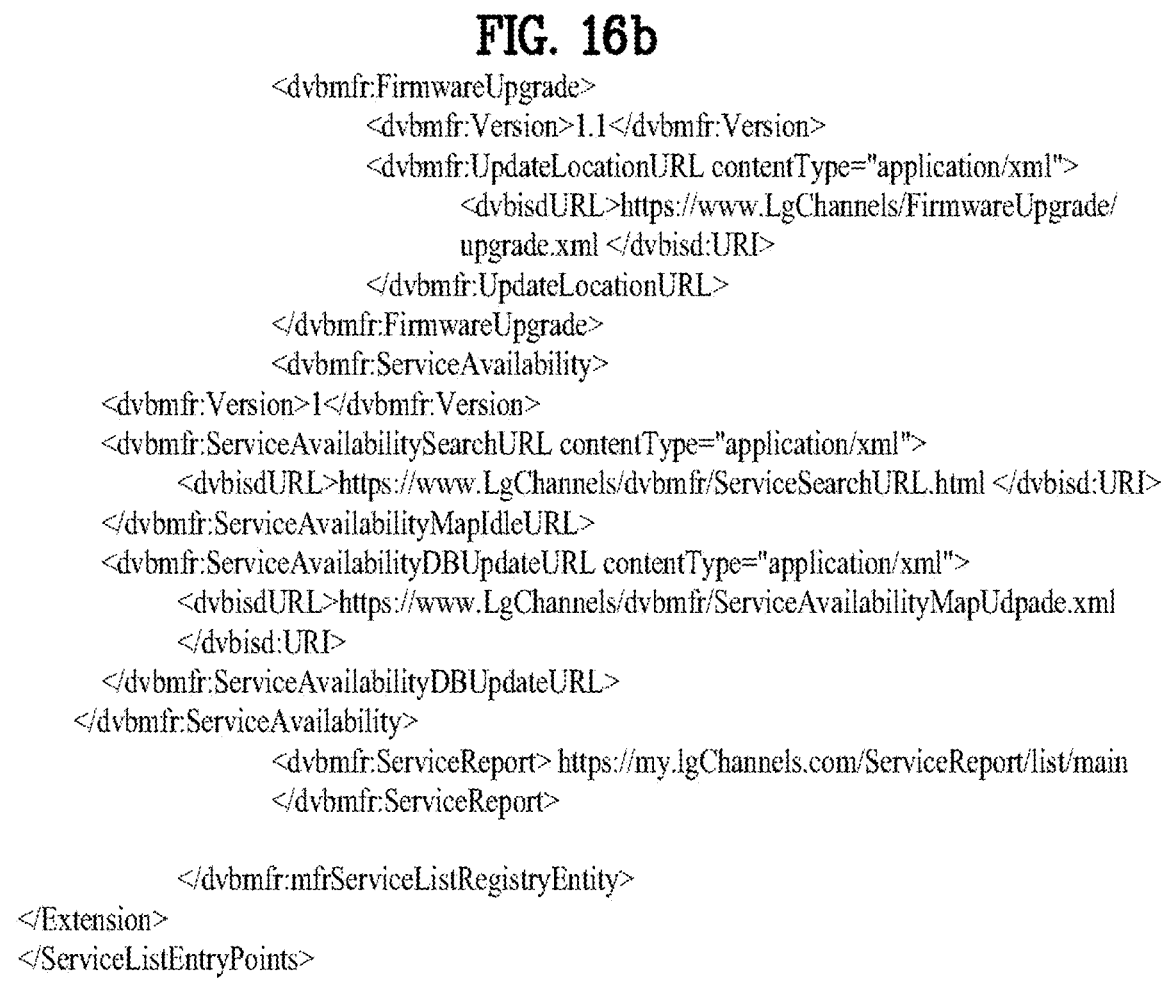

```
<dvbmfr:FirmwareUpgrade>
        <dvbmfr:Version>1.1</dvbmfr:Version>
        <dvbmfr:UpdateLocationURL contentType="application/xml">
                <dvbisdURL>https://www.LgChannels/FirmwareUpgrade/
                upgrade.xml </dvbisd:URI>
        </dvbmfr:UpdateLocationURL>
</dvbmfr:FirmwareUpgrade>
<dvbmfr:ServiceAvailability>
<dvbmfr:Version>1</dvbmfr:Version>
<dvbmfr:ServiceAvailabilitySearchURL contentType="application/xml">
        <dvbisdURL>https://www.LgChannels/dvbmfr/ServiceSearchURL.html </dvbisd:URI>
</dvbmfr:ServiceAvailabilityMapIdleURL>
<dvbmfr:ServiceAvailabilityDBUpdateURL contentType="application/xml">
        <dvbisdURL>https://www.LgChannels/dvbmfr/ServiceAvailabilityMapUdpade.xml
        </dvbisd:URI>
</dvbmfr:ServiceAvailabilityDBUpdateURL>
</dvbmfr:ServiceAvailability>
                <dvbmfr:ServiceReport> https://my.lgChannels.com/ServiceReport/list/main
                </dvbmfr:ServiceReport>

</dvbmfr:mfrServiceListRegistryEntity>
</Extension>
</ServiceListEntryPoints>
```

FIG. 17

⊗

⚙ Setting

Service list selection

Selection service list

AGCOM
Italian Trusted Service

TVformTheWorld
TV service from the world in English
TV aus Deutshland

British DVB-I
Documentaries

SES
Germany FTA

DVB
DVB-I Reference Client service list

Filter

Provider    LG channels

Language    eng

Genre

Country    UK

☐ Regulator list
Multiple values can be separated by comma

Filter

FIG. 18

[Use case 1 occurring when multiple service lists are aggregated]

| Service list | Service ID | LCN | Legacy | Content |
|---|---|---|---|---|
| List Provider name A | Sid = s01 | 13 | 13 | News |
| List Provider name B | Sid = s01 | 13 | 13 | News |
| List Provider name C | Sid = s02 | 14 | 14 | Drama |
| List Provider name D | Sid = s05 | 15 | 15 | TV show |

[Use case 2 occurring when multiple service lists are aggregated]

| Service list | Service ID | LCN | Legacy | Content |
|---|---|---|---|---|
| List Provider name A | Sid = s01 | | 10 | News |
| List Provider name B | Sid = s03 | | | Drama channel |

[Use case 3 occurring when multiple service lists are aggregated]

| Service list | Service ID | LCN | Legacy | Content |
|---|---|---|---|---|
| DVB-T | Sid = s01 | 10 | 10 | Movie |
| List Provider name A | Sid = s03 | | 10 | Movie |
| List Provider name B | Sid = s13 | | - | News |

[Use case 4 occurring when multiple service lists are aggregated]

| Service list | Service ID | LCN | Legacy | Content |
|---|---|---|---|---|
| List Provider name A | Sid = s01 | | 9 | BBC News |
| List Provider name B | Sid = s20 | | 9 | KBS News |

Figure 20A:
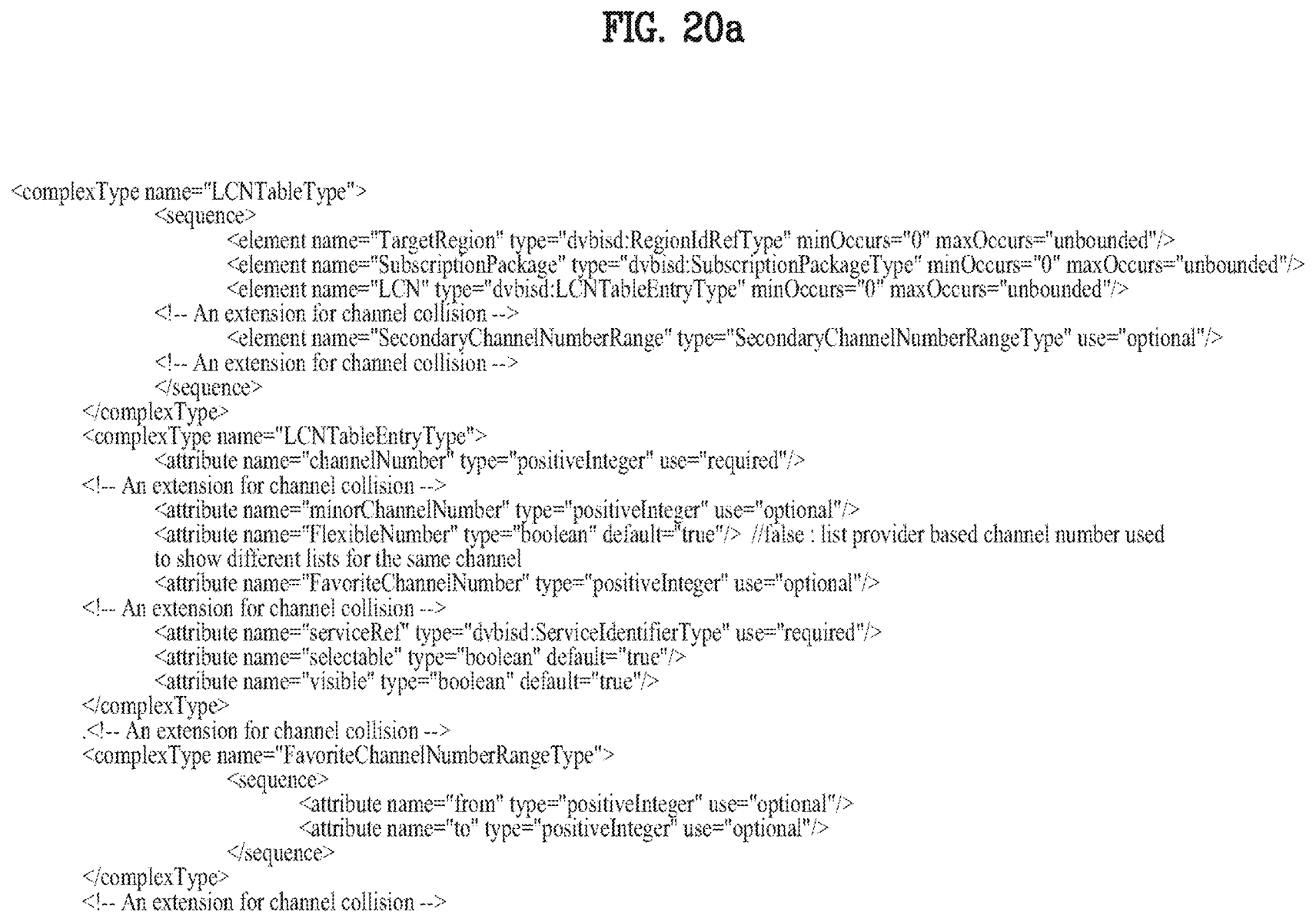

```
<complexType name="LCNTableType">
    <sequence>
        <element name="TargetRegion" type="dvbisd:RegionIdRefType" minOccurs="0" maxOccurs="unbounded"/>
        <element name="SubscriptionPackage" type="dvbisd:SubscriptionPackageType" minOccurs="0" maxOccurs="unbounded"/>
        <element name="LCN" type="dvbisd:LCNTableEntryType" minOccurs="0" maxOccurs="unbounded"/>
        <!-- An extension for channel collision -->
        <element name="SecondaryChannelNumberRange" type="SecondaryChannelNumberRangeType" use="optional"/>
        <!-- An extension for channel collision -->
    </sequence>
</complexType>
<complexType name="LCNTableEntryType">
    <attribute name="channelNumber" type="positiveInteger" use="required"/>
    <!-- An extension for channel collision -->
    <attribute name="minorChannelNumber" type="positiveInteger" use="optional"/>
    <attribute name="FlexibleNumber" type="boolean" default="true"/> //false : list provider based channel number used
    to show different lists for the same channel
    <attribute name="FavoriteChannelNumber" type="positiveInteger" use="optional"/>
    <!-- An extension for channel collision -->
    <attribute name="serviceRef" type="dvbisd:ServiceIdentifierType" use="required"/>
    <attribute name="selectable" type="boolean" default="true"/>
    <attribute name="visible" type="boolean" default="true"/>
</complexType>
<!-- An extension for channel collision -->
<complexType name="FavoriteChannelNumberRangeType">
    <sequence>
        <attribute name="from" type="positiveInteger" use="optional"/>
        <attribute name="to" type="positiveInteger" use="optional"/>
    </sequence>
</complexType>
<!-- An extension for channel collision -->
```

FIG. 20b

| | Semantic Definition | Constraints |
|---|---|---|
| MinorChannelNumber | Allocating minor channels of LCN channel, e.g.) 7-1, 100-1 | |
| FlexibleNumber | In the setting mode, the channel banner shows the existing channel number and identifies it with the name of the service list provider.. e.g.) Different service provider names and text colors | |
| FavoriteChannel Number | Preferred channel number in addition to the defined channel Number when a conflict occurs | |
| SecondaryChannel NumberRange | SecondaryChannelNumberRange range, which allows LCN allocation to be performed in the range in case of conflict | |

FIG. 21

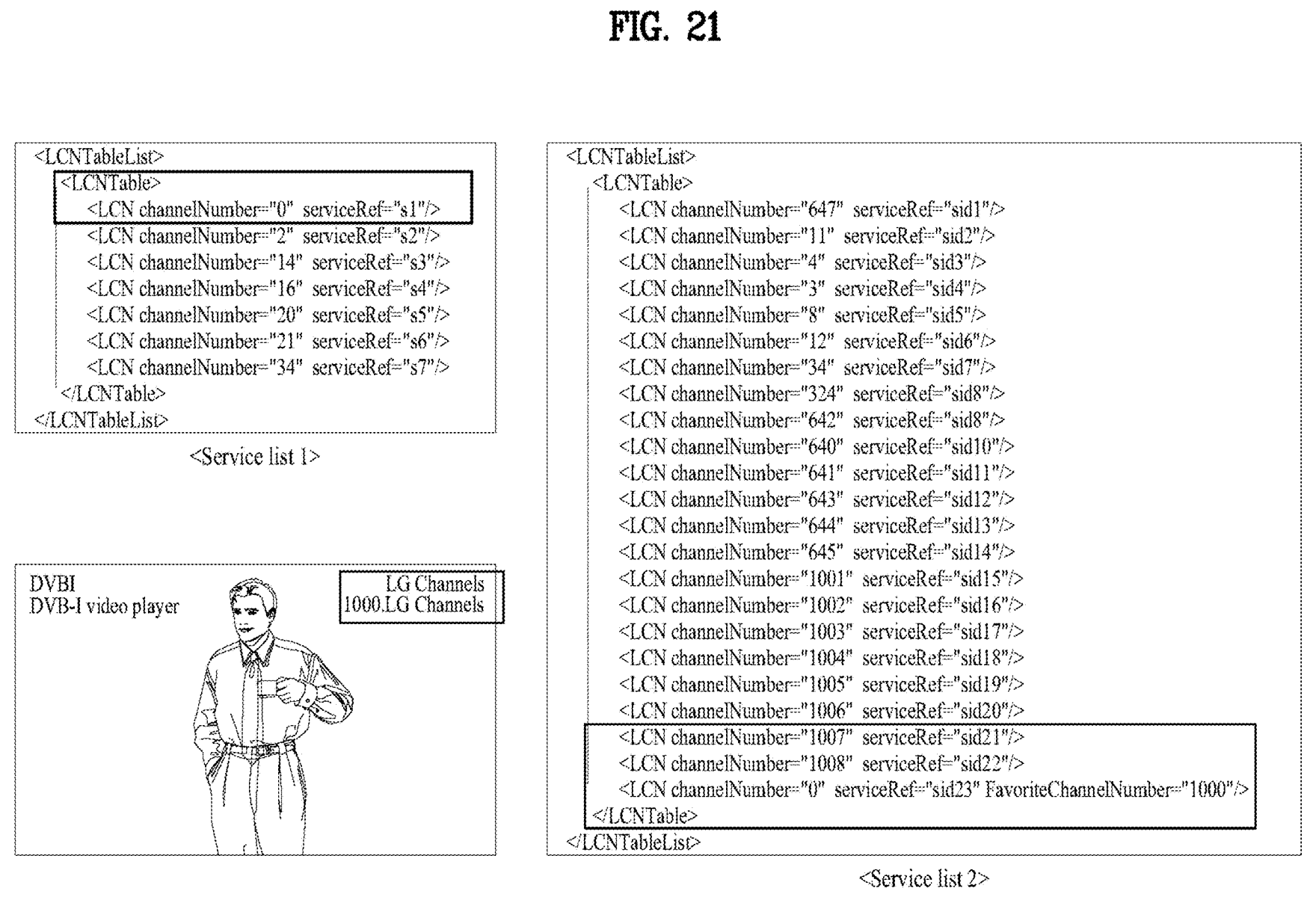

```
<LCNTableList>
<LCNTable>
    <LCN channelNumber="647" serviceRef="sid1"/>
    <LCN channelNumber="11" serviceRef="sid2"/>
    <LCN channelNumber="4" serviceRef="sid3"/>
    <LCN channelNumber="3" serviceRef="sid4"/>
    <LCN channelNumber="8" serviceRef="sid5"/>
    <LCN channelNumber="12" serviceRef="sid6"/>
    <LCN channelNumber="34" serviceRef="sid7"/>
    <LCN channelNumber="324" serviceRef="sid8"/>
    <LCN channelNumber="642" serviceRef="sid8"/>
    <LCN channelNumber="640" serviceRef="sid10"/>
    <LCN channelNumber="641" serviceRef="sid11"/>
    <LCN channelNumber="643" serviceRef="sid12"/>
    <LCN channelNumber="644" serviceRef="sid13"/>
    <LCN channelNumber="645" serviceRef="sid14"/>
    <LCN channelNumber="1001" serviceRef="sid15"/>
    <LCN channelNumber="1002" serviceRef="sid16"/>
    <LCN channelNumber="1003" serviceRef="sid17"/>
    <LCN channelNumber="1004" serviceRef="sid18"/>
    <LCN channelNumber="1005" serviceRef="sid19"/>
    <LCN channelNumber="1006" serviceRef="sid20"/>
    <LCN channelNumber="1007" serviceRef="sid21"/>
    <LCN channelNumber="1008" serviceRef="sid22"/>
    <LCN channelNumber="0" serviceRef="sid23" FavoriteChannelNumber="1000"/>
</LCNTable>
</LCNTableList>
```

<Service list 2>

```
<LCNTableList>
<LCNTable>
    <LCN channelNumber="0" serviceRef="s1"/>
    <LCN channelNumber="2" serviceRef="s2"/>
    <LCN channelNumber="14" serviceRef="s3"/>
    <LCN channelNumber="16" serviceRef="s4"/>
    <LCN channelNumber="20" serviceRef="s5"/>
    <LCN channelNumber="21" serviceRef="s6"/>
    <LCN channelNumber="34" serviceRef="s7"/>
</LCNTable>
</LCNTableList>
```

<Service list 1 >

DVBI
DVB-I video player

LG Channels
1000 LG Channels

FIG. 22a

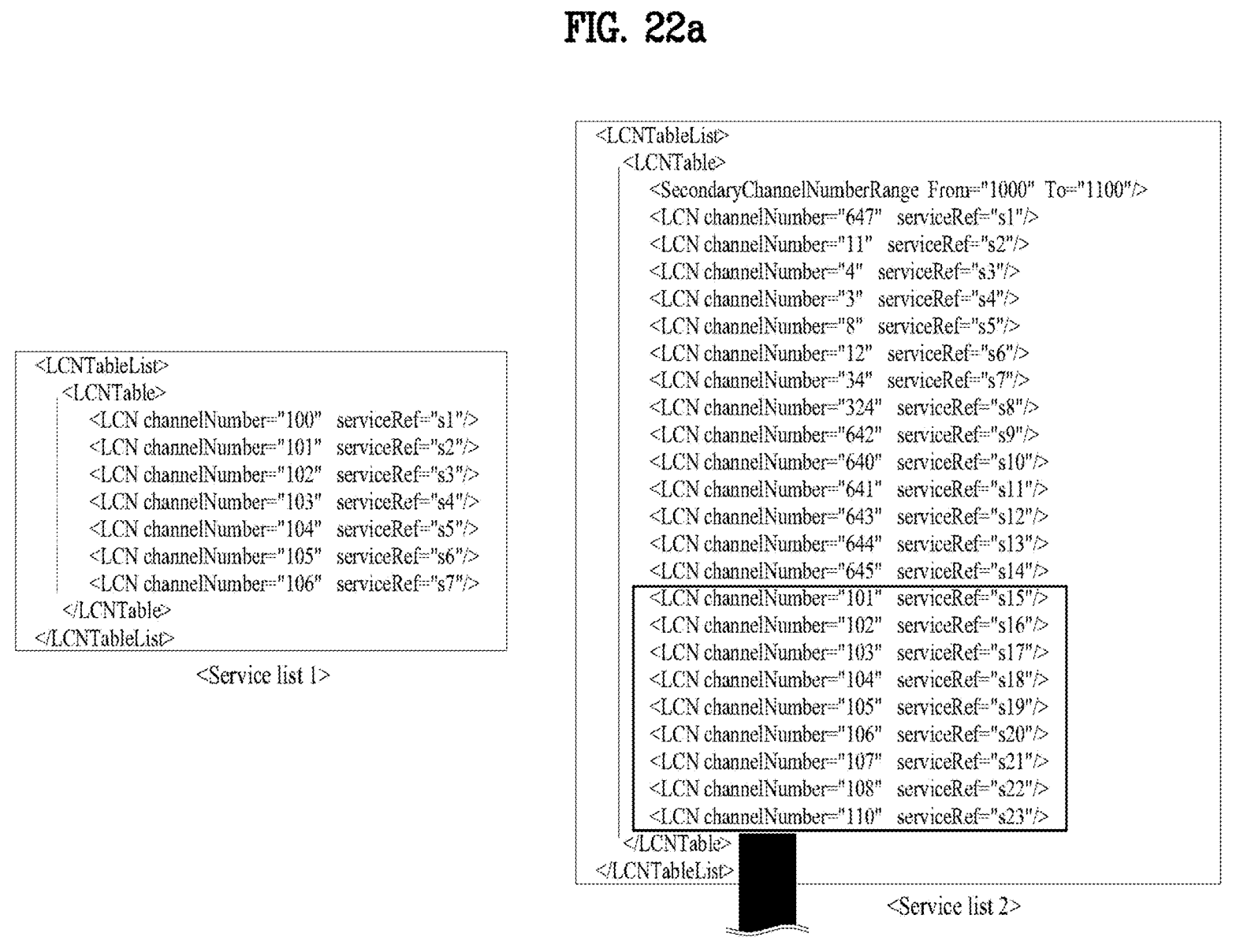

<LCNTableList>
  <LCNTable>
    <SecondaryChannelNumberRange From="1000" To="1100"/>
    <LCN channelNumber="647"   serviceRef="s1"/>
    <LCN channelNumber="11"    serviceRef="s2"/>
    <LCN channelNumber="4"     serviceRef="s3"/>
    <LCN channelNumber="3"     serviceRef="s4"/>
    <LCN channelNumber="8"     serviceRef="s5"/>
    <LCN channelNumber="12"    serviceRef="s6"/>
    <LCN channelNumber="34"    serviceRef="s7"/>
    <LCN channelNumber="324"   serviceRef="s8"/>
    <LCN channelNumber="642"   serviceRef="s9"/>
    <LCN channelNumber="640"   serviceRef="s10"/>
    <LCN channelNumber="641"   serviceRef="s11"/>
    <LCN channelNumber="643"   serviceRef="s12"/>
    <LCN channelNumber="644"   serviceRef="s13"/>
    <LCN channelNumber="645"   serviceRef="s14"/>
    <LCN channelNumber="101"   serviceRef="s15"/>
    <LCN channelNumber="102"   serviceRef="s16"/>
    <LCN channelNumber="103"   serviceRef="s17"/>
    <LCN channelNumber="104"   serviceRef="s18"/>
    <LCN channelNumber="105"   serviceRef="s19"/>
    <LCN channelNumber="106"   serviceRef="s20"/>
    <LCN channelNumber="107"   serviceRef="s21"/>
    <LCN channelNumber="108"   serviceRef="s22"/>
    <LCN channelNumber="110"   serviceRef="s23"/>
  </LCNTable>
</LCNTableList>

<Service list 2>

<LCNTableList>
  <LCNTable>
    <LCN channelNumber="100"   serviceRef="s1"/>
    <LCN channelNumber="101"   serviceRef="s2"/>
    <LCN channelNumber="102"   serviceRef="s3"/>
    <LCN channelNumber="103"   serviceRef="s4"/>
    <LCN channelNumber="104"   serviceRef="s5"/>
    <LCN channelNumber="105"   serviceRef="s6"/>
    <LCN channelNumber="106"   serviceRef="s7"/>
  </LCNTable>
</LCNTableList>

<Service list 1>

FIG. 22b
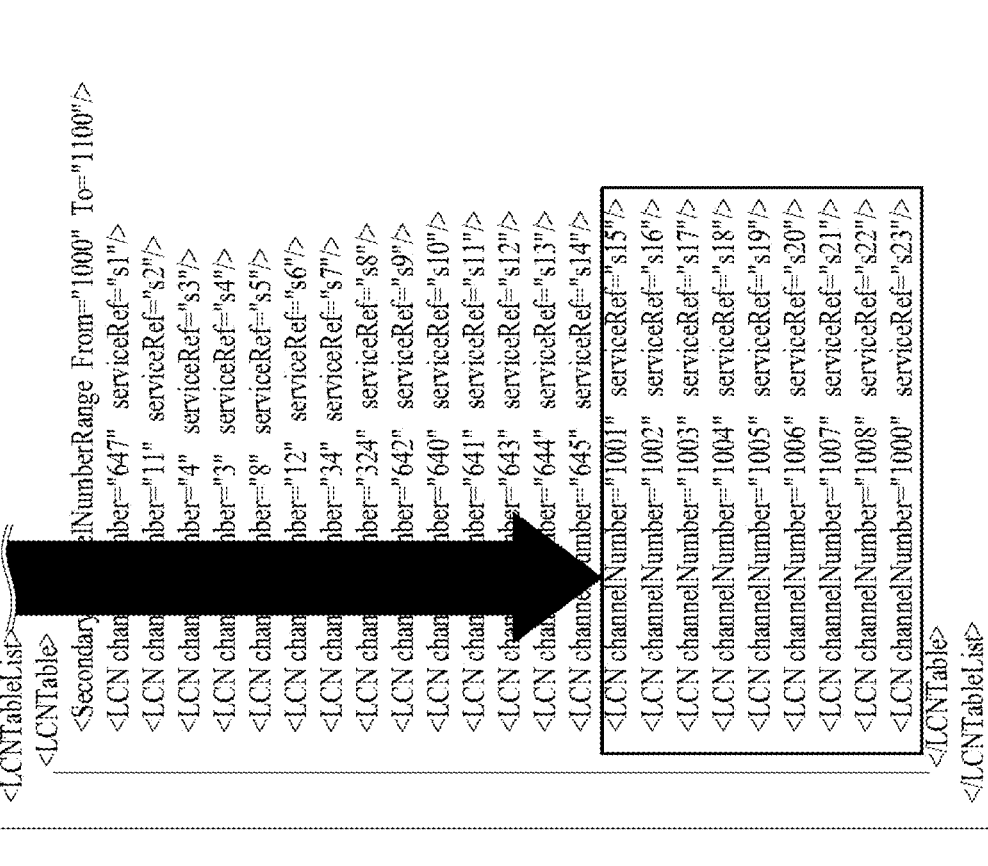
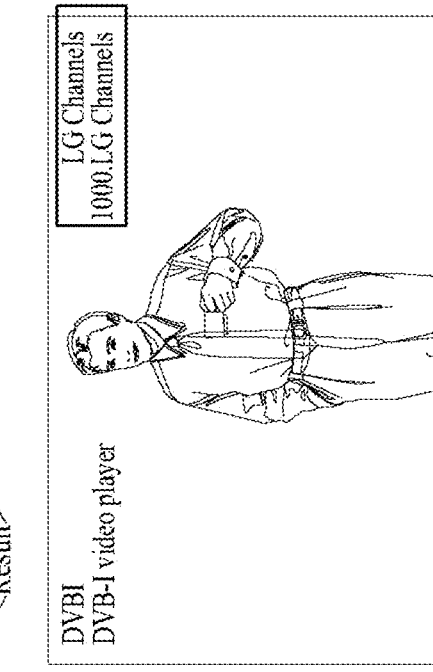

[DASHDeliveryParameters]

```
<complexType name="DASHDeliveryParametersType">
    <sequence>
        <element name="UriBasedLocation" type="dvbisd-base:dvbExtendedURIType"
        maxOccurs="unbounded"/>
        <element name="MinimumBitRate" type="unsignedInt" minOccurs="0"/>
        <element name="ComparisonBitRate" type="unsignedInt" minOccurs="0"/>
        <element name=" ComparisonContentAttributeType " type="dvbisd-base:
        ContentAttributesType" minOccurs="0"/>
        <element name=" ComparisonBitratePeriod " type=" duration " minOccurs="0"/>
        <element name=" Dynamic_switching " type=" bool " minOccurs="0"/>
    </sequence>
```

또는

```
<complexType name="DASHDeliveryParametersType">
    <sequence>
        <element name="UriBasedLocation" type="dvbisd-base:dvbExtendedURIType"
        maxOccurs="unbounded"/>
        <element name="MinimumBitRate" type="unsignedInt" minOccurs="0"/>
        <element name="ComparisonBitRate" type="unsignedInt" minOccurs="0"/>
        <element name=" ComparisonContentAttributeType " type="dvbisd-base:
        ContentAttributesType" minOccurs="0"/>
        <element name=" ComparisonBitratePeriod " type=" duration " minOccurs="0"/>
    </sequence>
    <attribute name=" Dynamic_switching " type=" bool " minOccurs="0"/>
```

| Name | Semantic Definition | Constraints |
|---|---|---|
| UriBasedLocation | Refer to Annex D.1.3.2 of ETSI TS 103 205 [2] for semantic definition. | Mandatory 1 .. ∞ |
| MinimumBitRate | Threshold bit-rate under which an alternative source for the same service should be preferred, if available. | Optional |

FIG. 26

| OTT(DASH instance) |
| --- |
| Priority : 1 |
| Minbitrate : 2Mbps |
| Representation : 2M(SD)~30M(UHD, 8k) |
| <new> |
| ComparisonBitrate : 4Mbps |
| ComparisonAttribute : HD |
| ComparisonBitrateDuration: 30sec |
| Dynamic_switching : Set |

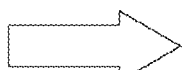

| 5GBC(DASH instance) |
| --- |
| Priority : 2 |
| Minbitrate : 5Mbps |
| Representation : 5M(HD)~15M(UHD) |
| <new> |
| ComparisonBitrate : 6Mbps |
| ComparisonAttribute : HD |
| ComparisonBitrateDuration: 30sec |
| Dynamic_switching : Set |

FIG. 27

| 5GBC(DASH instance) |
| --- |
| Priority : 1 |
| Minbitrate : 4Mbps |
| Representation : 5M(SD)~10M(FHD) |
| <new> |
| ComparisonBitrate : 6Mbps |
| ComparisonAttribute : HD |
| ComparisonBitrateDuration: 30sec |
| Dynamic_switching : Set |

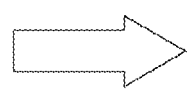

| 5GMS(DASH instance) |
| --- |
| Priority : 2 |
| Minbitrate : 2Mbps |
| Representation : 2M(SD)~15M(UHD) |
| <new> |
| ComparisonBitrate : 3Mbps |
| ComparisonAttribute : SD |
| ComparisonBitrateDuration: 30sec |
| Dynamic_switching : Set |

FIG. 28

5GBC instance]
@ComparisonContentAttributeType

```
<dvbisd-base:VideoAttributes>
        <tva:Codinghref="urn:mpeg:mpeg7:cs:VideoCodingFormatCS:2001:2.2.2">
                <tva:Name> AVC Video Main Profile @ Main Level</tva:Name> FHD enable
                </tva:Coding>
</dvbisd-base:VideoAttributes>
```

[OTT instance]
@ComparisonContentAttributeType

```
<dvbisd-base:VideoAttributes>
        <tva:Coding href="urn:mpeg:mpeg7:cs:VideoCodingFormatCS:2001:2.2.2">
                <tva:Name>HEVC Video Main10 Profile @ Main Level</tva:Name> : UHD enable
        </tva:Coding>
        </dvbisd-base:VideoAttributes>
```

FIG. 29

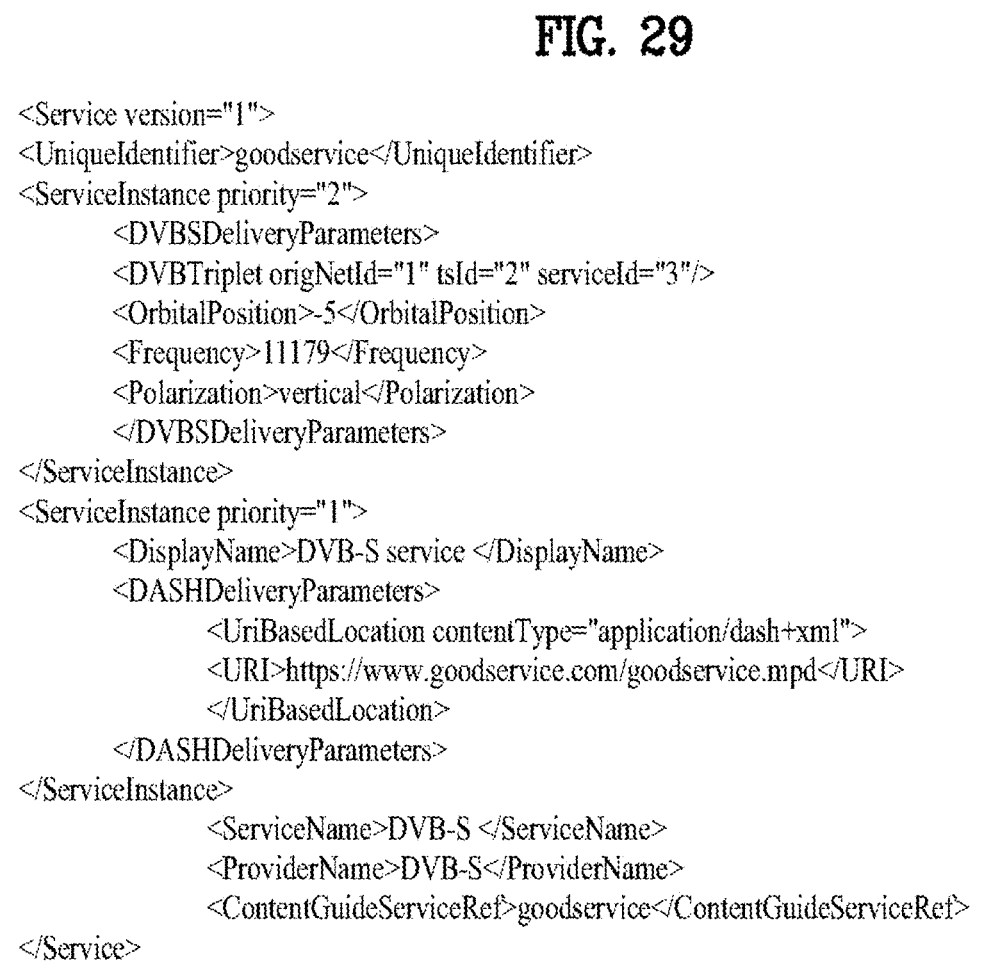

```
<Service version="1">
<UniqueIdentifier>goodservice</UniqueIdentifier>
<ServiceInstance priority="2">
        <DVBSDeliveryParameters>
        <DVBTriplet origNetId="1" tsId="2" serviceId="3"/>
        <OrbitalPosition>-5</OrbitalPosition>
        <Frequency>11179</Frequency>
        <Polarization>vertical</Polarization>
        </DVBSDeliveryParameters>
</ServiceInstance>
<ServiceInstance priority="1">
        <DisplayName>DVB-S service </DisplayName>
        <DASHDeliveryParameters>
                <UriBasedLocation contentType="application/dash+xml">
                <URI>https://www.goodservice.com/goodservice.mpd</URI>
                </UriBasedLocation>
        </DASHDeliveryParameters>
</ServiceInstance>
                <ServiceName>DVB-S </ServiceName>
                <ProviderName>DVB-S</ProviderName>
                <ContentGuideServiceRef>goodservice</ContentGuideServiceRef>
</Service>
```

FIG. 30

| Order | Description | Syntax and code | Interface |
|---|---|---|---|
| 0 | DVB-x pre-install or mobile user registry | Delivery method selection | |
| 1 | The DVB-I client sends a discovery query to Service List Registry. | HTTP GET http://CSR/query?TargetCountry=GBR&regulatorListFlag=true& | B1 |
| 2 | In response to B1, the server returns service lists in the SLR in the form of entry points according to the query condition. | \<ProviderOffering\>    \<Provider\>\<Name\>Freeview\</Name\>\</Provider\>    \<ServiceListOffering regulatorListFlag="true"\>     \<ServiceListName\>Freeview \</ServiceListName\>     \<ServiceListURI contentType="application/xml"\>      \<URI\>http://freeview.tv/GBR_service_list.xml\</URI\>     \</ServiceListURI\>    \</ServiceListOffering\> | B2 |
| 3 | The client makes a selection and request according to the \<providerOffering\> information. | HTTP GET http://freeview.tv/GBR_service_list.xml | F1 |
| 4 | The client parses the received service list and installs and provides the service. | Reception of service list completed | F2 |

FIG. 31a

```
<complexType name="ServiceListOfferingType">
  <sequence>
    <element name="ServiceListName" type="mpeg7:TextualType" maxOccurs="unbounded"/>
    <element name="ServiceListURI" type="dvbisd:ExtendedURIType" maxOccurs="unbounded"/>
    <element name="Delivery" type="dvbisd:DeliveryType"/> <!--new feature -->
    <element name="Language" type="tva:AudioLanguageType" minOccurs="0" maxOccurs="unbounded"/>
    <element name="Genre" type="tva:GenreType" minOccurs="0" maxOccurs="unbounded"/>
    <element name="TargetCountry" type="dvbisd:ISO-3166-List" minOccurs="0" maxOccurs="unbounded"/>
  </sequence>
  <attribute name="regulatorListFlag" type="boolean" default="false"/>
</complexType>
```

| Delivery | Identifies the delivery methods used to deliver the services in the Service List. Indicating which of the delivery methods are required in order to offer an acceptable experience, as defined by the service list provider.<br><br>This enables a client to determine if all required delivery sources are available before attempting installation of the Service List. | Mandatory |
| --- | --- | --- |

FIG. 31b

```
<complexType name="DeliveryType">
  <sequence>
    <element name="DASHDelivery" type="dvbisd:DASHDeliveryType" minOccurs="0"/>
    <element name="DVBTDelivery" type="dvbisd:DVBTDeliveryType" minOccurs="0"/>
    <element name="DVBCDelivery" type="dvbisd:DVBCDeliveryType" minOccurs="0"/>
    <element name="DVBSDelivery" type="dvbisd:DVBSDeliveryType" minOccurs="0"/>
    <element name="RTSPDelivery" type="dvbisd:RTSPDeliveryType" minOccurs="0"/>
    <element name="MulticastTSDelivery" type="dvbisd:MulticastTSDeliveryType" minOccurs="0"/>
    <element name="ApplicationDelivery" type="dvbisd:ApplicationTypeListType" minOccurs="0"/>
    <element name="OtherDeliveryParameters" type="dvbisd:ExtensionBaseType" minOccurs="0"/>
  </sequence>
</complexType>
<complexType name="AbstractDeliveryType" abstract="true">
  <attribute name="required" type="boolean" default="false"/>
  <attribute name="availability" type="boolean" default="false"/>
  <attribute name="priority" type="integer"/>
  <attribute name="recommendation" type="boolean"/>
</complexType>
```

| Name | Semantic Definition | Constraints |
|---|---|---|
| @required | Indicates whether the delivery type must be supported by the DVB-I client and available, in order to offer an acceptable experience as defined by the service list provider. | |
| @availability | A delivery type is available when the related broadcast signal or IP network can be used by the client to retrieve DVB services. | |
| @priority | The priority of the service list relative to the other delivery methods. Lower values of this attribute indicate a higher priority. | |

FIG. 31c

| Order | Description | Syntax and code | Interface |
|---|---|---|---|
| 0 | DVB-x pre-install or mobile user registry | Delivery method selection | |
| 1 | The DVB-I client sends a discovery query to the Service List Registry according to the pre-installed delivery method. | HTTP GET http://CSR/query?TargetCountry=GBR&regulatorListFlag=true&dvb-t | B1 |
| 2 | In response to B1, the server returns service lists in the SLR in the form of entry points according to the query condition. According to the <Delivery> defined in the <ProviderOffering> received by the DVB-I client, the delivery method essentially supported by the corresponding list and the method supportable by the IP only device are defined. | `<ProviderOffering>` `<Provider><Name>Freeview</Name></Provider>` `<ServiceListOffering regulatorListFlag="true">` `<ServiceListName>Freeview </ServiceListName>` `<ServiceListURI contentType="application/xml">` `<URI>http://freeview.tv/GBR_service_list.xml</URI>` `</ServiceListURI>` `<Delivery>` `<DASHDelivery required ="true" availability = "yes" priority="1" recommended ="yes">` `<DVBTDelivery required ="false" availability ="yes" priority="2" recommended ="yes">` `<MulticastTSDelivery required ="false" availability ="falseyes" priority="3" recommended ="yes">` `</Delivery>` `</ServiceListOffering>` | B2 |
| 3 | The client makes a selection and request according to the <providerOffering> information. | HTTP GET http://freeview.tv/GBR_service_list.xml | F1 |
| 4 | The client parses the received service list and installs and provides the service. | Reception of service list completed | F2 |

Figure 34:
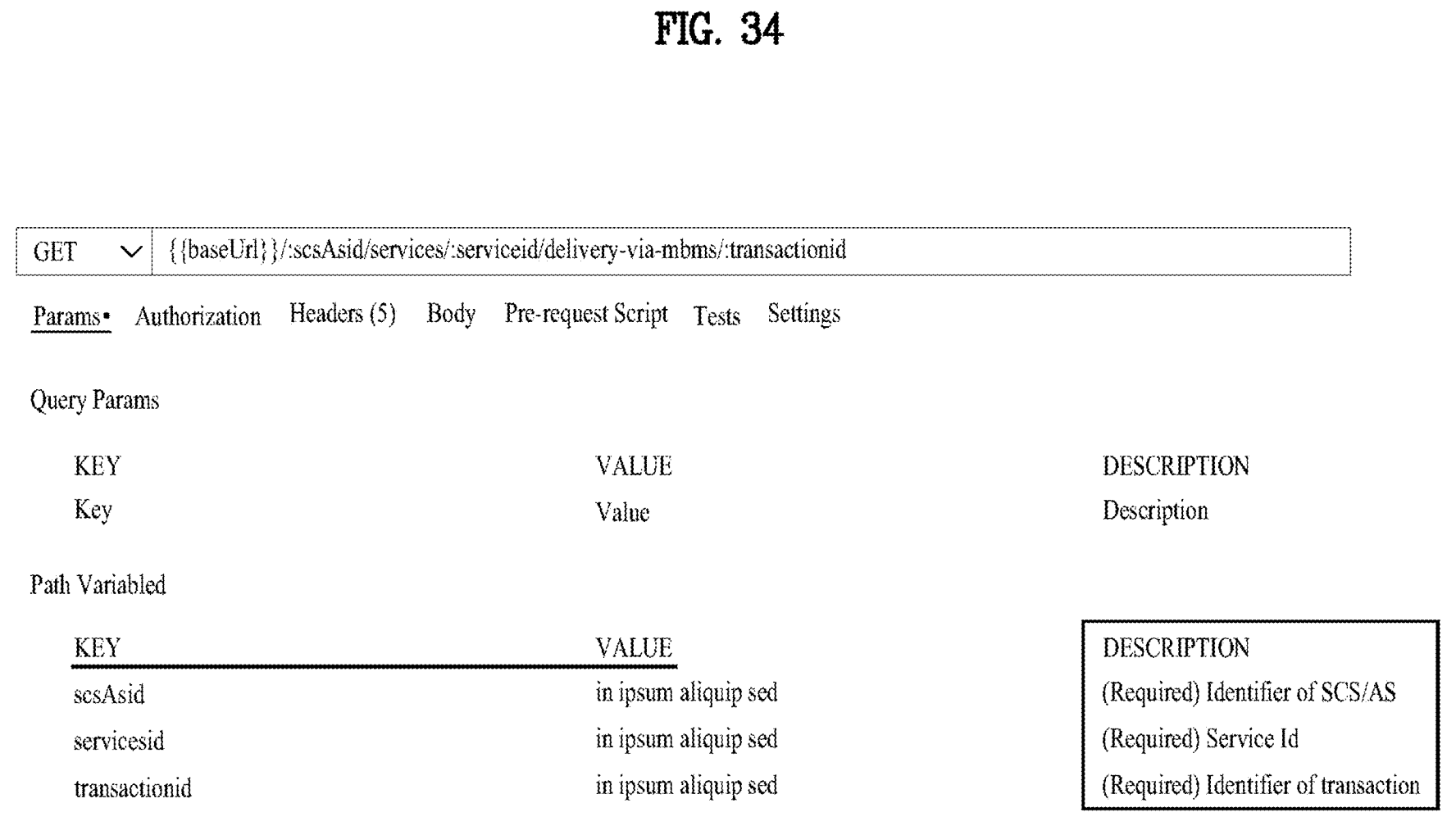

GET ∨ | {{baseUrl}}/scsAsid/services/serviceid/delivery-via-mbms/transactionid

Params• Authorization  Headers (5)  Body  Pre-request Script  Tests  Settings

Query Params

| KEY | VALUE | DESCRIPTION |
|---|---|---|
| Key | Value | Description |

Path Variabled

| KEY | VALUE | DESCRIPTION |
|---|---|---|
| scsAsid | in ipsum aliquip sed | (Required) Identifier of SCS/AS |
| servicesid | in ipsum aliquip sed | (Required) Service Id |
| transactionid | in ipsum aliquip sed | (Required) Identifier of transaction |

FIG. 35a

```
{
   "notificationDestination": {
     "value": "reference TS29122_CommonData.yaml#/components/schemas/Link not found in the
             OpenAPI spec"
   },
   "self": {
     "value": "reference TS29122_CommonData.yaml#/components/schemas/Link not found in the
             OpenAPI spec"
   },
   "requestTestNotification": true,
   "websockNotifConfig": {
     "value": "reference TS29122_CommonData.yaml#/components/schemas/WebsockNotifConfig
             not found in the OpenAPI spec"
   },
   "mbmsLocArea": {
     "cellId": [
       "in non"
     ],
     "enodeBId": [
       "ea"
     ],
     "geographicArea": [
       {
         "value": "reference TS29572_Nlmf_Location.yaml#/components/schemas/GeographicArea
                 not found in the OpenAPI spec"
       }
     ],
     "mbmsServiceAreaId": [
       "cillum ad mollit cupidatat"
     ],
     "civicAddress": [
       {
         "value": "reference TS29572_Nlmf_Location.yaml#/components/schemas/CivicAddress not
                 found in the OpenAPI spec"
       }
     ]
   },
```

FIG. 35b

```
"messageDeliveryStartTime": {
    "value": "reference TS29122_CommonData.yaml#/components/schemas/DateTime not found in
            the OpenAPI spec"
},
"messageDeliveryStopTime": {
    "value": "reference TS29122_CommonData.yaml#/components/schemas/DateTime not found in
            the OpenAPI spec"
},
"groupMessagePayload": {
    "value": "reference TS29122_CommonData.yaml#/components/schemas/Bytes not found in the
            OpenAPI spec"
},
"scefMessageDeliveryIPv4": {
    "value": "reference TS29122_CommonData.yaml#/components/schemas/Ipv4AddrRo not found
            in the OpenAPI spec"
},
"scefMessageDeliveryIPv6": {
    "value": "reference TS29122_CommonData.yaml#/components/schemas/Ipv6AddrRo not found
            in the OpenAPI spec"
},
"scefMessageDeliveryPort": {
    "value": "reference TS29122_CommonData.yaml#/components/schemas/PortRo not found in
            the OpenAPI spec"
    }
}
```

Figure 36:
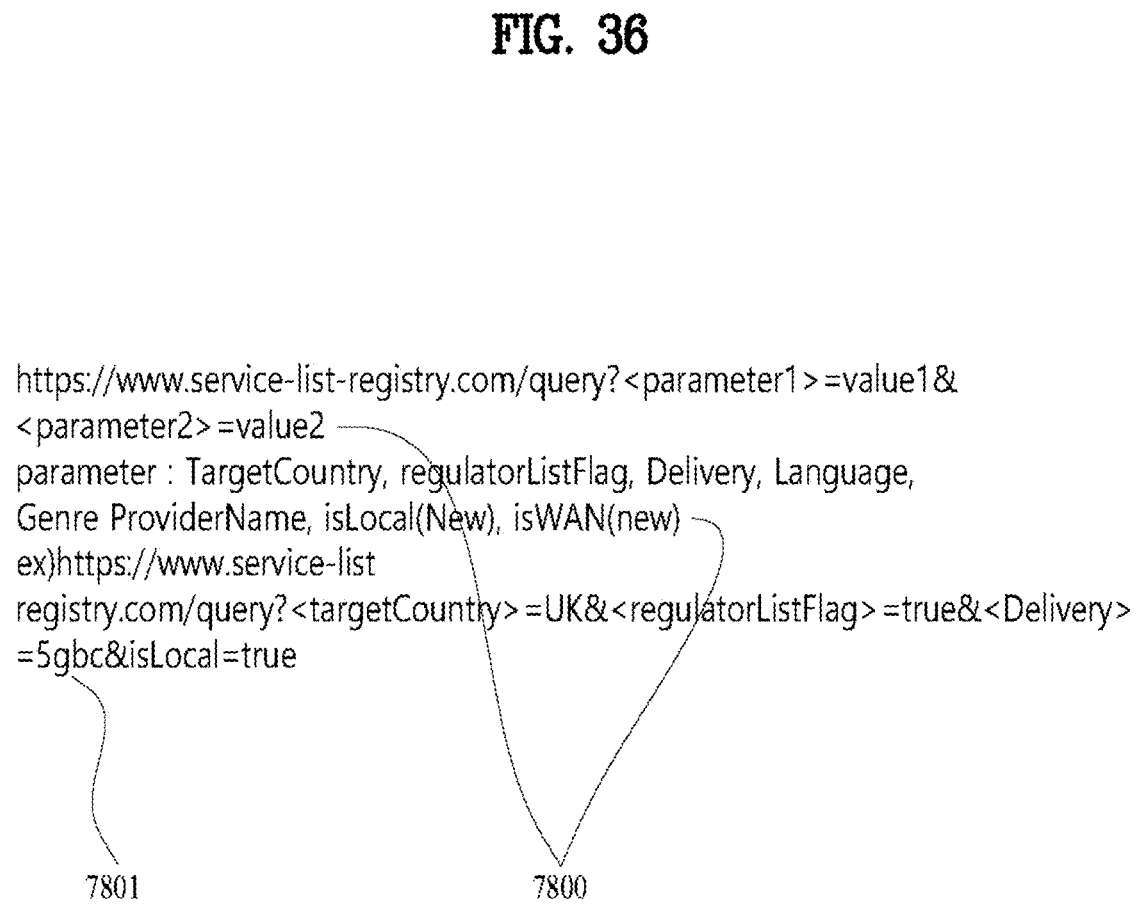

FIG. 36 https://www.service-list-registry.com/query?<parameter1>=value1&
<parameter2>=value2
parameter : TargetCountry, regulatorListFlag, Delivery, Language,
Genre ProviderName, isLocal(New), isWAN(new)
ex)https://www.service-list
registry.com/query?<targetCountry>=UK&<regulatorListFlag>=true&<Delivery>
=5gbc&isLocal=true 7801             7800

FIG. 37a

```
[DVB-I serviceListOffering deliveryType extension for supporting 5GBC]
<complexType name="DeliveryType">
  <sequence>
    <element name="DASHDelivery" type="dvbisd:NoAdditionalIPParamatersType" minOccurs="0"/>
    <element name="DVBTDelivery" type="dvbisd:DVBTDeliveryType" minOccurs="0"/>
    <element name="DVBCDelivery" type="dvbisd:DVBCDeliveryType" minOccurs="0"/>
    <element name="DVBSDelivery" type="dvbisd:DVBSDeliveryType" minOccurs="0"/>
    <element name="RTSPDelivery" type="dvbisd:NoAdditionalIPParamatersType" minOccurs="0"/>
    <element name="MulticastTSDelivery" type="dvbisd:NoAdditionalIPParamatersType" minOccurs="0"/>
    <element name="ApplicationDelivery" type="dvbisd:ApplicationTypeListType" minOccurs="0"/>
    <element name="OtherDeliveryParameters" type="dvbisd:ExtensionBaseType" minOccurs="0"/>
    <element name="DVB-5GBCDelivery" type="dvbisd: DVB-5GBCDelivery" minOccurs="0"/>
  </sequence>
</complexType>
<complexType name="AbstractDeliveryType" abstract="true">
  <attribute name="required" type="boolean" default="false"/>
</complexType>
```

FIG. 37b

AbstractDeliveryType Fields

| Name | Semantic Definition | Constraints |
|---|---|---|
| @required | Indicates whether the delivery type must be supported by the DVB-I client and installed, in order to offer an acceptable experience as defined by the service list provider.<br>A delivery type is installed when the related broadcast signal or IP network can be used by the client to retrieve DVB services. | |

```
<complexType name="AbstractIPDeliveryType" abstract="true">
  <complexContent>
    <extension base="dvbisld:AbstractDeliveryType">
      <attribute name="minimumBitRate" type="unsignedInt"/>
    </extension>
  </complexContent>
</complexType>
```

FIG. 38

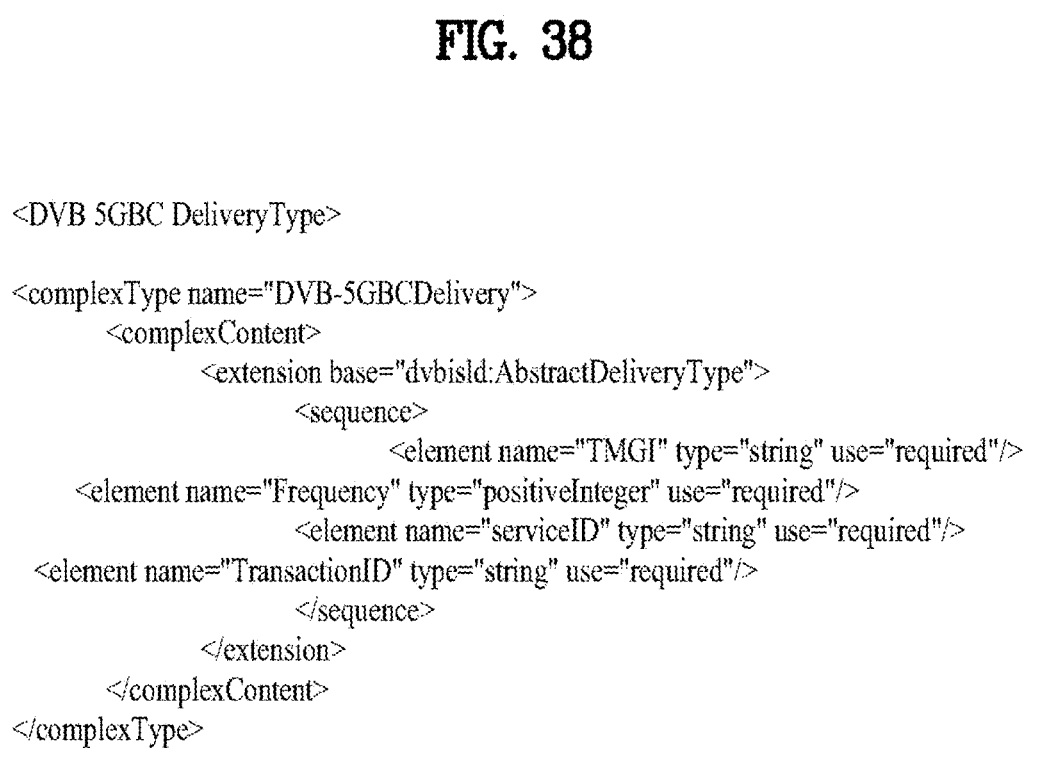

```
<DVB 5GBC DeliveryType>

<complexType name="DVB-5GBCDelivery">
        <complexContent>
                <extension base="dvbisld:AbstractDeliveryType">
                        <sequence>
                                <element name="TMGI" type="string" use="required"/>
        <element name="Frequency" type="positiveInteger" use="required"/>
                                <element name="serviceID" type="string" use="required"/>
    <element name="TransactionID" type="string" use="required"/>
                        </sequence>
                </extension>
        </complexContent>
</complexType>
```

FIG. 39

```
[DVB-I ServiceInstanceType extension for supporting 5GBC]
<complexType name="ServiceInstanceType">
        <sequence>
        <element name="DisplayName" type="mpeg7:TextualType" minOccurs="0"
                        maxOccurs="unbounded"/>
        <element name="RelatedMaterial" type="dvbisd:RelatedMaterialType" minOccurs="0"
                        maxOccurs="unbounded"/>
        <element name="ContentProtection" type="dvbisd:ContentProtectionType" minOccurs="0"
                        maxOccurs="unbounded"/>
        <element name="ContentAttributes" type="dvbisd:ContentAttributesType" minOccurs="0"/>
        <element name="Availability" type="dvbisd:ServiceAvailabilityType" minOccurs="0"/>
        <element name="SubscriptionPackage" type="dvbisd:SubscriptionPackageType" minOccurs="0"
                        maxOccurs="unbounded"/>
        <element name="FTAContentManagement" type="dvbisd:FTAContentManagementType"
                        minOccurs="0"/>
        <element name="SourceType" type="anyURI" minOccurs="0"/>
        <choice minOccurs="0">
        <sequence>
        <element name="DVBTDeliveryParameters" type="dvbisd:DVBTDeliveryParametersType"/>
        <element name="SATIPDeliveryParameters" type="dvbisd:SATIPDeliveryParametersType"
                        minOccurs="0"/>
        </sequence>
        <sequence>
        <element name="DVBSDeliveryParameters" type="dvbisd:DVBSDeliveryParametersType"/>
        <element name="SATIPDeliveryParameters" type="dvbisd:SATIPDeliveryParametersType"
                        minOccurs="0"/>
        </sequence>
        <element name="DVBCDeliveryParameters" type="dvbisd:DVBCDeliveryParametersType"/>
        <element name="RTSPDeliveryParameters" type="dvbisd:RTSPDeliveryParametersType"/>
        <element name="MulticastTSDeliveryParameters" type="dvbisd:MulticastTSDeliveryParametersType"/>
        <sequence>
        <element name="DASHDeliveryParameters" type="dvbisd:DASHDeliveryParametersType"/>
        <element name="MulticastTSDeliveryParameters" type="dvbisd:MulticastTSDeliveryParameters
                        Type" minOccurs="0"/>
    <element name="DVB5GBCDeliveryParameters" type="dvbisd: DVB5GBCDeliveryParametersType"/>
        </sequence>
        <element name="OtherDeliveryParameters" type="dvbisd:ExtensionBaseType"/>
<element name="DVB5GBCDeliveryParameters" type="dvbisd: DVB5GBCDeliveryParametersType"/>
        </choice>
        </sequence>
        <attribute name="priority" type="integer"/>
</complexType>
```

FIG. 40

```
[DVB5GBCDeliveryParametersType]
<complexType name=" DVB5GBCDeliveryParametersType ">
       <sequence>
       <element name="UriBasedLocation" type="dvbisd:ExtendedURIType"/>
       <element name="MinimumBitRate" type="unsignedInt" minOccurs="0"/>
       <element name="TMGI" type="string" use="required"/>
   <element name="Frequency" type="positiveInteger" use="required"/>
       <element name="serviceID" type="string" use="required"/>
<element name="TransactionID" type="string" use="required"/>
       </sequence>
</complexType>
```

DVB-I client

Start Scan
Process
Country = UK          8300
GPS agreement

5GBC / BF          8302
scan

8303

CSR          8302
bootstrapp
          https://www.CSR.com/query?<targetCountry>=UK&
          <regulatorListFlag>=true&<Delivery>=5gbc&isLocal=true dvb_5GBC.xml

8305

Service UI/UX          8306
composition

8307
Service list
Req          Httpl://dvb_5GBC.xml

CSR

8304

```
<ServiceListEntryPoints>
<ServiceListRegistryEntity regulatorFlag="true"/>
        <Name>DVB Service Sàrl</Name>
        ...
</ServiceListRegistryEntity>
<ProviderOffering>
        <Provider>
                <Name>AGCOM</Name>
                ...
        </Provider>
<ServiceListOffering regulatorListFlag-"true">
        <ServiceListName>UK DVB</ServiceListName>
                <ServiceListURI contentType="application/xml">
                        <dvbisd:URI>https://dvb_5GBC.xml</dvbisd:URI>
                </ServiceListURI>
                <Delivery>
                        <DVB5BCDelivery required="True" TMGI = "1", Frequency = 750,
                                        5GBCserviceI="123"
                                        TransactionId="3"/>
                </Delivery>
                <Language>Eng<L/anguage>
                <TargetCountry>UK</TargetCountry>
        <ServiceListOffering>
</ProviderOffering>
</ServiceListEntryPoints>
```

Service list server

8309

```
<?xml version="1.0" encoding="UTF-8"?>
<ServiceListversion="1" xmlns="urn:dvb:metadata:servicediscovery:20210"
xmlns:xsi="http://www.w3.org/2001/CMLSchema-instance"
xsi:schemaLocation="urn:dvb:metadata:servicediscovery:20210"../dvbi_v32.0.xsd">
<Name>DVB UK 5G Broadcastingservice</Name>
<ProviderName>DVB</ProviderName>
<Service version="1">
        <UniqueIdentifier>DVB:2021:UK:manchester</UniqueIdentifier>
        <ServiceInstance priority="1">
                <DVB5GBCDeliveryParameters>
                        <TMGI>1</TMGI>
                        <Frequency>750</Frequency>
                        <5GBServiceID>123</5GBServiceID>
                </DVB5GBCDeliveryParameters>
        </ServiceInstance>
</Service>
</ServiceList>
```

FIG. 42

| Parameter name | Value and semantics | Value and semantics |
|---|---|---|
| tmgi | The ASCII hexadecimal representation of the TMGI of the ROM service, encoded in up to twelve characters Leading zero characters in the hexadecimal value representation may be omitted from the tmgi string. For example, the values 0000000901056 and 901056 encode an identical TMGI | Optional If omitted, the tmgi value is unknown |
| serviceArea | The list of service areas that are also present in the userServiceDescription | Optional If omitted, the serviceArea value is unknown |
| frequency | The Frequency value also present in the userServiceDescription, coded as EARFCN, as defined in 3GPP TS 36.101 [17] | Optional If omitted, the frequency value is unknown |
| subcarrierSpacing | The subcarrierSpacing value also present in the userServiceDescription, coded as subcarrier spacing ( f) values per 3GPP TS 36.211 [18] | Optional If omitted, the subcarrierSpacing value is unknown |
| bandwidth | The bandwidth value, restricted to be one of the specified channel bandwidth values in 3GPP TS 36.104 [19] | Optional If omitted, the bandwidth value is unknown |
| serviceId | The serviceId in the Service Announcement channel that points to the referenced User Service | Optional If omitted, the MBMS-URL points to an SA service |

FIG. 45

```
<complexType name="ServiceListOfferinmgType">
    <sequence>
        <element name="ServiceListName" type="mpeg7:TextualType" maxOccurs="unbounded"/>
        <element name="ServiceListURl" type="dvbisd:ExtendedURIType" maxOccurs="unbounded"/>
        <element name="Delivery" type="dvbisId:DeliveryType"/>
        <element name="Language" type="tva:AudioLanguageType" minOccurs="0" maxOccurs="unbounded"/>
        <element name="Genre" type="tva:GenreType" minOccurs="0" maxOccurs="unbounded"/>
        <element name="TargetCountry" type="dvbisd:ISO-3166-List" minOccurs="0" maxOccurs="unbounded"/>
    </sequence>
    <attribute name="inReception" type="boolean" default="false"/>
    <attribute ref="xml:lang"/>
</complextype>
    <complexType name="DeliveryType">
        <sequence>
            <element name="DASHDelivery" type="dvbisId:NoAdditionalIPParametersType" minOccurs="0"/>
            <element name="DVBTDelivery" type="dvbisId:DVBTDeliveryType" minOccurs="0"/>
            <element name="DVBCDeilivery" type="dvbisID"DVBCDeliveryType" minOccurs="0"/>
            <element name="DVBSDelivery" type="dvbisId"DVBSDeliveryType" minOccurs="0"/>
            <element name="RTSPDelivery" type="dvbisI":NoAdditionalIPParametersType" minOccurs="0"/>
            <element name="MulticastTSDelivery" type="dvbisID:NoAdditionalIPParametersType" minOccurs="0"/>
            <element name="ApplicationDelivery" type="dvnisId":AppplicationTypeListType" minOccurs="0"/>
            <element name="5GBCDelivery" type="dvbisId:ApplicationTypeListType" minOccurs="0"/>
            <element name="5GBSDelivery" type="dvbisId:ApplicationTypeListType" minOccurs="0"/>
            <element name="OtherDeliveryParameters" type="dvbisd:ExtensionBaseType" minOccurs="0"/>
        </sequence>
    </complexType>
```

FIG. 46

| ETSI EN 300 468 [6] | | DVB-I Service List |
|---|---|---|
| service type | Description | |
| 0x1F | HEVC digital television service (see note4) | Service.ServiceType="urn:dvb:metadata:cs:ServiceTypeCS:2019:linear"<br><br>—<br><br>Service.ServiceInstance.ContentAttributes.VideoAttributes.PictureFormat="urn:tva:metadata:cs:picture"formatCS:2015:1.2"<br><!--HD--> or "urn:tva:metadata:cs:PictureFormatCS:2015:1.3" <!--UHD-->"<br><br>Service.ServiceInstance.contentAttributes.VideoAttributes.FrameRate <="120"<br><br>—<br><br>Service.ServiceInstance.ContentAttributes.VideoAttributes.Coding contains any HEVC related term from urn:dvb:metadata:cs:VideoConformancePoints CS:2017 |
| 0x20 | HEVC UHD digital television service with HDR and/or a frame rate of 100 Hz, 120 000/1 001 Hz, or 120Hz, or any combination of HDR HDR and these frame rates (see note5) | Service.ServiceType="urn:dvb:metadata:cs:ServiceTypeCS:2019:linear"<br><br>—<br><br>Service.ServiceInstance.ContentAttributes.VideoAttributes.PictureFor mat="urn:tva:metadata:cs:PictureFormatCS:2015:1.3" <!--UHD--><br><br>Service.ServiceInstance.ContentAttributes.VideoAttributes.FrameRate <="120"<br><br>—<br><br>Service.ServiceInstance.ContentAttributes.VideoAttributes.Coding contains any HEVC related term from urn:dvb:metadata:cs:VideoConformancePoints CS:2017 |

FIG. 47

```xml
<?xml version="1.0" encoding="UTF-8"?>
<ClassificationScheme uri="urn:dvbLmetadata:cs:ServiceTypeCS:2022" xmlns= "urn:tva:mpeg7:2008" xmlns:xsi=
gttp://www.w3.org/2001/XMLSchema=instance" xsi:schemaLocation="urn:tva:mpeg7:2008 tva_mpeg7.xsd"
xsi:type="ClassificationSchemeType:>
    <!--###################################################################-->
    <!-- ServiceType-->
    <!-- Definition: Definitions for the different types of service-->
    <!--###################################################################-->
    <Term termID="linear">
        <Name xml:lang="en"> The service contains linear programming</Name>
    </Term>
    <Term termID="odemand">
        <Name xml:lang="en"> The service contains on demand programming</Name>
    </Term>
    </Term termID="data">
        <Name xml:lang="en">the service contains only data signalling</Name>
    </Term>
    <Term termID="5Gstandalone">
        <Name xml:lang="en">The service contains 5G standalone/Name>
    </Term>
    </Term termID="other">
        <Name xml:lang="en"> The service cannot be described by one of the categories
        is this scheme</Name>
    </Term>
</ClassificationScheme>
```

FIG. 48

```
<complexType name="ServiceInstanceType">
    <sequence>
        <element name ="DisplayName" type= "mpeg7:TextualType" min Occurs="0" maxOccurs="unbounded"/>
        <element name="RelatedMaterial" type="dvbisd:RelatedmaterialType"
        minOccurs="0" maxOccurs="unbounded"/>
        <element name="AltServiceName" type="string" minOccurs="0" maxOccurs="unbound"/>
        <choice minOccurs="0">
            <sequence>
                <element name="DVBTDeliveryParameters" type="dvbisd:DVBTDeliveryParametersType"/>
                <element name="SATIPDeliveryParameters" type="dvbisd:SATIPDeliveryParametersType"
                minOccurs="0"/>
            </sequence>
            <sequence>
                <element name="DVBSDeliveryParameters" type="dvbisd:DVBSDeliveryParametersType"/>
                <element name="SATIPDeliveryParameters" type="dvbisd:SATIPDeliveryParametersType"
                minOccurs="0"/>
            </sequence>
            <element name="DVBCDeliveryParameters" type="dvbisd:DVBCDeliveryParametersType"/>
            <element name="RTSPDeliveryParameters" type="dvbisd:RTSPDeliveryParametersType"/>
            <element name="MulticastTSDeliveryParameters" type="
            dvbisd:MulticastTSDeliveryParametersType"/>
            <sequence>
                <element name="DASHDeliveryParameters"type="dvbisd:DASHDeliveryParametersType"/>
                <element name="MulticastTSDeliveryParameters"type="
                dvbisd:MulticastTSDeliveryParametersType" minOccurs="0"/>
            </sequence>
            <element name="OtherDeliveryParameters" type="dvbisd:ExtensionBaseType"/>
        </choice>
    </sequence>
    <attribute name="priority" type="integer" default="0"/>
    <attribute ref="xml:lang"/>
</comeplexType>
```

FIG. 49

```
<complexType name="DASHDeliveryParametersType">
    <sequence>
        <element name="UribasedLocation" type="dvbisd:ExtendedURIType"/>
        <element name="MinimumBitRate" type="unsignedInt" minOccurs="0"/>
        <element name="Extension" type="dvbisd:ExtensionBaseType" minOccurs="0" maxOccurs="unbounded"/>
    </sequence>
</complexType>
    <complexType name="ExtensionBaseType" abstract="true">
        <attribute name="extensionName" use="required">
            <simpleType>
                <restriction base="string">
                    <pattern value="[A-Za-Z0-9][A-Za-Z0-9:₩-/₩.]*[A-Za=z0-9]"/>
                </restriction>
            </simpleType>
        </attribute>
    </complexType>
<element name="MbmsRomUrl" type="dvbisd:ExtensionBaseType" minOccurs="0" maxOccurs="unbounded"/>
```

1

MEDIA DATA PROCESSING METHOD AND MEDIA DATA PROCESSING APPARATUS

CROSS-REFERENCE TO RELATED APPLICATION

This application is a National Stage Application of International Application No. PCT/KR2023/004463 filed on Apr. 3, 2023, which claims the benefit of priority to Korean Patent Application No. 10-2022-0041216 filed on Apr. 1, 2022, and Korean Patent Application No. 10-2022-0043004, filed Apr. 6, 2022, the disclosure of which is incorporated herein by reference in its entirety.

TECHNICAL FIELD

The present disclosure relates to a media data processing method and a media data processing device.

BACKGROUND

There is no method for implementing an IP-based TV service capable of providing the same user experience (UX) as terrestrial, satellite, or cable linear channel.

There is no method for providing a channel guide integrated with the terrestrial, satellite, or cable channel through open Internet-based native code reception rather than an app-based linear channel service.

There is no integrated broadcasting system protocol based on all of terrestrial wave, satellite, cable, and the Internet.

There is no method for acquiring Internet broadcast service signaling by a receiver without a terrestrial, satellite, or cable tuner.

There is no service discovery system for acquiring a broadcast service based on Internet transmission.

There is no Internet-based broadcast service signaling mechanism.

There is no method for maintaining the updated state of a content guide corresponding to the DVB-I service.

SUMMARY

An object of the embodiments is to provide a media data processing device for implementing an IP-based TV service capable of providing the same user UX as the terrestrial, satellite, or cable linear channel.

An object of the embodiments is to provide a media data processing device for providing a channel guide integrated with the terrestrial, satellite, or cable channel through open Internet-based native code reception rather than an application-based linear channel service.

An object of the embodiments is to provide a media data processing device for seamlessly providing a real-time/non-real-time media streaming service rather than directly receiving terrestrial (fixed) waves, in consideration of a situation where broadcast services are consumed through media such as OTT, PC, IPTV, and the like of IP-based devices, as well as high traffic of unicast.

A media data processing method according to embodiments may include generating media data: generating a service list related to the media data; and transmitting the media data and the service list based on a network. A media data processing method according to embodiments may include receiving media data and a service list related to the media data based on a network; and processing the media data based on the service list.

A receiver not equipped with a traditional tuner may efficiently discover and acquire an Internet-based broadcast service over a broadband network.

In receiving an aggregated service list according to embodiments, the versioning/expiration management method for each service and the selective parsing and storage of each service may eliminate the need to receive the entire service list.

Content or user experience that may provide services suitable for capability may be efficiently provided.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIGS. 5A and 5B show a table representation of a DVB-I service list type according to embodiments:

FIGS. 6A and 6B show a DVB-I service type according to embodiments:

FIGS. 7A, 7B show a service instance type according to embodiments:

FIG. 8 shows DASH delivery parameters for simulcast according to embodiments:

FIG. 9 shows options for selecting a service instance based on DASHDelivery Parameters Type according to embodiments:

FIG. 10 shows an example of a DVB-I service instance according to embodiments:

FIG. 14 shows DVB-I service discovery information according to embodiments:

FIG. 15 shows a syntax of a service list registry entity according to embodiments:

FIGS. 16A and 16B show semantics of a service list registry entity according to embodiments:

FIG. 17 illustrates a service list selection UI/UX according to embodiments:

FIG. 18 illustrates a method for coping with channel conflict in receiving multiple service lists according to embodiments:

FIGS. 20A and 20B show an LCN table entry syntax according to embodiments:

FIG. 21 shows an example of resolving service channel conflicts according to embodiments:

FIG. 22 shows an example of resolving a channel redundancy issue according to embodiments:

FIG. 23 illustrates a 5G-based DVB-I system according to embodiments:

FIG. 25 shows information for service instance switching according to embodiments:

FIG. 26 shows an example of service instance switching according to embodiments:

FIG. 27 shows an example of service instance switching according to embodiments:

FIG. 28 shows a 5GBC instance and an OTT instance according to embodiments;

FIG. 29 shows a hybrid service scenario according to embodiments:

FIG. 30 shows a DVB-I service list discovery procedure according to embodiments:

FIGS. 31A, 31B, and 31C illustrate a DVB-I service list acquisition method according to a delivery method in DVB-I discovery according to embodiments:

FIG. 32 shows the protocol structure in which DVB-I is implemented in a communication network (5G);

FIG. 34 shows a group message acquisition method through a service ID according to embodiments.

FIG. 35 shows a group message acquisition process according to embodiments:

FIG. 36 shows a DVB-I list service discovery procedure according to embodiments:

FIG. 37 shows extension of a DVB-I service list offering delivery type for 5GBC according to embodiments:

FIG. 38 shows a DVB 5GBC delivery type according to embodiments:

FIG. 39 shows DVB-I service instance type (ServiceInstanceType) extension for supporting 5GBC according to embodiments:

FIG. 40 shows a DVB 5GBC delivery parameter type according to embodiments:

FIGS. 41A and 41B show a 5GBC service acquisition process according to embodiments:

FIG. 42 shows 3GPP 5G transmission system information and information for connection between DVB-I applications according to embodiments:

FIG. 45 shows a service list registry query method and service entry point extension method for accessing an MBMS SA channel in a DVB-I standard-based 5G media client according to embodiments:

FIG. 46 shows Extensions of DVB-I service over 5G types and service instance according to embodiments:

FIG. 47 shows a service type extension according to embodiments:

FIG. 48 shows ServiceInstanceType according to embodiments:

FIG. 49 shows DASHDelivery Parameters Type according to embodiments:

DETAILED DESCRIPTION

Figure 1:
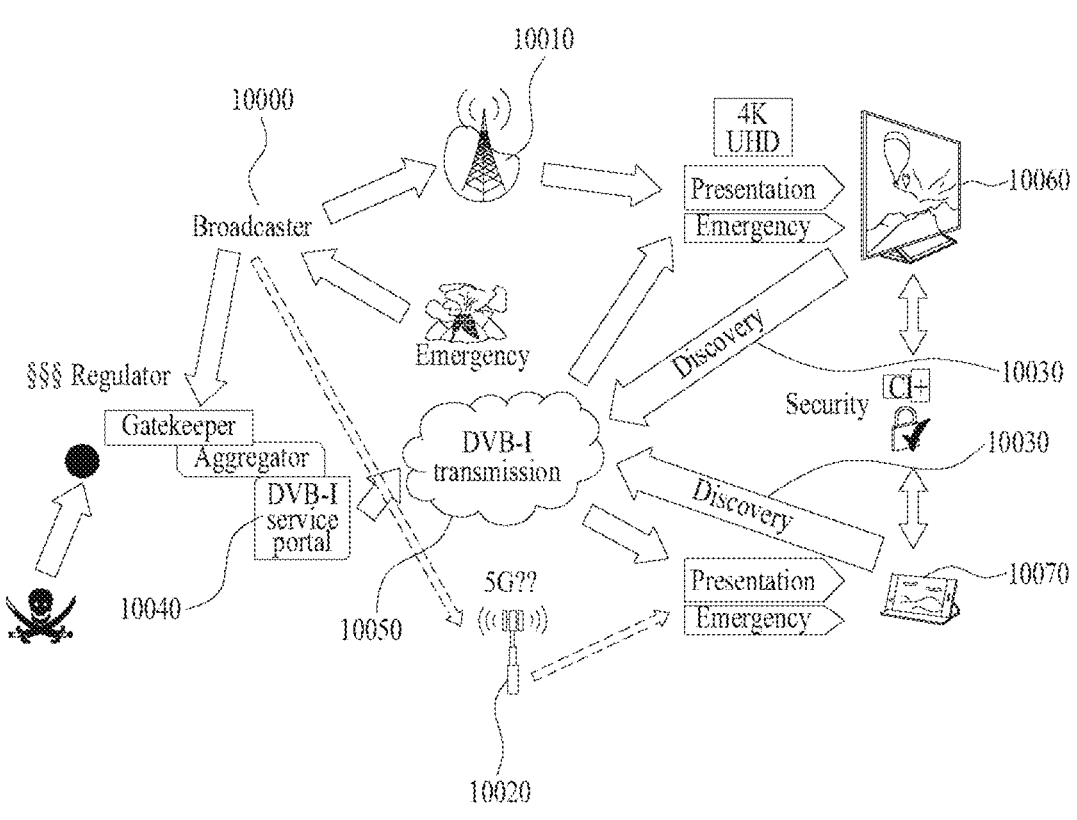
FIG. 1 shows a service scenario according to embodiments.

Hereinafter, embodiments of the present disclosure will be described in detail with reference to the accompanying drawings. The same or similar components are given the same reference numbers and redundant description thereof is omitted. The suffixes "module" and "unit" of elements herein are used for convenience of description and thus are used interchangeably and do not have any distinguishable meanings or functions. Further, in describing the embodiments disclosed in this specification, if a detailed description of related known techniques would unnecessarily obscure the gist of the embodiments disclosed in this specification, detailed description thereof will be omitted. In addition, the attached drawings are provided for easy understanding of the embodiments disclosed in this specification and do not limit technical idea disclosed in this specification, and the embodiments should be construed as including all modifications, equivalents, and alternatives falling within the spirit and scope of the present disclosure.

It is apparent that the following embodiments are intended to embody the present disclosure and are not intended to limit or restrict the scope of the present disclosure. All techniques easily conceivable by those skilled in the art from the detailed description and embodiments of the present disclosure are interpreted as belonging to the scope of the present disclosure.

The following detailed description is to be construed in all aspects as illustrative and not restrictive. The scope of the present disclosure should be determined by reasonable interpretation of the appended claims and all changes which come within the equivalent scope of the present disclosure are within the scope of the present disclosure.

Reference will now be made in detail to the exemplary embodiments of the present disclosure, examples of which are illustrated in the accompanying drawings. The detailed description, which will be given below with reference to the accompanying drawings, is intended to explain exemplary embodiments of the present disclosure, rather than to show the only embodiments that can be implemented according to the present disclosure. The following detailed description includes specific details in order to provide a thorough understanding of the present disclosure. However, it will be apparent to those skilled in the art that the present disclosure may be practiced without such specific details. Although most terms used in the present disclosure have been selected from general ones widely used in the art, some terms have been arbitrarily selected by the applicant and their meanings are explained in detail in the following description as needed. Thus, the present disclosure should be understood based upon the intended meanings of the terms rather than their simple names or meanings. In addition, the accompanying drawings and the detailed description should not be construed as limiting the embodiments set forth herein and should be interpreted as covering all equivalents to the embodiments disclosed in the accompanying drawings and the detailed description or other substitutions.

A media data processing method/device according to embodiments may refer to a media data transmission/reception method/device. The media data processing method/device according to the embodiments may be simply referred to as a method/device according to the embodiments.

The method/device according to embodiments relates to a method for discovering and acquiring Internet-based broadcasting-related media data (which may be referred to as a service).

FIG. 1 shows a service scenario according to embodiments.

The method/device according to the embodiments may provide a method for supporting DVB-I standard based multi-viewport user personalization.

The method/device according to the embodiments may provide a communication network extension method such as extension to DVB-I over 5G and 6G.

The method/device according to the embodiments may provide an additional web image extension considering DVB-I backward compatibility.

Embodiments provide a service discovery scheme to provide an Internet-based broadcast service.

Embodiments propose additional information that should be defined for Internet-based broadcast service identification.

Embodiments provide a system mechanism for acquiring Internet-based broadcast service signaling.

Embodiments propose a versioning/expiration management method for each service and a selective parsing and storage method for each service in receiving an aggregated service list.

Embodiments propose a channel management method carried out when an Internet linear channel is hidden/selectable/inactive.

Embodiments propose a service discovery signaling scheme to provide an Internet-based broadcast service.

Embodiments provide a service list metadata envelope structure used in transmitting a fragmented service list for each unique service in a multipart/related container.

Embodiments provide a method for indicating a current channel state to the user or providing an alternative channel when the user directly accesses the current channel in the hidden/selectable/inactive case of an Internet linear logical channel.

According to embodiments, a receiver not equipped with a traditional tuner may be allowed to perform Internet-based broadcast service discovery and acquirement over a broadband network.

According to embodiments, in receiving an aggregated service list, a versioning/expiration management method for each service and selective parsing and storage of each service may be performed, thereby eliminating the need to receive the entire aggregated service list.

According to embodiments, a better media service may be provided by blocking a logical channel service that fails to provide broadcasting and causes inconvenience to users and providing an Internet return channel alternative service when the Internet linear channel is hidden/selectable/inactive.

The traditional IP-based linear channel service is operated in a manner that authentication is granted through the subscription of a specific provider (e.g., an ISP, a network operator) and an IP linear service is received through the set-top box (STB) provided by the provider. In addition, recently, connectivity TVs have been introduced, thereby making a set-top boxless (STB-less) IP linear service available. Representative standard technologies are ATSC 3.0, IBB, and HbbTV. Clients may be provided with various linear rich-media services by operating an application on the OS platform inside the TV. Various operators provide their own developed service application to be installed on the TV platform, and the application defines a server that may receive data for the service and APIs that enable request/reception. On the basis of the life cycle, the client may access the app through the TV UI and receive various services through the app.

In North America and Europe, the popularity of OTT channels is as high as watching linear TV worldwide, and the OTT has become an essential media application for IP-based devices with the expansion of the OTT market. However, the influential form of OTT has become an exclusive service through its own platform and a service eco-system dedicated to the OTT. In other words, the OTT forms its own app-ecosystem consumption pattern in terms of codec, protocol stack, application, browser, and the like that only each OTT provides.

In this regard, embodiments propose a method and an device that may address issues such as the exclusive platform of OTTs and dependency on the operation of applications.

Embodiments propose a service that discovers a service by which a service is discovered at a receiver native level and a client accesses an accessible service server and receives a linear service, in contrast with conventional technology that requires an App to be executed to provide a channel UX similar to the terrestrial (T), satellite(S), or cable (C) linear channel service.

In addition, embodiments propose a service scenario in which the OTT's own platform is integrated into a single unified TV native platform to allow users to receive and view OTT content on a channel without executing an OTT app.

Referring to FIG. 1, a broadcaster 10000 may transmit a service on a terrestrial (T), satellite(S), or cable (C) channel 10010 and an Internet channel 10020 simultaneously. Service providers and manufacturers of devices capable of receiving a DVB-I service 10050 may obtain authentication of a service channel through regulation and provide Internet channels through existing linear services and channel aggregators.

In order to present a list of existing linear broadcasting channels (for example, terrestrial, satellite, and cable channels) and an Internet channel list in an aggregated form, bootstrap 10030 may be operated based on service discovery information provided over the existing linear network.

On the broadcaster side, the existing traditional service provision type may be extended, and additional services may be provided in the form of an on-demand/multicast service along with the existing linear channel network. In addition, a personalization service may be provided through a connection-based usage report of an Internet channel.

From the perspective of TV/STB manufacturers, by providing a channel list 10040 aggregating OTT services with traditional T/S/C channels, opportunities to provide various services and expand the functions of the terminal may be obtained.

In the case of the network/ISP, OTT contents may be aggregated through their network infrastructure to expand service provision. In addition, through dynamic allocation of unicast/multicast, delivery performance enhanced compared to that of a terminal providing a non-management network-based service may be provided.

In other words, the broadcaster 10000 may transmit broadcast data over the traditional broadcast network 10010 and the Internet network 10020. A reception device according to embodiments, for example, a TV 10060 or a second device 10070 may make a request for the service discovery 10030 of the broadcast data to the DVB-I provider or server 10050, and receive the aggregated DVB-I service list 10040. Thus, service signaling may be performed on both the traditional linear channel and the Internet channel without the process of installing and executing a separate app at the native level.

The method/device according to the embodiments may address issues disclosed below; based on the structure shown in FIG. 1.

When the next/now guide information is provided through a metadata update period, the end point of the request for the entire service list or an individual service may be the same. The limitation that an individual period cannot be configured for each service and that protocol communication must be performed with the same endpoint may be resolved through (a minimumMetadataUpdatePeriod in the DVB-I service hierarchy (see FIG. 15, etc.) according to embodiments.

When the manufacturer service repository is added to one of the DVB-I service discovery entities in the central service repository or the private repository, information for handling supportable device capabilities may be provided.

That is, information for determining whether the service list required by a client is supportable within the device may be provided.

In the DVB-I according to the embodiments, a service may be mainly received based on a service list. Each service list may be operated and managed by a specific repository. A repository providing the existing DVB broadcasting list may define a DVB-I service list in a manner of allocating an LCN based on the country or specific region due to the characteristics of the current European broadcasting service. On the other hand, specific DVB-I service list providers collect independent services regardless of regions and define an LCN list, and accordingly LCN allocation may be configured as desired by the service list providers. Therefore, in this background, there is a potential issue of channel collision when the DVB-I client receives and merges multiple service lists.

In DVB-I over 5G, the service should be smooth and continuous between delivery routes supported by multiple distributions, and should be provided through efficient and flexible connection according to the optimal network environment.

There is no issue in service continuity and synchronization because media data is received only through the restful API at a location specified in the service app regardless of the existing network connection type. On the other hand, in the case of DVB-I for 5G, the bootstrapping process may differ among the types of networks, and the bootstrapping method and location may depend on the infrastructure of the operators.

The propagation delay delivered varies according to the network characteristics. Thus, in the case of a linear service, each network may provide a different environment for the reference time and media characteristics.

Discovery URL and media location URL differ among operators, and it is difficult to perform complete switching in the middle of the media.

There are no clear reference for determining the need for switching within the network and the degradation of signal quality.

In configuring a user interface (UI) through a service list and presenting the service list to users, it is not clear how specific information such as audio, video, and subtitle information should be presented. Further, in contrast with conventional broadcast transmission, an acquisition path of audio, video, and subtitles constituting content such as high dynamic range (HDR)/high frame rate (HFR) is present at a multimedia presentation description (MPD) level, and thus information may not be known at the stage of service UI configuration.

A predefined TVA attribute contains only basic information (framerate/resolution) related to audio, video, and subtitles and is thus insufficient for user access/download.

There is a need for additional requirements for a user personalization service in a DVB-I service, and embodiments provide a solution to overcome limitations of technical configuration that is difficult to support in the current DVB-I standard.

Embodiments provide a service discovery scheme to provide an Internet-based broadcast service.

Embodiments propose additional information that should be defined for Internet-based broadcast service identification.

Embodiments provide a system mechanism for acquiring Internet-based broadcast service signaling.

Embodiments propose a versioning/expiration management method for each service and a selective parsing and storage method for each service in receiving an aggregated service list.

Embodiments propose a channel management method carried out when an Internet linear channel is hidden/selectable/inactive.

Embodiments may provide a method of addressing an issue of presenting the information of the existing program guide rather than the up-to-date information about the content currently being consumed when a live program of the DVB-I service is over-running.

A new element and end point extension to which an individual period is applicable for each service may be implemented.

When the DVB-I client receives and merges multiple service lists, the issue of channel collision may be addressed.

Proper alignment may be provided between service instances such that switching between service instances delivered over different networks may be recognized to be reasonably smooth.

Switching between DVB-I service instances including 5GBC, 5GMS, and OTT (non-5G networks such as LTE and Wi-Fi) may be performed.

Embodiments extend service instances such that essential information for content selection may be displayed on a service/content guide UI based on information provided by a service discovery server or a service list server.

Embodiments extend, through TVA attribute extension, information that is incapable of being provided by an existing scheme and extend ClassificationSchemeType for defining specific video information.

Subpicture information in an MPEG versatile video coding (VVC) codec is merely coordinates/size indicating a position, additional information for control at a CTU level, required in a video encoding process, or location information from the perspective of the codec and does not mean specific coordinates or pixel locations for rendering. In other words, information about a rendering position is not defined, and thus additional related extension is required Embodiments propose a service discovery signaling scheme to provide an Internet-based broadcast service.

Embodiments provide a service list metadata envelope structure used in transmitting a fragmented service list for each unique service in a multipart/related container.

Embodiments provide a method for indicating a current channel state to the user or providing an alternative channel when the user directly accesses the current channel in the hidden/selectable/inactive case of an Internet linear logical channel.

To address issues such as over-running of a live program of the DVB-I service and provision of information of the existing program guide in place of the up-to-date information about the content currently being consumed, the following information may be used according to embodiments: (1) reference time information for applying a dynamic polling interval: (2) an offset of x see from the reference time information (e.g., DVB-I service availability end time); (3) a polling interval to be newly applied; and (4) version information for comparison with the existing information.

The method/device according to the embodiments may perform dynamic polling based on the above information and @MinimumMetadataUpdatePeriod.

In allocating a logical channel number corresponding to a single service, an indication that the corresponding channel is a channel to which dynamic polling is applied instead of a static pull method may be provided.

When the now/next content guide source currently consumed is acquired in the DVB-I hierarchy, the information of @ScheduleEndPoint in ContentSourceType may be defined as the same end point in the service list type and the service list, and related information may be requested and received. Information about individual intervals may be acquired for each service.

scheduleInfoEndPoint may be generated to request and receive event information in a specific interval.

The DVB-I client may receive service discovery entities in the bootstrapping process, and display list entries filtered according to language, country, region, and postcode. Service entities and their service entity repositories adapted to the user selection or environment may be searched. In this case, the service list repository operated by a manufacturer may be searched and device capability information for checking whether the service list is supported may be defined.

When the DVB-I client receives and merges multiple service lists, a specific condition may be assigned to the channel allocated to each service such that channel management may be performed within the DVB-I client. To this end, <LCNTableEntry Type> may be extended in the current DVB-I service list scheme.

The service list scheme may be extended to support time alignment between service instances delivered over different networks.

To support service instance switching, the DASH delivery parameter may be extended in the following DVB-I service list scheme.

According to embodiments, by extending related information, criteria for service selection may be clarified for the user. In addition, from the receiver perspective, clear information may be presented on a UI/UX by performing service filtering.

Embodiments may propose a solution for a scene description and rendering information for displaying VVC encoding-based subpictures.

In embodiments, scene description information may be extended at a position at which video characteristics are defined in DVB-I and DASH layers, which are system layers, and information of a hierarchy actually encapsulating a subpicture may be referenced.

In embodiments, receiver operation and receiver backward compatibility for supporting a related use case may be considered.

A receiver not equipped with a traditional tuner may perform Internet-based broadcast service discovery and acquirement over a broadband network.

In receiving an aggregated service list, a versioning/expiration management method for each service and selective parsing and storage of each service may be performed, thereby eliminating the need to receive the entire aggregated service list.

A better media service may be provided by blocking a logical channel service that fails to provide broadcasting and causes inconvenience to users and providing an Internet return channel alternative service when the Internet linear channel is hidden/selectable/inactive.

When tune-in or channel change is performed, the device according to the embodiments may display up-to-date information about a corresponding channel rather than showing the guide of an over-running program.

A client-side algorithm for DVB-I dynamic polling may be defined in the entire attributes of the content guide at the service list level to control the polling operation of the entire content guide, or may be defined at the service level to apply the dynamic polling algorithm to individual services.

A separate caching module configured to manage a logical channel database corresponding to the service in the DVB-I client may dynamically process the attribute of the channel to pre-indicate that the dynamic polling algorithm is applied to the channel in updating services at once or individually.

In updating the DVB-I service event or content guide information, the up-to-date information in the client may be updated by adding an end point for updating individual intervals for each service.

Depending on the device, service entities and service entity repositories thereof adapted to the user selection or environment may be searched, and a service list supported by a specific manufacturer may be retrieved to provide an opportunity to consume the services.

When the DVB-I client receives and merges multiple service lists or receives an additional service list on the default legacy channel, a channel ordering method that may reflect the intention of the service provider and be handled by the DVB-I client without any issue may be provided.

A service should be smooth and continuous between delivery routes supported by multiple distributions including 5GBC, 5GMS, and OTT in DVB-I, and may be provided to users through efficient and flexible connection according to the optimal network environment.

Embodiments may clearly present a service that may be currently provided to the user through extended information, induce reasonable selection, and clarify criteria for service selection.

Embodiments may provide a personalized service by transmitting several subpictures in a DVB-I based service and providing different viewports according to modes.

For the method/device according to the embodiments, reference may be made to document DVB-I A177.

The traditional IP-based linear channel service is operated in a manner that authentication is granted through the subscription of a specific provider (e.g., an ISP, a network operator) and an IP linear service is received through the set-top box (STB) provided by the provider. In addition, recently, connectivity TVs have been introduced, thereby making a set-top boxless (STB-less) IP linear service available. Representative standard technologies are ATSC 3.0, IBB, and HbbTV. Clients may be provided with various linear rich-media services by operating an application on the OS platform inside the TV. Various operators provide their own developed service application to be installed on the TV platform, and the application defines a server that may receive data for the service and APIs that enable request/reception. On the basis of the life cycle, the client may access the app through the TV UI and receive various services through the app.

In North America and Europe, the popularity of OTT channels is as high as watching linear TV worldwide, and the OTT has become an essential media application for IP-based devices with the expansion of the OTT market. However, the influential form of OTT has become an exclusive service through its own platform and a service eco-system dedicated to the OTT. In other words, the OTT forms its own app-ecosystem consumption pattern in terms of codec, protocol stack, application, browser, and the like that only each OTT provides.

Currently, for DVB-I, a reference client application is being developed in the industry based on the A177 document. The DVB-I standardization group is identifying development related issues and problems of the current standard and proceeding with clarification for appropriate extension and smooth development.

A method to solve an over-running issue while maintaining backward compatibility of DVB-I phase 1 has been devised.

When a client-side algorithm for DVB-I dynamic polling is applied, a different role and receiver operation are performed according to DVB-I service hierarchy, and thus the receiver operation according to the position of @MinimumMetadataUpdatePeriod has been described above.

Since a content guide manager and a service list manager perform separate parsing and caching processes and need to indicate a channel that may be dynamically changed in the process of managing acquired LCN DB information, the information is extended.

In allocating a logical channel number corresponding to a single service, indication information indicating that the corresponding channel is a channel to which dynamic polling, rather than a static pull scheme, is applied may be added.

In the DVB-I phase 1 scheme, data is received according to the pull-only method, and accordingly it may not be checked whether the up-to-date information of the code level is acquired. In this technical background, in order to update the up-to-date information, the DVB-I client of the device according to the embodiments may address the issue through a specific polling interval.

In the current service hierarchy, event information may be acquired at once from a service list or service level. However, since the method is the same at both levels, and thus updating a specific interval for each individual service may be impossible, a corresponding solution is proposed.

In this regard, the disclosure proposes a method and an device that may address issues such as the exclusive platform of OTTs and dependency on the operation of applications.

Embodiments propose a service that discovers a service by which a service is discovered at a receiver native level and a client accesses an accessible service server and receives a linear service, in contrast with conventional technology that requires an App to be executed to provide a channel UX similar to the terrestrial (T), satellite(S), or cable (C) linear channel service.

In addition, embodiments propose a service scenario in which the OTT's own platform is integrated into a single unified TV native platform to allow users to receive and view OTT content on a channel without executing an OTT app.

Figure 2:
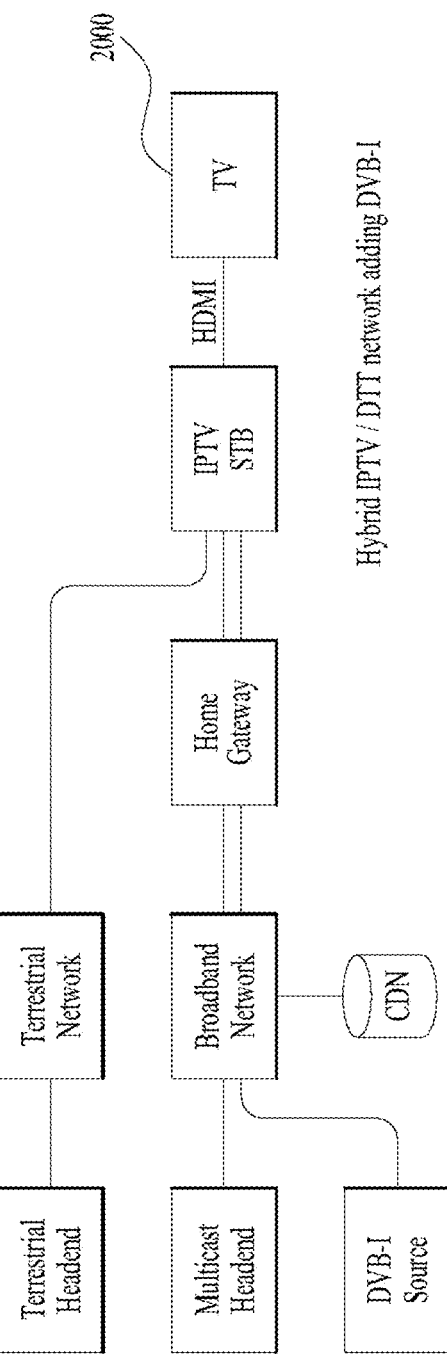
FIG. 2 is a flowchart of an operation according to embodiments from the perspective of a network operator/ISP according to embodiments.

FIG. 2 is a flowchart of an operation according to embodiments from the perspective of a network operator/ISP according to embodiments.

The device 20000 according to the embodiments may be a TV receiver. That is, it may be a device according to a hybrid IPTV/DTT network that supports DVB-I service. The reception device 20000 may be connected to an STB. The connection may be established by, for example, HDMI. The IPTV STB may receive a terrestrial broadcast signal from a terrestrial headend over a terrestrial network, and may receive various services and/or data from a multicast headend, which provides multicast services, a DVB-I source, which provides DVB-I services, and/or a content delivery network (CDN), which provides Internet content or the like, through a home gateway and a broadband network.

In particular, in the case of OTT, an OTT application suitable for a different OS environment is separately provided for each existing terminal. However, the method/device according to the embodiments may use a service through an industry standard based ecosystem without such a separate application. This provides a common service interface, thereby providing a convenient and efficient service access.

Figure 3:
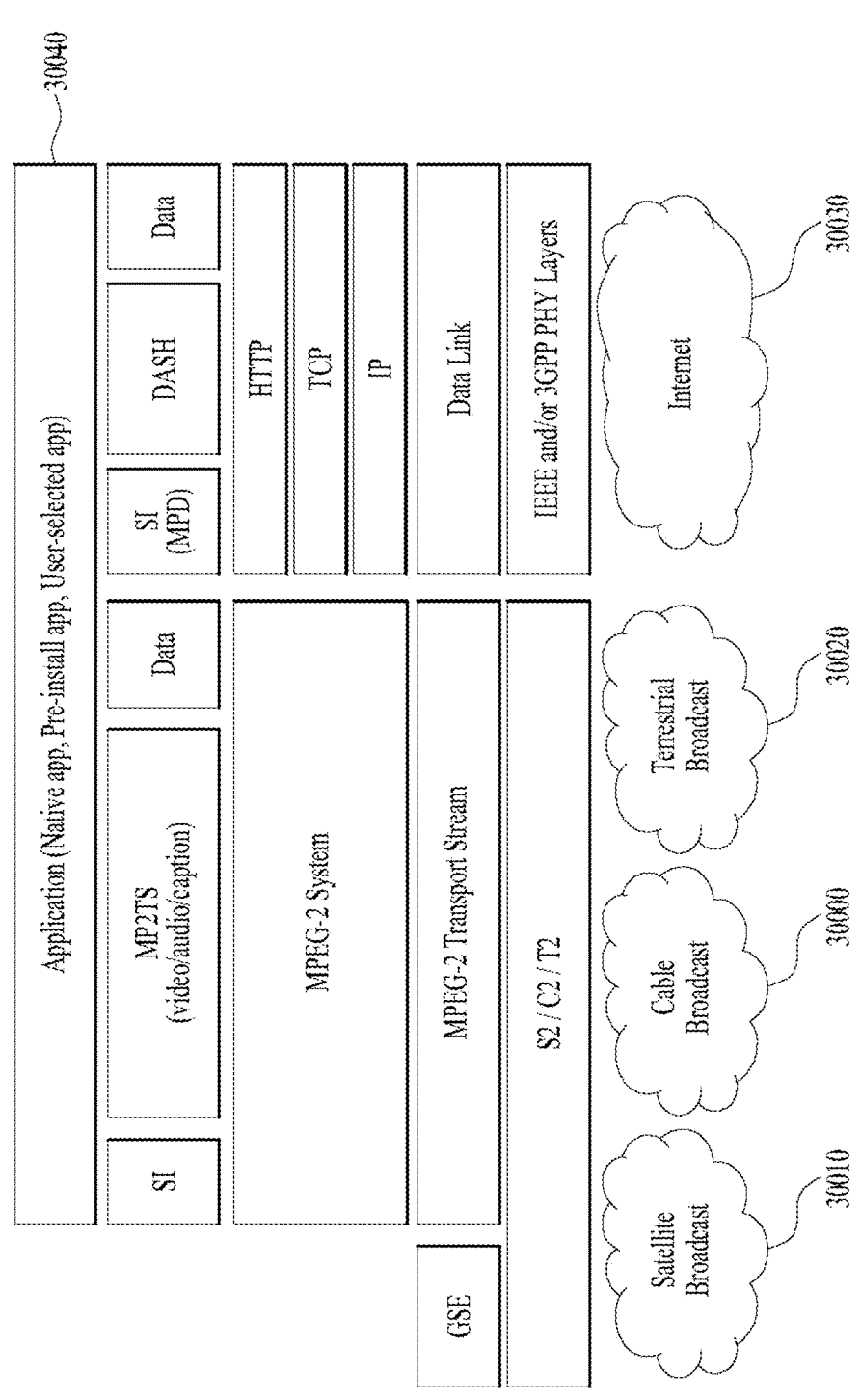
FIG. 3 shows a stack of protocols for DVB channel services according to embodiments.

FIG. 3 shows a stack of protocols for DVB channel services according to embodiments.

The TV device 20000 of FIG. 2 may perform the scenario of FIG. 1 based on the protocol structure of FIG. 3.

Services according to embodiments include DVB C/S/T/I services. Based on the protocol stack structure constituting the DVB-C(30000)/S (30010)/T (30020)/I (30030) service of FIG. 3, the embodiments propose a mechanism for discovering a DVB-I service transmitted through the Internet and a signaling scheme therefor. The method/device according to the embodiments may drive an application through service discovery, and an application 30040 according to the embodiments may include a native application, a pre-installed application, and a user-selected application.

Figure 4A:
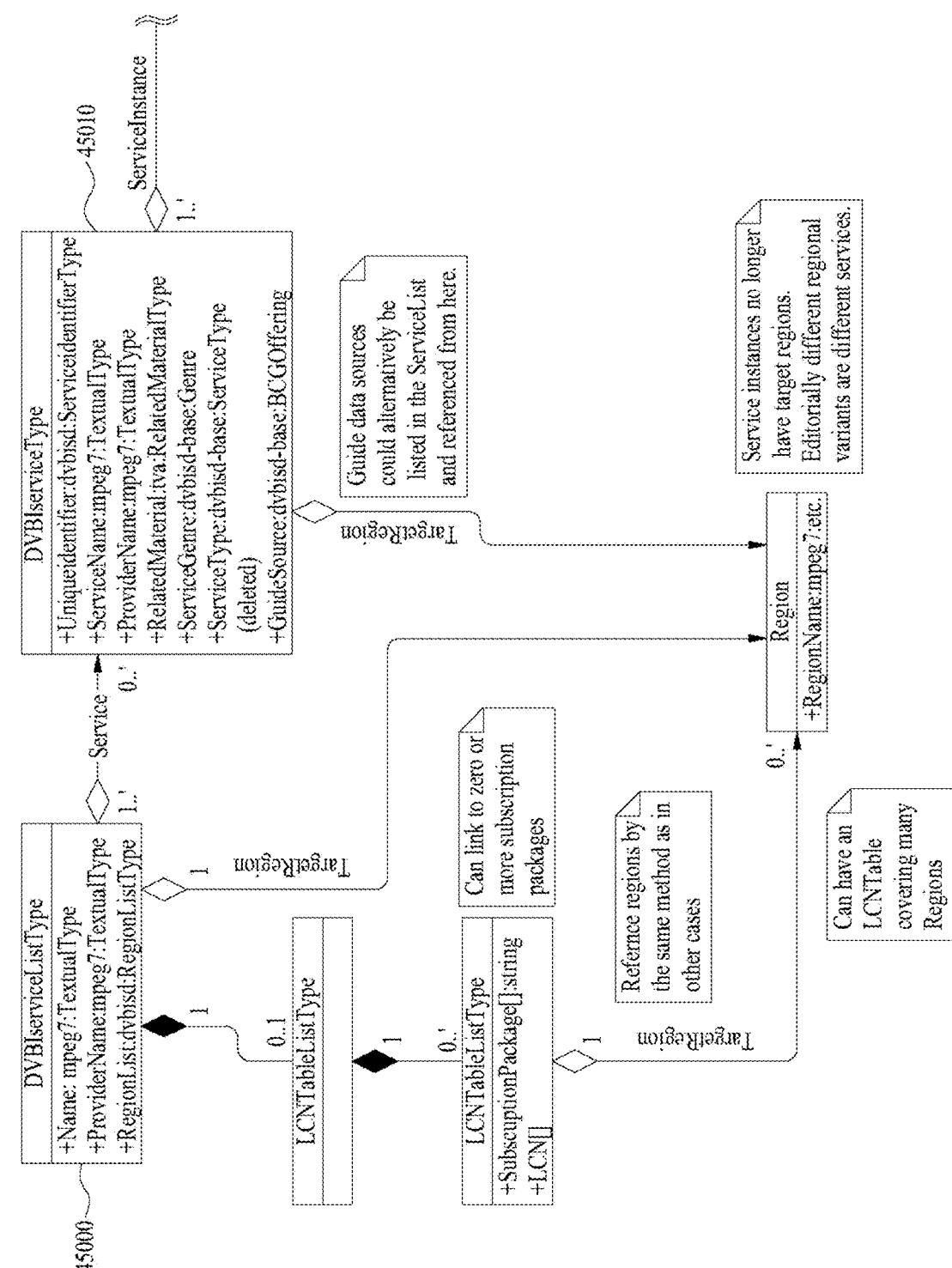
FIGS. 4A and 4B show a service list hierarchy according to embodiments.
Figure 4B:
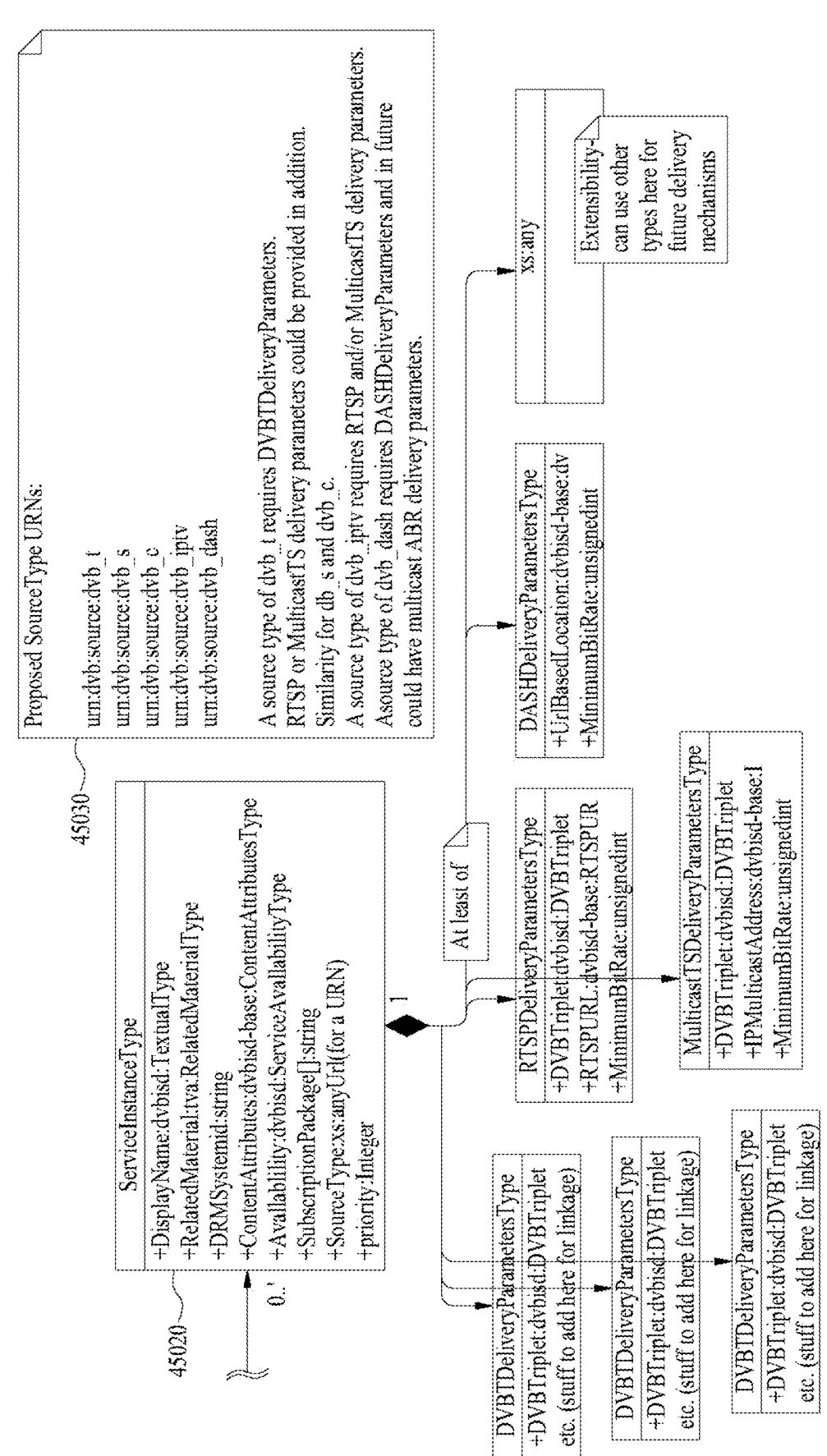

FIGS. 4A and 4B show a service list hierarchy according to embodiments.

The service list hierarchical structure of FIGS. 4A and 4B is for the service scenario of FIG. 1.

The DVB-I service list may contain respective services, and each service may contain service instances. Multiple service instances may be defined according to each delivery network, and uniqueness may be distinguished according to the URN of source_type.

The DVB service list type 45000 may reference the DVB-I service type 45010 for each service. The DVB-I service type 45010 signals a related material and a guide source. The DVB-I service type 45010 may reference the service instance type 45020 for each service instance. The service instance type 45020 signals a subscription package for the related material and a source type for URN. The service instance type may reference at least one of a delivery parameter type for DVB T/S/C, an RTSP delivery parameter type, a multicast delivery parameter type, or a DASH delivery parameter type.

The proposed source type URNs 45030 provide URNs for DVB T/S/C/IPTV/DASH, etc.

The DVB service list type 45000 references the LCN table list type, and the LCN table list type references the LCN table type. The LCN table type, the DVB service list type 46000, and the DVB-I service type 45010 may reference REGION. Related region information may vary among services.

Details of the elements of FIGS. 4A and 4B will be described with reference to each of the subsequent drawings.

FIGS. 5A and 5B shows a DVB-I service list type according to embodiments.

FIGS. 5A and 5B shows service list information included in FIGS. 4A and 4B.

ServiceList, which corresponds to the ServiceList is a list of details and locations of IP services offered by the service provider. The service provider may divide their services into multiple service lists. This attribute is mandatory.

Name is the name of a service list in a readable form. Multiple service list names may be expressed in different languages. This attribute is mandatory.

ProviderName is the name of the provider of the readable service list. Multiple values for the provider name may be described in different languages. This attribute is mandatory.

RelatedMaterial indicates an additional material related to the service. This attribute is optional.

RegionList is a list of geographic regions with logical identifiers that are used to provide regional information of services in the service list or the service list. This attribute is optional.

TargetRegion represent the identifiers of the regions specified in the RegionList for which this service list is targeted. This attribute is optional.

LCNTableList is a list of tables that define regionalized and packaged logical channel numbers for the respective services. This attribute is optional.

Service represent services that are part of the service list. This attribute is optional.

@version is the version number of the service list. The value is incremented for every published change. This attribute is mandatory.

FIGS. 6A and 6B shows a DVB-I service type according to embodiments.

The DVB-I service type of FIGS. 6A and 6B describes the service type in the form of a table.

UniqueIdentifier is the unique ID of the service. This ID may never be changed for a service. Other parameters of this service may be changed. This attribute is mandatory.

Service Instance is an instance having A/V content for this service. When multiple elements of the type of this attribute are present and available, the one with a lower value of the @priority attribute may have a higher priority (or vice versa). All service instances for a given service may have the same content. This attribute is optional.

TargetRegion is the regions where the service is received. When not specified, no region constraints exist. This attribute is optional.

ServiceName is the name of the service. Service names may be specified in various languages. This attribute is mandatory.

ProviderName is the readable provider name of this service. This element may be specified in various languages and is mandatory.

RelatedMaterial is an additional material related to the service. The material may include, for example, out of service banners, service related applications, and service logos. This attribute is optional.

ServiceGenre is the genre of the service. ServiceGenre is optional.

ServiceType is the type of service (refer to the description in ETSI EN 300 468). ServiceType is optional.

RecordingInfo is information allow a DVB-I client to determine whether or not the content from this service is recorded, time-shifted, or redistributed. RecordingInfo is optional.

GuideSource is the details of a broadband content guide carrying metadata for this service. GuideSource is optional.

@version is the version number of this service. It is incremented for every published change. @version is mandatory.

FIGS. 7A, 7B, and 7C show a service instance type according to embodiments.

Elements of the service instance type will be described with reference to FIGS. 7A, 7B, and 7C.

Display Name is a readable name of the service associated with a specific service location. Multiple service names may be specified in various languages. When not present, the ServiceName field may be used. This attribute is optional. In the present disclosure, an attribute may correspond to an element, a field, information, or a value according to a level, and may be referred to by various terms.

RelatedMaterial is an additional material related to the service. Specifically, it may include a no-service banner, service related applications, service logos, and the like. A related material with a specific value of the attribute How-Related, which is provided within a ServiceInstance element, supercedes any corresponding related material with the value of How Related provided within a Service element. This element is optional. Alternatively, a property corresponding to @href sting may be acquired from How Related.

DRMSystemId indicates any content projection schemes used for the service. The value may be the same as the @schemeIdURI defined in document DVB A168. This value is optional.

For ContentAttributes, reference may be made to Annex D.1.3.2 of ETSI TS 103 205. ContentAttributes is optional.

Availability indicates the period in time when this service location is expected to be active. This value is optional.

SubscriptionPackage specifies a subscription package in which this service is included. This value is optional.

FTAContentManagement: DVB-I service instances that do not use DRM may carry an FTAContentManagement element to define the content management policy for the ServiceInstance. The semantics of each attribute may be specified in the corresponding fields of FTA_content_management_descriptor, which is a descriptor in document ETSI EN 300 468. This value is optional.

SourceType identifies the primary delivery source for this service instance. SourceType determines the required delivery parameters. This value is optional.

DVBTDelivery Parameters provides delivery parameters for DVB-T serviceS.

DVBSDelivery Parameters provides delivery parameters for DVB-S services.

DVBCDelivery Parameters provides delivery parameters for DVB-C services.

RTSPDelivery Parameters provides delivery parameters for RTSP-based services.

MulticastTSDelivery Parameters provides delivery parameters for services delivered using multicast UDP.

DASHDelivery Parameters ( ) provides delivery parameters for services using DVB DASH delivery.

SATIPDelivery Parameters provides parameters that a DVB-I client supporting SATIP may use to receive a service instance from an SATIP server.

The above-mentioned parameters may be described according to the SourceType.

@priority indicates the priority of this service instance relative to the other service instances of the service. This value is optional.

FIG. 8 shows DASH delivery parameters for simulcast according to embodiments.

UriBasedLocation: Refer to Annex D.1.3.2 of ETSI TS 103 205 [2] for semantic definition.

MinimumBitRate: Threshold bit-rate under which an alternative source for the same service should be preferred, if available.

This shows DASHDelivery Parameters for simulcast in a table form according to embodiments.

This is the detailed syntax of the above-described DASHDelivery Parameters.

The DASHDelivery Parameters according to the embodiments may be additionally extended for simulcast.

UriBasedLocation may refer to Annex D.1.3.2 of document ETSI TS 103 205. It is mandatory. When the DASH service is simulcast, this value may provide location information based on the URI.

MinimumBitRate indicates a threshold bit-rate at which an alternative service for the same service should be preferred. This value is optional.

As a child element of the DVB-I service type, a service interface may be provided according to the delivery network. The reception device may determine a service instance as a client in consideration of each @priority and device capability.

Here, @aminimumBitrate indicates throughput in terms of a network stack for receiving a stream within a service instance.

For example, @minimumBitrate according to the embodiments may indicate throughput in terms of a network stack for receiving a stream within a service instance. That is, the device according to the embodiments may identify, through the minimum bitrate information, the minimum bitrate at which the network may currently receive the DASH service.

Based on the information, it may be determined whether the service instance is playable. However, in the case of the currently defined information, when multiple service instances are contained in DVBiservicetype, it is difficult for the client to select a service instance based only on the information of @minimumBitrate.

For example, since the minimumbitrate for determining playability is a minimum condition, the fallback condition between bitstreams may not be satisfied by satisfying the minimum condition alone.

For example, it is assumed that there are two service instances as follows.

(Service instance 1) DVB-T delivery method, HD, H.264/AVC (Service instance 2) DVB-I DASH delivery method, MinimumBitRate 1.5 Mbps For example, when there are two service instances (e.g., service instance 1 and service instance 2), a client related to the transmission/reception device according to the embodiments is an HEVC UHD capable terminal, and the network situation above the bitrate of the other comparison target can be ensured, the receiver (terminal) should request service instance 2 (e.g., HEVC UHD). However, unless the MPD is received through a request, the receiver may not know, from the current information, an attribute indicating that a stream of better quality than instance 1 is included. Receiving and comparing all MPDs of all service instances may be not only a burden from the perspective of the receiver, but also an issue in reasonable network selection. A scheme for providing a better service between instances within DVB service scheme information is proposed below. That is, embodiments may be implemented in which the burden of the receiver parsing/analyzing all MPDs or similar signaling information is eliminated and the receiver is allowed to quickly identify and request a better service instance in response to the network situation of a specific bitrate or higher.

FIG. 9 shows a scheme for selecting a service instance based on DASHDelivery Parameters Type according to embodiments.

The DASH Delivery ParametersType may include ComparisonBitRate and ComparisonContentAttributeType. The ComparisonContentAttributeType may include AudioAttributes, VideoAttributes, CaptionLanguage, and SignLanguage as elements.

The ComparisonContentAttributeType may correspond to the element ContentAttributes included in the ServiceInstanceType 45020.

The DASHDelivery Parameters Type may include ComparisonContentAttributeType. Also, the ComparisonContentAttributeType may include ComparisonBitRate along with the elements AudioAttributes, Video Attributes, CaptionLanguage, and SignLanguage.

ComparisonBitRate and ComparisonContentAttributeType, which are common elements in Options 1 and 2, may be defined as follows.

@ComparisonBitrate indicates a bitrate for handling a specific IP delivery service instance that provides a better user experience than a non-IP delivery service instance available for this service.

@ComparisonContentAttributeType indicates which video characteristic is available for the DVB-I client to provide a better user experience than the non-IP delivery service instances available for this service.

FIG. 10 shows an example of a DVB-I service instance according to embodiments.

It shows two service instances: 1 DVB-S ServiceInstance and 2 DVB-I ServiceInstance.

The ServiceInstance of 1 has priority 0, and the display name is ABC drama. AudioAttributes, VideoAttributes, and the like are signaled as attributes as shown in FIG. 56, and the ServiceInstance includes DVBSDelivery Parameters. Here, the priority '0' may be an example value. In addition, the reception device according to the embodiments may check an additional service instance in addition to the service instance to provide, through signaling information according to embodiments, a service instance capable of providing a better service to the user in consideration of not only the priority value, but also the network situation or available bandwidth and the capability of the client.

The ServiceInstance of 2 has priority 1, and the display name is ABC drama. DASHDelivery Parameters may signal the address of https://live.daserste.de/0001 Das %20Erste.mpd</dvbisd-base: URI for content of the application/dash+xml type through a URI-based location. The MinimumBitRate is IM, and the ComparisonBitRate is 7M. The ComparisonContentAttribute signals VideoAttributes through "urn: mpeg: mpeg7: cs: VideoCodingFormatCS: 2001:2.2.2" and HEVC Video Main10 Profile @Main Level</tva: Name> (UHD enable). Specifically, the value of the ComparisonBitRate may be an example value. The reception device (terminal, client, etc.) according to the embodiments checks the value of ComparisonBitRate, and recognize, from the value, that a better service is provided. For example, when a better service corresponding to the value of 7M is provided, the method/apparatus according to the embodiments may additionally define corresponding video attribute information like the ComparisonContentAttribute. Accordingly, the reception device according to the embodiments may check the presence of the UHD stream and switch the stream to a service for the ComparisonContentAttribute according to the network situation.

When the receiver receives two instances within the same service (e.g., ABC drama) in the DVB-I service scheme, the DVB-I client should select an instance that may be provided for a better user experience. When the value of @ComparisonBitrate value is identified as 7 Mbps, the available bandwidth of the current network is exceeded compared to HD, and the attribute of @ ComparisonContentAttribute is supportable by the terminal (receiver), an MPD may be requested and a better service may be received and provided to the user. The attribute indicates "beyond HD" based on @ComparisonBitrate (7 Mbps-HD), and means that a service that is enriched compared to the broadcast service instance may be provided.

Here, the bitrates IM BPS and 7MBPS may be exemplary. These values may be bitrates applied between services with different resolutions, such as UD and UHD.

According to embodiments, the use case is extended as follows.

Instance 1. HD broadcast

Instance 2. UHD DASH with representations from SD to UHD, 1.5 Mbps to 33 Mbps (with an HD Representation at 7 Mbps). MinimumBitRate 1.5 Mbps; ComparisonBitRate 7 Mbps.

That is, Instance 1 indicates HD broadcast, and Instance 2 indicates UHD DASH. Instance 2 may have representations from SD to UHD and have a bandwidth from 1.5 Mbp to 33 Mbps. In this case, the HD representation is 7 Mbps, the minimum bitrate is 1.5 Mbps, and the comparison bitrate is 7 Mbps.

A player capable of supporting UHD according to the embodiments may select Instance 2 when the bitrate is 7 Mbps.

A player capable of supporting HD without HEVC support according to embodiments selects Instance 1.

A player capable of supporting UHD and having a Wi-Fi link of 5.5 Mpbs speed according to embodiments selects Instance 1.

A player capable of supporting UHD and having a 3G mobile connection of 1 Mbps, at which a broadcast report cannot be received, according to embodiments may not have a connection fast enough to play a service, but may attempt to play the service.

According to embodiments, a player capable of supporting UHD and having a 4G mobile connection of 2 Mbps, at which broadcast cannot be received, may select Instance 2.

Figure 11:
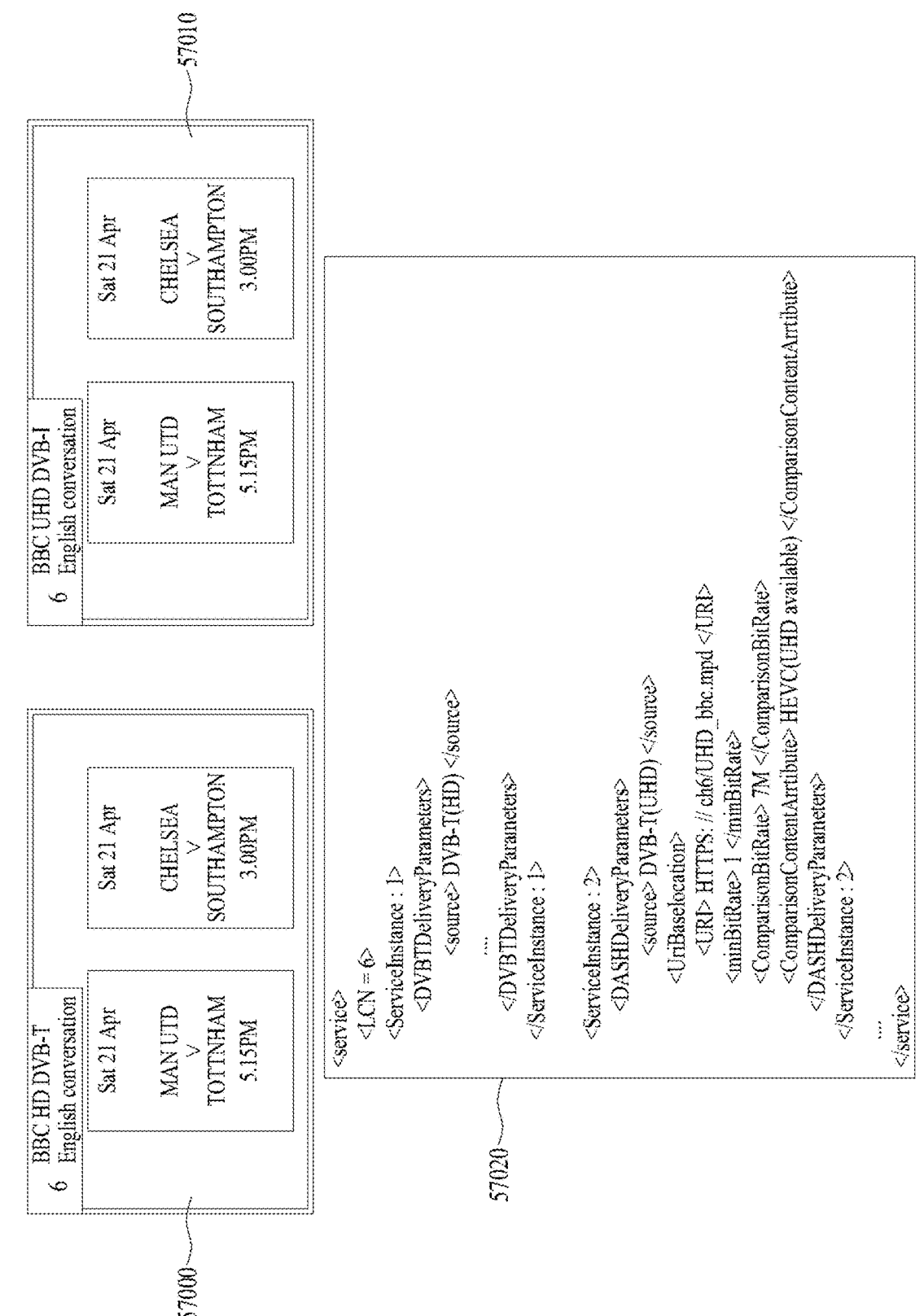
FIG. 11 illustrates a simulcast UI/UX according to embodiments.

FIG. 11 illustrates a simulcast UI/UX according to embodiments.

In the figure, part 57000 illustrates a state in which the reception device according to the embodiments displays the DVB-T broadcast service, and part 57010 illustrates a state in which the reception device according to the embodiments displays the DVB-I service. FIG. 7 illustrates that a better user experience for the same service is provided to a user according to a user's selection and/or a characteristic of the reception device, based on a signaling scheme and a UI/UX scheme according to embodiments.

Part 57020 is an example of the above-described signaling information for this purpose. It corresponds to the aforementioned service list.

The service list according to the embodiments may provide a service instance for each service. The service for parts 57000 and 57010 has logical channel number 6, and includes service instance 1 and service instance 2. Service instance 1 signals DVB-T (HD) service as shown in part 57000, and service instance 2 signals DVB-I (UHD) service as shown in part 57010.

According to embodiments, when a device capable of receiving the DVB-I service receives one or more service instances, a determination may be made such that a media service of higher quality may be provided based on the comparison bit rate value and the comparison content attribute value included. When two service instances are received as in the embodiment, a service instance that is likely to receive a better service may be quickly identified through IP/DASH. As in the embodiment, when HD and UHD are simultaneously received, a delivery type may be selected through the information.

In other words, a reception device receiving Service Instance 1 and Service Instance 2 may immediately check a better DVB-I UHD service based on the comparison bit rate value and the comparison content attribute value included in the service instance for DVB-I, without having to parse all other signaling information for all services. Based on Instance 2, the reception device may recognize through the comparison content attribute that the comparison bit rate is 7 Mbps and the resolution of the better service is UHD (HEVC). The reception device may ask the user whether to view the better service based on UI/UX. The service according to Instance 2 may be provided to the user according to the user's selection or the setting of the reception device.

The reception device according to embodiments may provide a DVB-I simulcast service UI/UX to a user. The DVB-I simulcast service UI/UX represent 1-a UI/UX that provides a better experience to a user when a DVB-I client receives multiple service instances through the extended information according to the above-described embodiments. For a terminal capable of supporting UHD/HEVC, a DVB-I service instance capable of receiving UHD may be selected in place of the DVB-T service instance capable of receiving HD. The terminal may select a service instance of high quality only through the service list scheme without having to receive all DASH MPDs.

The signaling information according to the above-described embodiments may be referred to as fields, attributes, elements, first information, second information, first value, second value, or the like.

The above-described embodiments and the embodiments to be described below may provide the following effects.

According to embodiments, an MPEG-2 system/DVB SI-based service for Internet channel scanning for providing the same user UX as the existing linear service channel may be initialized.

According to embodiments, network/stream/service unique signaling for Internet stream identification may be performed for aggregation with an existing linear channel.

According to embodiments, a method for replacing TSID in existing system information may be extended.

According to embodiments, switching of a DVB network provided on the same dedicated channel and each bit-stream provided on a DVB-I channel may be allowed.

According to embodiments, SUHD (8k) linkage may be provided through a DVB-I channel in SD, HD, and UHD linkage services provided on an existing channel.

According to embodiments, a DVB-I service list may be acquired over the existing DVB network.

According to embodiments, in order to provide a linear IP-based TV service, a service bootstrap technology of the existing linear channel network.

According to embodiments, unique information that must be defined for Linear IP based TV service identification may be added.

According to embodiments, an IP based TV channel may be added to the existing linear channel EPG.

According to embodiments, an existing DVB stream and a DVB-I stream may be simultaneously provided on the same dedicated channel, and the streams may be dynamically changed for a predetermined period.

According to embodiments, SUHD (8k) linkage may be provided through a DVB-I channel in SD, HD, and UHD linkage services provided on an existing channel.

According to embodiments, linkage information for acquiring a DVB-I service list or a query end point over the existing DVB network may be extended.

According to embodiments, a service bootstrap scheme for an existing linear channel network may be extended to provide a linear IP based TV service.

According to embodiments, linkage between the existing DVB network and the DVB-I network may be provided at the bouquet level, service level, and event level based on DVB-SI information.

According to embodiments, content of various resolutions may be provided on the same logical channel through linkage information about the existing DVB network and the DVB-I network.

According to embodiments, a DVB-I service list location and a query may be defined through a linkage descriptor (uri_linkage_descriptor) to acquire a DVB-I service list on the existing DVB network.

According to embodiments, an open DVB-I service registry may be accessed through an end point and a service list entry list suitable for a client may be acquired.

According to embodiments, a service that is accessed by a device supporting an RF-based DVB tuner through a UI in which an existing linear service and an OTT service are aggregated may be enabled.

According to embodiments, a media service that provides the same UX as existing linear channels may be provided through the open Internet without a set-top box (STB).

According to embodiments, as the existing DVB network and the Internet channel are aggregated, a resolution that may be provided on the same channel may be extended.

According to embodiments, a DVB-I service list location may be signaled due to a linkage descriptor (uri_linkage-_descriptor). The reception device according to the embodiments may efficiently acquire a DVB-I service list. In addition, due to the end point according to the embodiments, the reception device according to the embodiments may efficiently acquire a service list.

Due to the above-described embodiments, the terminal (device) according to the embodiments may acquire a service list in which all channels are aggregated, as shown in FIG. 34. The aggregated service list may include an entire list, a list desired by the reception device, and the like.

A URI by which all services may be acquired may be present. Through this URI, a URI for a list of individual services may be additionally acquired. The individual list may be a list of services for each broadcaster.

As the service platform expands, operators may provide services through more diverse environments. From the user perspective, media services received in various app environments may be offered in an aggregated reception environment called DVB-I. Accordingly, services that are more convenient and have good accessibility may be received.

With the expansion and integration of the service platform, a service may be simulcast over communication networks including terrestrial, cable, satellite, and 5G networks, and the receiver may receive a desired service according to the receiver capability.

This process may be implemented through ComparisonBitrate and/or ComparisonContentAttribute in FIGS. 54 to 57 and the like.

The MPD may contain multiple representations and also contain both UD related information and UHD related information.

The reception device has a large burden of parsing all the information of the MPD, which takes a lot of time.

On the other hand, when the DVB-I service list at the service instance level is used, the reception device may be allowed to selectively and quickly decode optimized services and rich media according to the capabilities of the reception device.

The reception device may recognize presence of services with different capabilities through ComparisonBitrate. ComparisonBitrate may be a concept of minimum throughput. Furthermore, the reception device may recognize a specific attribute of a switched service through ComparisonContentAttribute.

Figure 12:
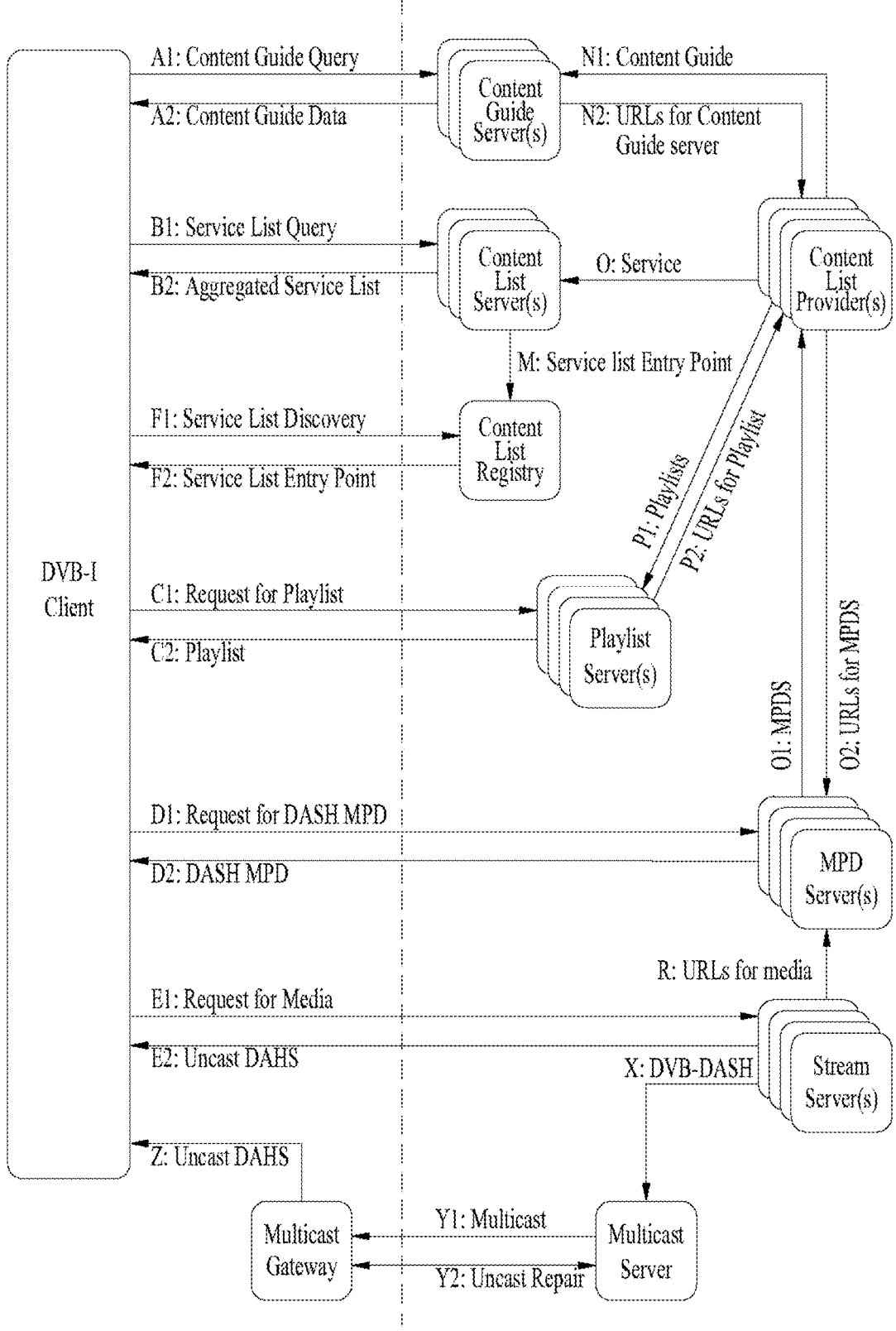
FIG. 12 shows a DVB-I model according to embodiments.

FIG. 12 shows a DVB-I model according to embodiments.

DVB-I Client: A DVB-I client, which corresponds to a media data processing device according to embodiments.

Service List Registry: May provide a list of service list servers to the client. The list may be provided based on query parameters.

Service List Server(s): A server that delivers service lists to the client. A separate service list server may aggregate service list fragments from multiple content and service providers.

Content Guide Server(s): may respond to requests from the clients for content guide data. Content guide servers for individual DVB-I services may be referenced in the service list entry for the service.

Content/Service Provider(s): may provide DVB-I services.

Playlist Server(s): may provide a playlist for services that reference a playlist of DVB-DASH content items rather than directly referencing a single DASH MPD.

MPD Server(s): may provide DASH MPDs.

Stream Server(s): may provide DASH media segments to the DVB-I client.

Multicast Server: A server for adaptive bitrate multicast.

Multicast Gateway: A gateway for adaptive bitrate multicast.

A1: Content Guide Query: A content guide query. This means a request from the DVB-I client to the content guide server.

A2: Content guide data

B1: A service list query. It is a request from the DVB-I client to the service list server. The DVB-I client may request a full list of services. The service list may be a locally filtered or pre-filtered list.

B2: An aggregated service list.

C1: A request for a playlist. It may be an HTTP GET request.

C2: A playlist.

D1: A request for DASH MPD. It may be an HTTP GET request.

D2: DASH MPD: A DASH MPD according to the ETSI TS 103 285 standard.

E1: A request for media. It may be an HTTP GET request.

E2: Unicast DASH: According to ETSI TS 103 285 [1].

F1: A request for determining the entry point(s) of the service list server(s). This request may support a query for performing a selection within a service list discovery.

F2: A list of service list entry points that match a request criterion.

N1: Content guide data.

N2: URLs of the content guide server. URLs for content guide data about each of the services of the service providers and the content contained in the service list entry for the service of interface O M: Registration of service list entry points with service list servers.

O: Service records. It is data about DVB-I services provided by a single content/service provider.

P1: A playlist.

P2: URLs for playlists. URLs are for playlists included in the service list entry for the service for interface O.

Q1: DASH MPDs according to the ETSI TS 103 285 standard document.

Q2: URLs for DASH MPDs included in the playlist for the service of interface P1 or the service list entry for the service of interface O.

R: URLs for media. This is URLs for media included in DASH MPDs.

X: may be a Pin' or Oin interface in the DVB A176 standard. It is information related to a flow of DASH media data to a multicast server.

Y1: Multicast. It may be interface M in the A176 standard. It may be information related to a flow of DASH media data on multicast.

Y2: Unicast repair. It may be information related to a flow of DASH media data on unicast for repairing data lost from interface Y1. It may be interface U in the DVB A176 standard document.

Z: Unicast DASH. It is interface related information from the DVB-I client to the multicast gateway according to ETSI TS 103 285 document. It may be interface L in DVB A176.

The DVB-I client, which is a media data processing device according to embodiments, may correspond to a DVB-I player, a TV device, a 2nd device, or the like.

In the DVB-I standard, interfaces F1 and F2 perform service discovery and receive service list entry points in response thereto. In addition, according to processes B1 and B2, a curated list may be received by reflecting the user's language, country, region, preference, and the like.

Thereby, service aggregation may be implemented. The DVB-I client may propose selection of service list servers and aggregate service lists from multiple service list servers.

DVB-I client may provide selection of service list servers and may aggregate service lists from multiple service list servers. In addition, the DVB-I client may make a first access after being installed, and perform processes F1 and F2 to show a list of lists of service list servers as follows:

1. The manufacturer of the device executing the DVB-I client may provide such devices.

2. National or regional regulators that provide information for the benefit of clients operating in the relevant countries and regions 3. Operators or platforms for clients 4. Central service list registry (CSR) that operates for the benefit of all devices running a DVB-I client that provides information about service lists.

5. A third-party service list aggregator.

There are methods to operate the service list registry as disclosed above. As in the fourth case, according to the function of DVB-I CSR, the DVB-I service list provider or service providers may register a service in the CSR and may display a list of registered lists according to the acquired information when DVB-I performs bootstrapping through F1. The user may select a service list based on the lists of the registered lists and directly handle the service list through filtering criteria such as user preference and country/language/region.

Figure 13:
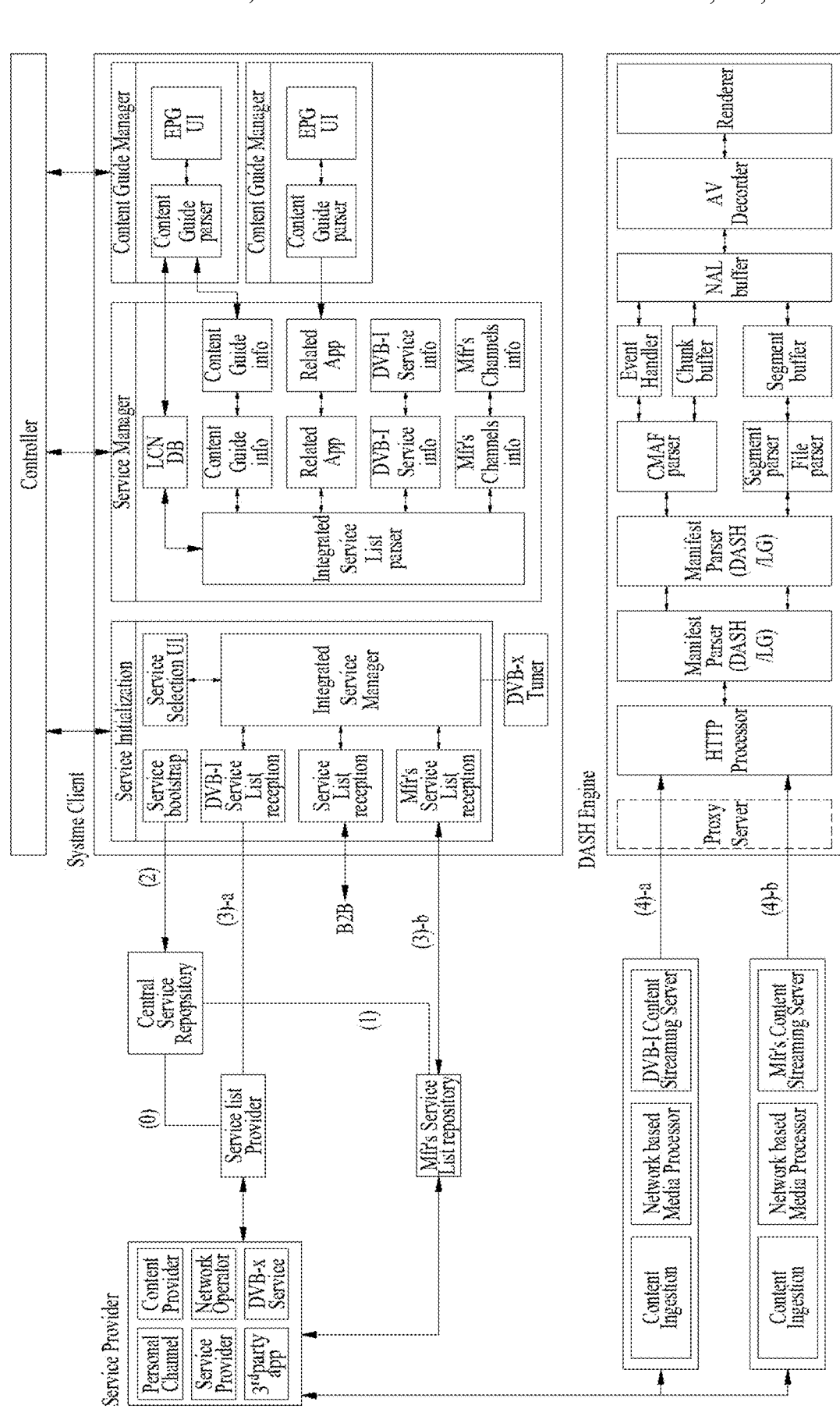
FIG. 13 shows a DVB-I service architecture for supporting a manufacturer service list according to embodiments.

FIG. 13 shows a DVB-I service architecture for supporting a manufacturer service list according to embodiments.

When the manufacturer implements the DVB-I client, the service list provider may serve to register Mfr service lists, collect the services, manage the entire registry, and curate a service list. A diagram of a service discovery architecture supporting these operations is shown. Each component may correspond to hardware, software, a processor, and/or a combination thereof.

Figure 33A:
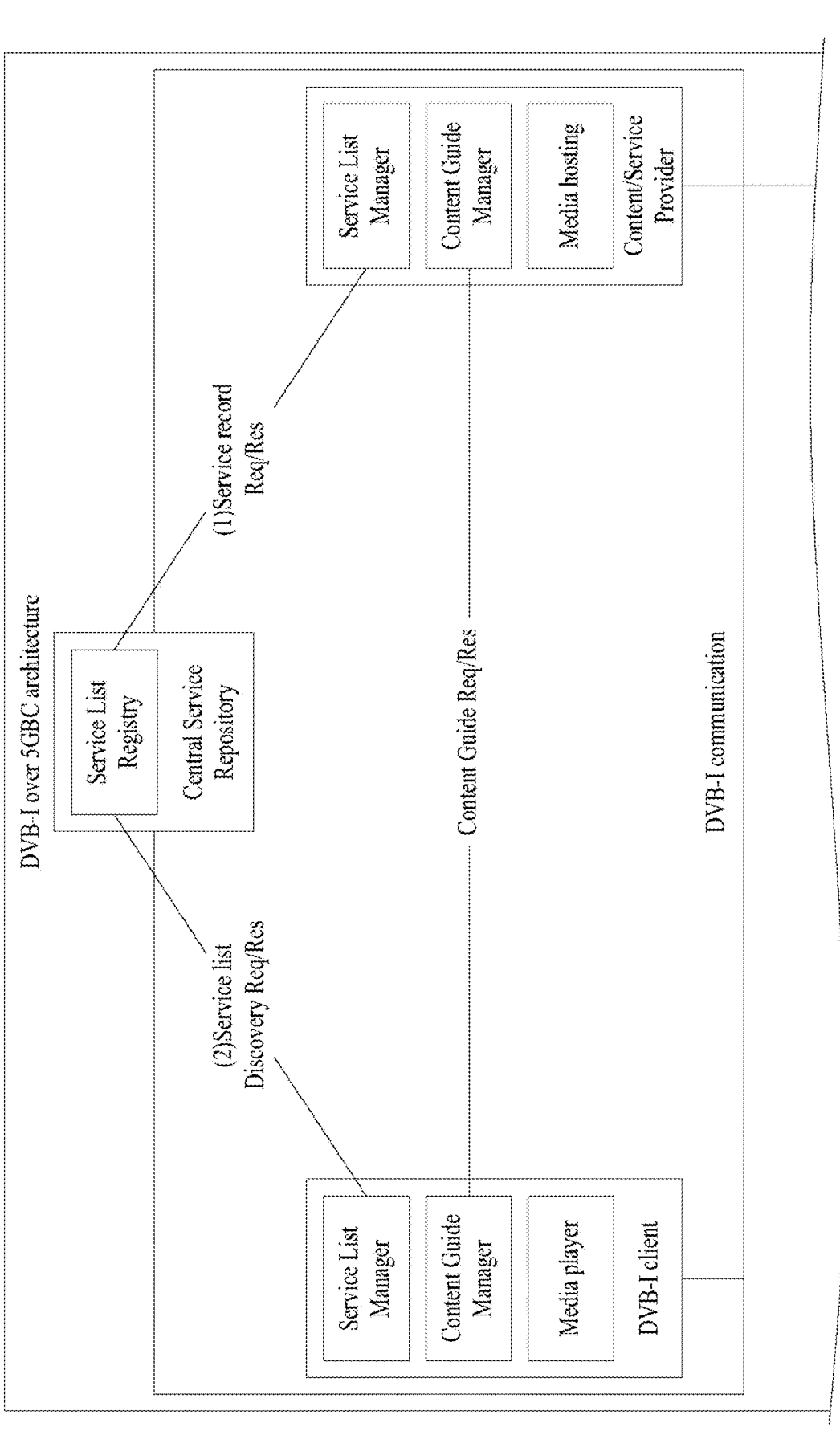
FIG. 33 shows DVB-I in a 5GBC structure according to embodiments.
Figure 33B:
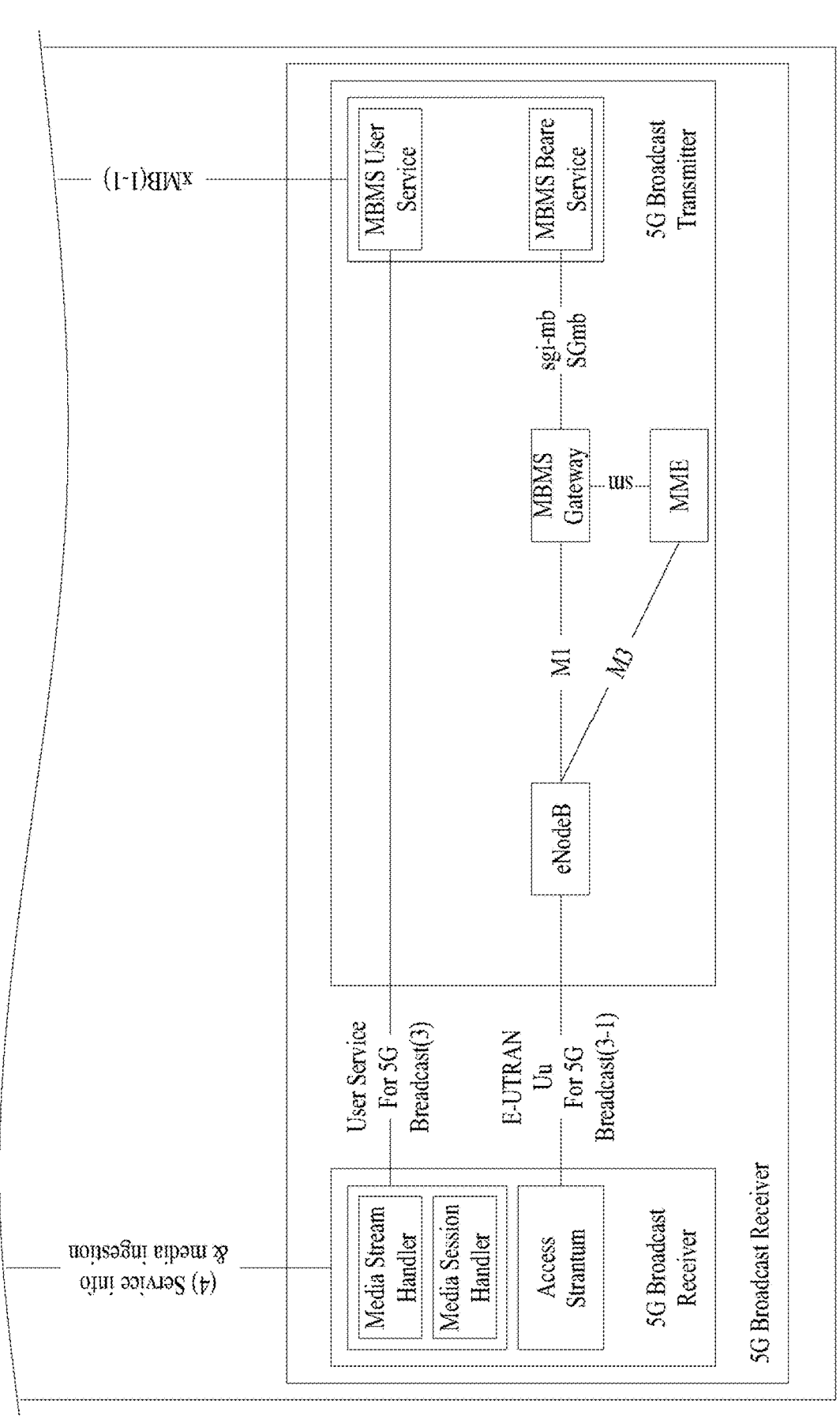

Extension of Service Discovery Entity Supporting Manufacturer Service List Repository The DVB-I service architecture supporting manufacturer service list as shown in FIG. 33 includes a DVB-I client, a service provider, a streaming server, a CSR, and a service list provider repository. The role and receiver operation of each module are disclosed below.

DVB-I client: consists of a system client and a DASH engine, wherein the system client aggregates and curates several service lists through the service bootstrapping, service list discovery, and service manager. In addition, it manages a channel DB assigned in each service list, and performs content guide and app launching. The DASH engine receives HTTP and DASH delivery and performs decoding and rendering.

Service provider: Entities capable of providing content, including OTT companies such as Disney, Fox, Netflix, Hulu, and Amazon Prime, MNO or IPTV operators, and personal channel operators, provide content to list providers.

Service list provider repository: List providers curate lists and register the same in the DVB CSR.

CSR: The first bootstrap location of the DVB-I client, where the list of lists is managed.

Each interface has a function as described below.

[Interface 0]: List providers curate lists and register the same in the DVB CSR.

[Interface 1]: Mfr also operates a repository to manage a list, and registers the list in the DVB CSR.

[Interface 2]: After a DVB-I service is launched and a DVB-I service discovery query is sent, the interface shows list entries filtered according to user language, country, region, and postcode through a series of bootstrap processes. It receives service entities adapted to the user selection or environment and ServiceListURI for accessing the service entity repository.

[Interface 3-a]: Receives DVB-I service lists through ServiceListURI for accessing the service list repository.

[Interface 3-b]: Receives a service list of Mfr through ServiceListURI for accessing the service list repository.

[Interface 4-a]: Receives content by requesting a receivable instance of each service in the DVB-I service list

[Interface 4-b]: Receives content by requesting a receivable instance of each service in the DVB-I service list Embodiment 1 https://csr.dvbservices.com/
query?TargetCountry=ITA®ulatorListFlag-true

When a DVB-I service discovery query is sent to the CSR, the CSR provides DVB-I service discover data and ServiceListURI as follows. The DVB-I client accesses https://dvbi.TVfromTheWorld.com/engTVservices.xml to receive a service list.

<ServiceListURI contentType= "application/xml">
    <dvbisd: URI>https://dvbi.italian-authority.it/trusted-ser-vices.xml</dvbisd: URI>
    </ServiceListURI>

Embodiment 2 https://dvbisr.private-service-list-registry.com/query?ServiceListName=LGchannels When a DVB-I service discovery query is sent to the CSR, the CSR provides DVB-I service discover data and ServiceListURI as follows. The DVB-I client makes an access through https://www.LgChannels/dvbmfr/UK/servicelist.xml to receive a service list.

<ServiceListURI contentType= "application/xml">
    <dvbisd: URI>https://www.LgChannels/dvbmfr/UK/servicelist.xml</dvbisd: URI>
    </ServiceListURI>

In this case, the DVB-I service discovery information may include information disclosed below, and each service list entity may be defined.

FIG. 14 shows DVB-I service discovery information according to embodiments.

The DVB-I service list discovery scheme may define provider offering information that provides service list registry and a service list as described above. As shown in FIG. 11, in providing a service as a separate mfr-only service provider entity, the offering information of mfr in service discovery and information for querying whether the service list provided by mfr is receivable should be extended. It is necessary to extend the capabilities information for checking whether the Mfr service list can be supported. The syntax shown in FIG. 35 may be extended using the extension in the current DVB-I service list discovery scheme.

FIG. 15 shows a syntax of a service list registry entity according to embodiments.

OSName: Supportable OS version and name
    ServiceCode: Supportable service code within the device
    TargetLocation: A target location where the device is made, e.g., UK, Nordic
    Sourcelocation: A location of a streaming server that provides each service
    PublishedDate: Service list publish data
    ReleasedDate: Service list release data
    Manufacturer: A service list implementation company
    ManufacturerURL: URL of the service list implementation company
    ServiceDescription: A brief description of the service list. Example: List indicating text
    ServiceReport: A service list issue or consumption report
    FirmwareUpgrade
    Version: Firmware version number that the platform should support
    UpdateLocationURL: URL accessible for firmware update
    ServiceAvailability
    Version: The current version in which the service list is provided.
    ServiceAvailabilitySearchURL: URL for moving to a web page where service search is available such that additional services provided by the service list provider may be added
    ServiceAvailabilityDBUpdateURL: Link URL for service data base update. Schema to support XML update based on IETF RFC 5261 is downloaded, and fetching may be performed through the corresponding information.

FIGS. 16A and 16B show semantics of a service list registry entity according to embodiments.

FIG. 17 illustrates a service list selection UI/UX according to embodiments.

According to the semantics and syntax according to the embodiments, the media data processing device according to the embodiments may display service list related information as shown in FIG. 37.

Regarding the service list, a service list may be selected based on a provider, language, genre, country, and the like.

A service discovery entity supporting a manufacturer service list repository may be added, and a specific manufacturer service list may be filtered through a provider. As in the embodiment, the UK supported LG channels service may be consumed.

FIG. 18 illustrates a method for coping with channel conflict in receiving multiple service lists according to embodiments.

Channel conflict issue raised when multiple service lists are received

DVB-I receives service list-based services, and each service list is operated and managed by a specific repository. The repository providing the existing DVB broadcasting list may define the DVB-I service list using the LCN allocation method based on the country or specific region due to the characteristics of the current European broadcasting service. On the other hand, specific DVB-I service list providers collect independent services regardless of region and define the LCN list, and accordingly LCN allocation may be set as desired by the service list provider. Therefore, in this background, there is a potential issue of channel conflict when the DVB-I client receives and aggregates multiple service lists.

Use case 1 distinguishes a service list, each Service ID, an LCN to be assigned to the service list, an LCN used on the legacy TV, and actual content, and means that the services and channels assigned to each service list are allocated. In Use case 1, when different lists List A and List B are received, the Sid/LCN is allocated identically and the contents are the same. Accordingly, when the four service lists are aggregated, the service may be provided without an issue.

Case 2 is the case of multiple service providers+different service IDs+the same LCN. This is a case where a conflict occurs as different services are allocated to one LCN.

Case 3 is a case of DVB-T+multiple service providers+ same service ID+different LCNs. This case may occur when a hybrid environment of DVB-T and List A and multiple service providers have the same service ID assigned, and service list C is assigned the same LCN.

Case 4 represents a case of multiple service providers+ different service IDs+same LCN, and may occur when the local country/region service list and the immigrant's country list are aggregated.

In the cases according to the embodiments, there is a potential LCN conflict issue when service lists are merged. In order to address this issue, the DVB-I standard is extended as follows such that the media data processing device according to the embodiments may perform reasonable allocation without LCN conflict.

Figure 19A:
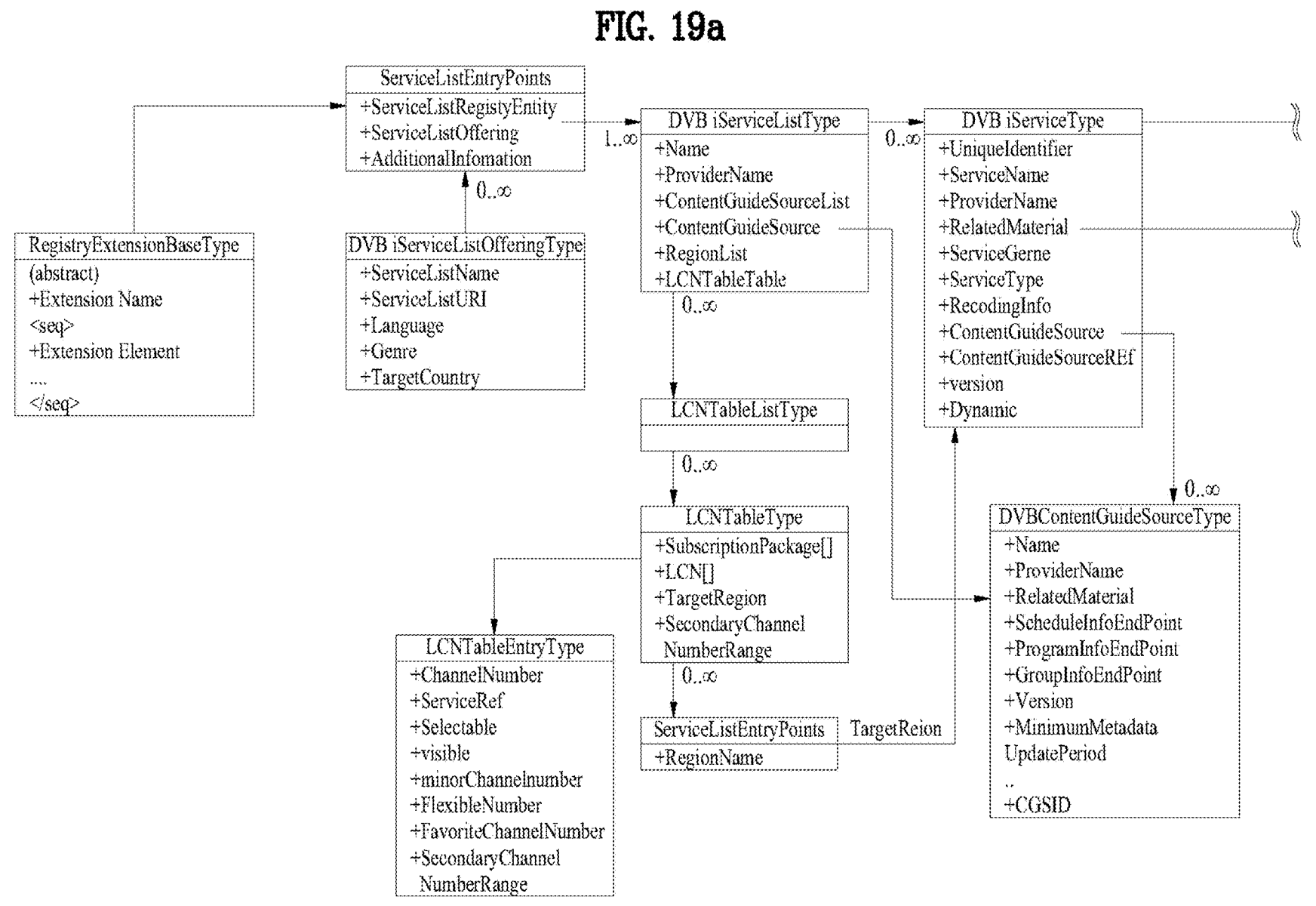
Figure 19B:
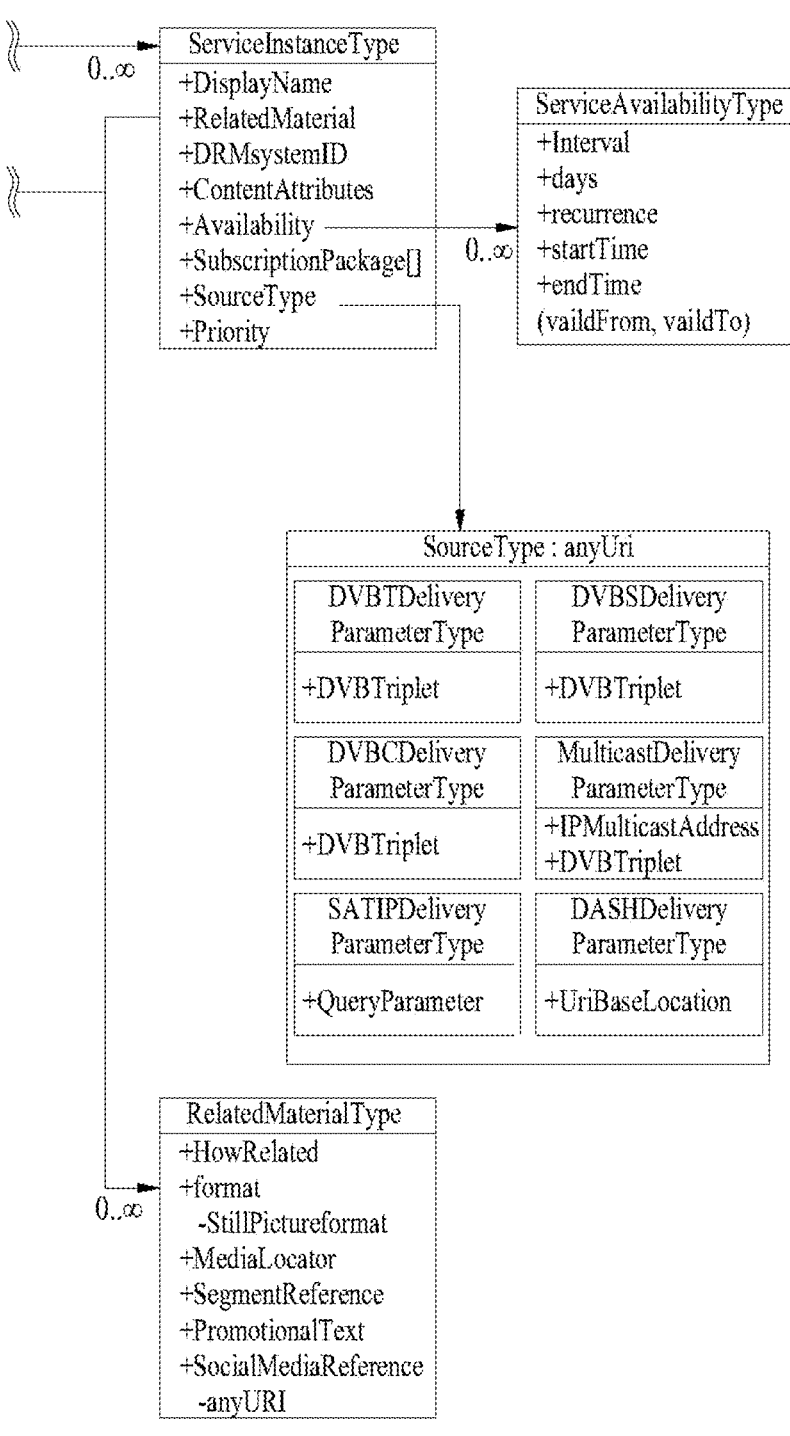
FIG. 19 shows an extension of an LCN table entry type according to embodiments.

FIG. 19 shows an extension of an LCN table entry type according to embodiments.

A service list integration operation is performed by an integrated service manager that receives and integrates DVB-I service lists according to embodiments. An LCN table received through a country/region or a meaningful package is defined through a target region or a subscription-Package in each received service list. In FIGS. 28 and 29, when a conflict occurs due to extension of the LCN table, allocation of a reasonable integrated channel may be enabled through corresponding information. Details of XML xsd are disclosed below.

The transmission/reception method/device according to the embodiments may address the issue of channel conflict occurring in receiving multiple service lists, based on the element(s) included in an LCN table described below. The transmission device according to the embodiments may generate and transmit information including element(s) included in the LCN table, and/or may allocate and manage an integrated channel through the integrated service manager (which may be referred to as a manager, a controller, or the like) that receives and integrates DVB-I service lists included in (or connected to) the reception device according to the embodiments. In addition, the processor according to the embodiments may control the service list integration operation based on a memory that stores an instruction for the integrated channel allocation operation according to the embodiments, a controller, or the like. The LCN table may be referred to as LCN information or the like, and the elements included in the LCN table may be referred to as first information, second information, and the like.

FIGS. 20A and 20B show an LCN table entry syntax according to embodiments.

The priority of the service list is set based on the region or country selected by the user for the first time, or a geographical region at the time when the DVB-I client is currently installed. In addition, when services are integrated, it is considered as a lower priority. The receiver may store the list as a prioritized list to manage lists received later.

The DVB-I client may provide a channel allocation guideline to the user using the corresponding information, and the channel number may be directly reassigned according to the user's intention.

When a user living in Switzerland receives service list 1, which is a Swiss service list, and the DVB-I client receives an additional list, service list 2, ServiceRef information connected to a unique identifier within each DVB-I service and a channel number to be displayed on the screen are received. When the allocated channel number=0 of the two lists is defined as the same number and thus a channel conflict occurs, the DVB-I client has a problem in processing the same channel. In this regard, the channel redundancy issue may be addressed by allocating number 1000 through the favorite channel information extended in the present disclosure.

FIG. 21 shows an example of resolving service channel conflicts according to embodiments.

As described above, the DVB-I client may address the issue of channel conflict while newly allocating 1000 to an issue occurring on (channel 0, Sid23) in service list 2.

Embodiment 2

As in Embodiment 2, when service list 1 and service list 2, and n lists, which are user's local lists, are received, a conflict may occur among channel numbers 100 to 108. When it is assumed that service list 1 has a higher priority based on the user's residential area, the conflicting channel number of Service list 2 needs to be reallocated. In this case, for the conflicting channels, the conflicting channel numbers may be reallocated through the information of Secondary ChannelNumberRange. As shown in the result, conflicting channel numbers 100 to 108 may be newly allocated starting from number 1000 according to the Secondary Channel NumberRange.

FIG. 22 shows an example of resolving a channel redundancy issue according to embodiments.

When there is the same overlapping channel as in the embodiment, a channel may be allocated to an unassigned number during a specific interval according to the definition of Secondary ChannelNumberRange. In this regard, when the channel number ordering is assigned to an unassigned channel within the Secondary ChannelNumberRange:

(1) the values of Secondary ChannelNumberRange may be mapped in ascending order of ChannelNumber that requires reallocation due to a channel conflict: or (2) if it is difficult to define the values in ascending order or if ChannelNumber is not defined correctly, the leading number or string sequence may be sequentially allocated in alphabetical order based on the string value of ServiceRef in a single list according to order of reception in the DVB-I client.

Also, when channel information is defined for both FavoriteChannelNumber and Secondary ChannelNumberRange, which are information that may be reassigned when channels overlap, the channels are allocated by assigning a higher priority to FavoriteChannelNumber than to Secondary ChannelNumberRange.

Figure 23:
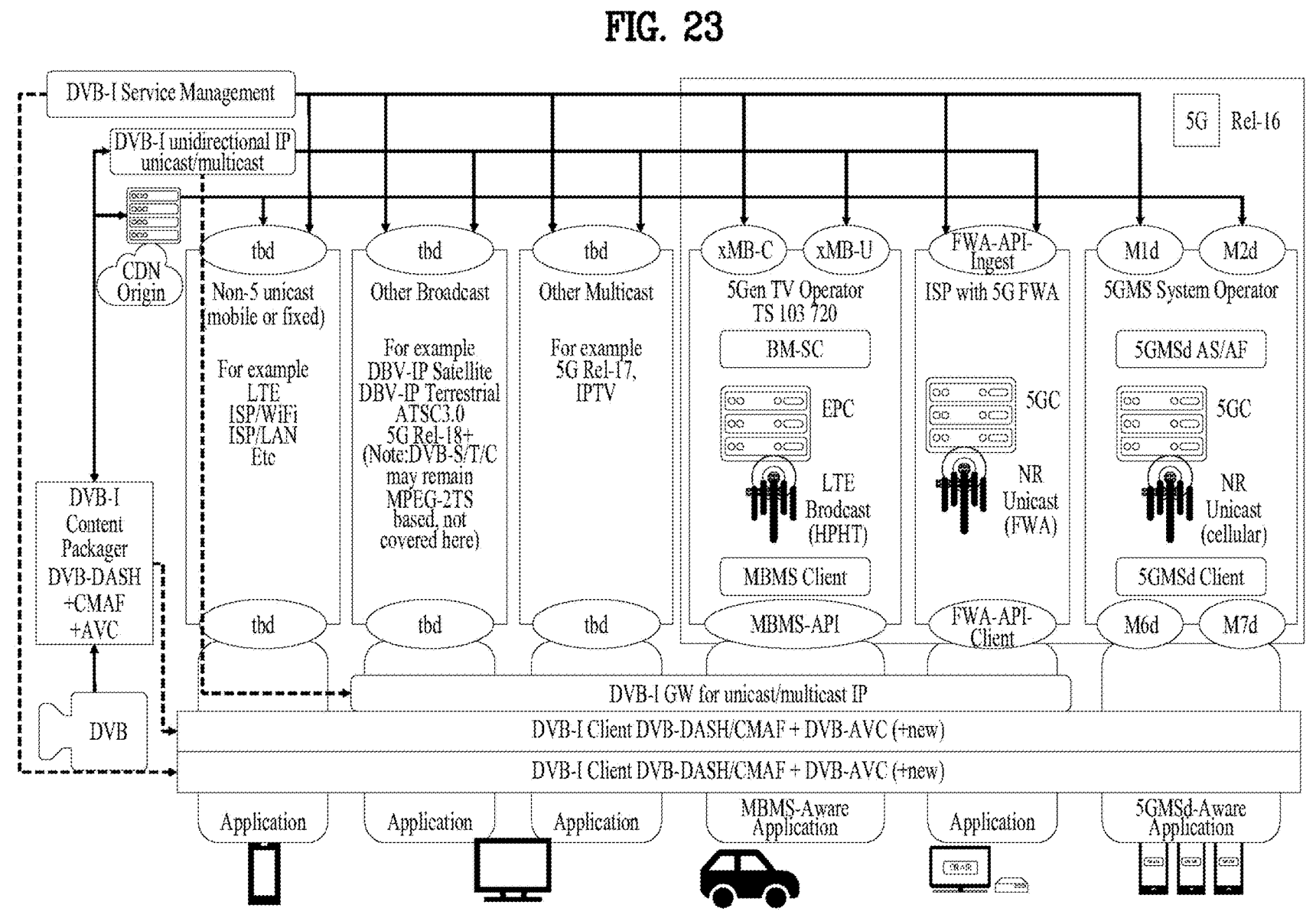

FIG. 23 illustrates a 5G-based DVB-I system according to embodiments.

Communication network-based DVB-I (DVB-I over 5G)

The standard of DVB-I over 5G is intended to create a standard technology allowing media services to be consumed anytime, anywhere by accessing a 5G network as well as a universal Internet network through the convergence of 3GPP TS 103 720 standard Rel-16 version-based media transmission technology and DVB-I media services. In conventional cases, media services have been consumed through existing web browsers based on universal Internet networks such as LTE, OTT, and LAN, independent applications, or manufacturer middleware applications. In this regard, the recently released standard technology for media transmission of 3GPP Rel-16 version and DVB-I, which is a joint service integration standard for European service providers, have opened wider service availability than existing services by establishing a meaningful service protocol.

The media data processing method according to the embodiments may include an integrated DVB-I solution enabling accessibility of multiple distributions even through the existing non-5G network as well as HPHT/Broadcast and LPLT/unicast.

DVB-I over 5G Media Streaming Service Requirements

The DVB-I over 5G structure according to the embodiments should provide a smooth and continuous service in a delivery route supported by multiple distributions, and may provide a service through an efficient and flexible connection according to an optimal network environment. Specific requirements are described below:

5GBC, 5GMS, and non-5G networks (universal Internet supporting OTT such as LTE and Wi-Fi) should be included in the DVB-I service scheme in the form of a service instance.

For 5GBC. 5GMS, and OTT, which are extended service instances, parameters of each network should be included for identification of the network. For example, proper alignment between service instances should be provided, such that switching between service instances delivered over different networks, such as frequency, 5GBC transmission/ service identifier, 5GMS transmission/service identifier, and DVB triplet, may be recognized as reasonably smooth.

When degradation in signal quality or network handover occurs during play-out, the instance may be switched to another service instance. Also, such a switch should be reasonable, and a specific reference point should be provided regarding the degradation in signal quality.

Service priority may be allocated to service instances according to the intention of the service provider.

A related support use case is described below.

A user purchases a smartphone supporting the 5G network and installs a DVB-I app or executes a native app (including a fixed TV) of a specific manufacturer's middleware.

A terminal may support 5GBC, 5GMS, and OTT. When the bitrate is higher than or equal to the minimum supported bitrate, a service instance may be selected according to the network, or the terminal may automatically perform determination and perform reasonable switching.

When the DVB-I app is executed, the DVB-I client may provide and select an accessible service instance through UI/UX.

For example, a popular program with high traffic may connect to 5GBC.

During 5GBC service, when the terminal is moving outside or enters a shaded area, it may be connected to 5GMS.

5GBC may be selected first in the case of fixed TV, and OTT may be selected first in the case of portable devices. 5GMS may be selected as the next best. According to the reception environment and characteristics of the terminal, the priorities of the service instances may be switched rationally and flexibly.

When the bitrate decreases below a certain bitrate, and thus the service quality is degraded in the current service instance, the current service instance may be switched to another service instance according to a specific condition.

In the case of UHD support content, the service instance may be switched to a service instance with the best condition according to the bitrate of the effective network.

The access priority of 5G aware App may be designated according to the terminal manufacturer and service provider and specific business logic.

According to the above use case and requirements, the following issues arise in terms of implementation in the current DVB-I standard.

[Potential Issue]

There is no issue regarding service continuity and synchronization because media data is received only through Restful API in the designated location specified by the service app regardless of the existing network connection type.

In the case of DVB-I for 5G, the bootstrapping method and location of operators may depend on the type of the network.

The propagation delay delivered varies according to the network characteristics. Accordingly, in the case of a linear service, the reference time and media characteristics may also be provided in a different environment for each network.

Discovery URL and media location URL are all differ among operators, and there is an issue that it is difficult to completely switch between these media.

There are no clear criteria for determining that switching is needed or signal quality is degraded within the network.

Figure 24A:
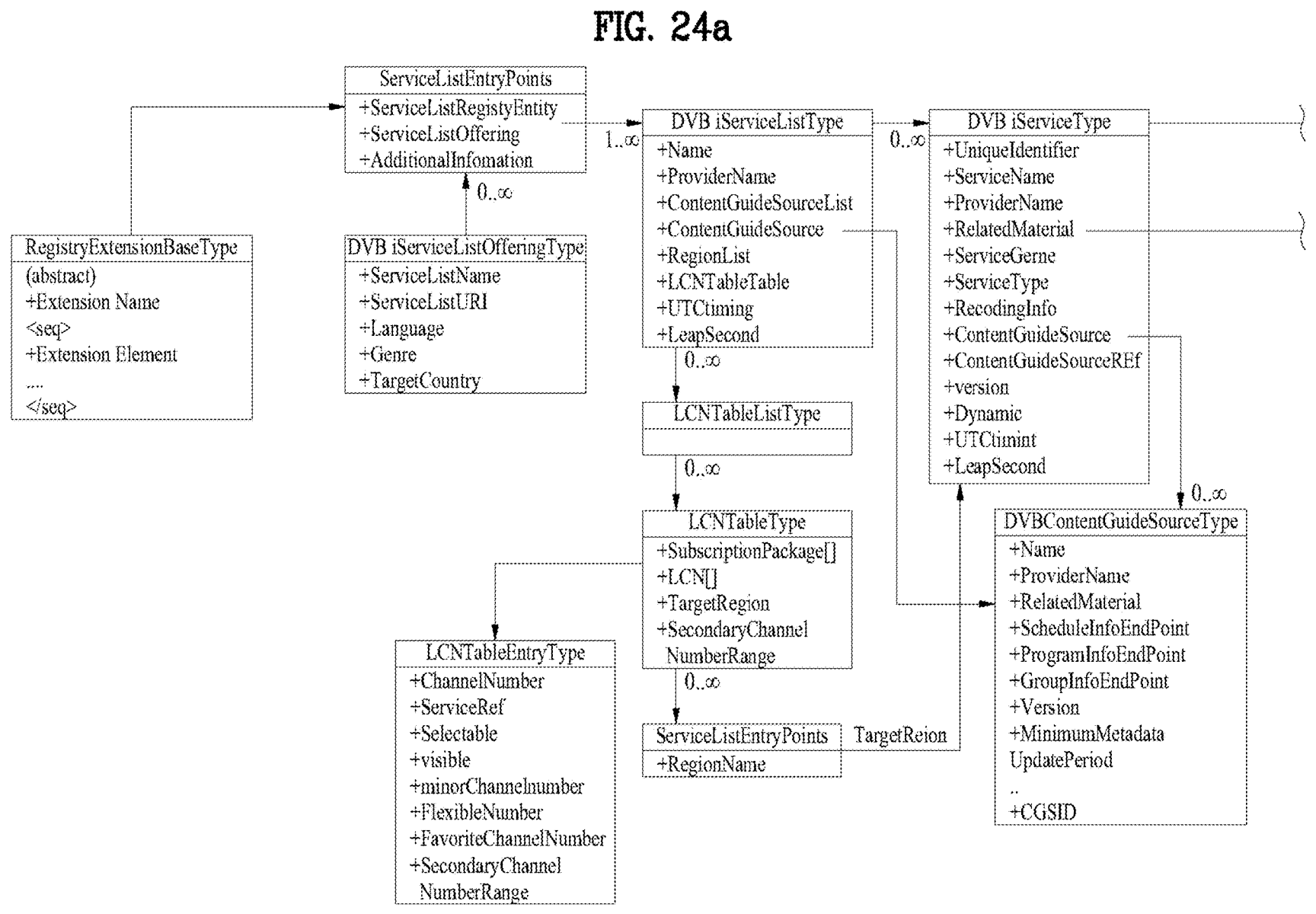
Figure 24B:
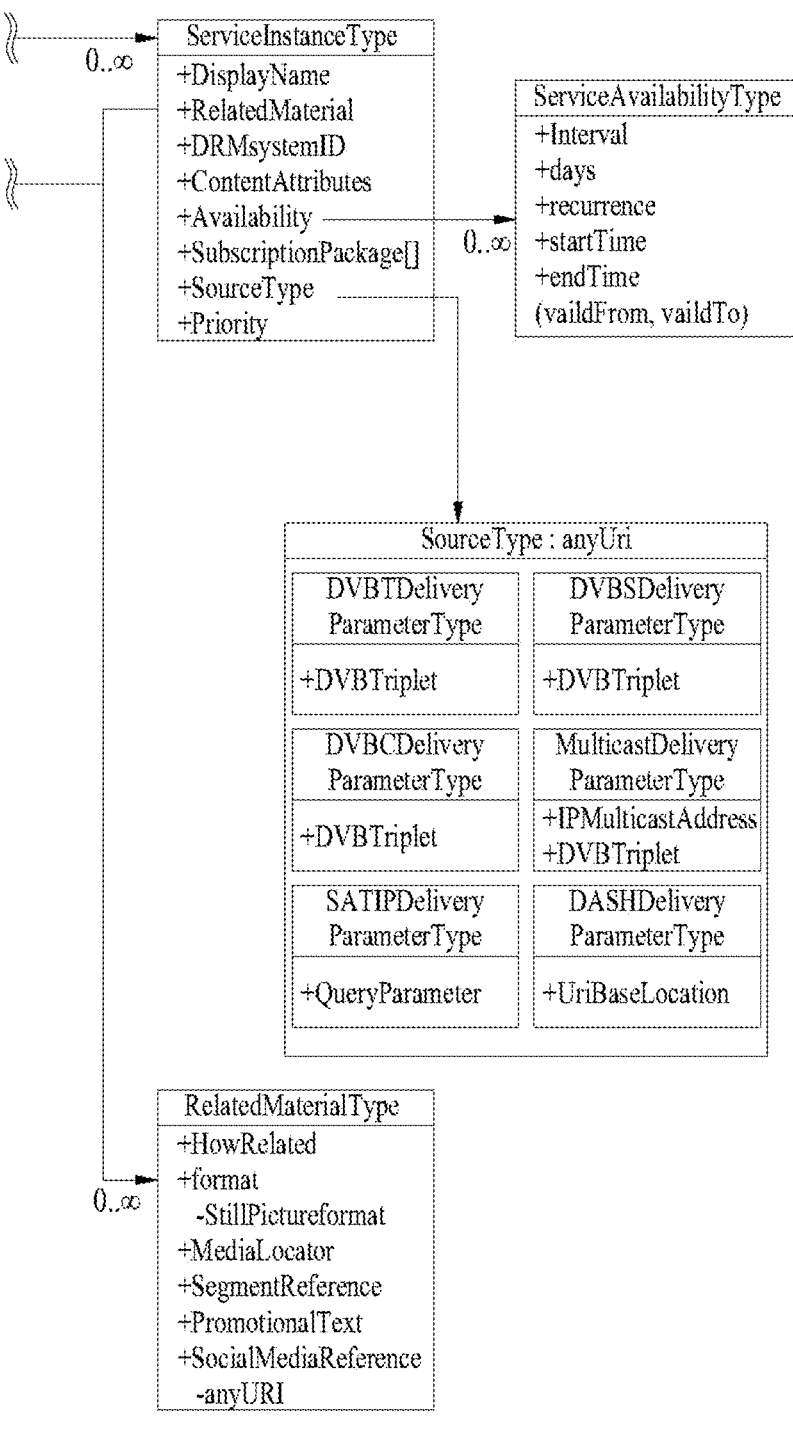
FIG. 24 shows an extension of a DVB-I service scheme according to embodiments.

FIG. 24 shows an extension of a DVB-I service scheme according to embodiments.

Embodiments and solutions for supporting DVB-I service instance switching

[Time Alignment]

In order to address the above issues, a common reference time may be obtained and the misaligned reference time may be aligned between service instances. Although there is a method of acquiring the reference time at the level of each service instance, there is also a method for time alignment between the service instances by acquiring the reference time at the service level of the upper layer defining the service instances. As shown in FIG. 33, by adding a method of acquiring UTC in DVBiServiceType or DVBiServiceListType, the DVB-I client may compensate for the reference clock value to align the time.

A specific syntax location and type value may be defined as follows. For specific semantics, refer to the above-mentioned common details.

The method/device (DVB client, terminal, etc.) according to the embodiments may transmit/receive media data based on the DVB-I service scheme extension of FIG. 33.

FIG. 25 shows information for service instance switching according to embodiments.

@ComparisonBitrate: A bitrate for handling a specific IP forwarding service instance that provides a better user experience than service instances available for this service.

@ComparisonContentAttributeType: indicates the video and audio characteristics available for the DVB-I client to provide AV characteristic comparison and better user experience than service instances available for this service @ComparisonBitratePeriod: A condition for checking whether the comparison between service instances is valid in order to provide better UX to users.

@ComparisonBitRate, a ComparisonContentAttributeType, a ComparisonBitratePeriod: The three elements/attributes may be used as reference values for each device and may be used according to each device's own conditions. However, backward compatibility should be supported for the condition for service instance switching of the DVB-I phase 1 receiver, and no user inconvenience should be caused.

@Dynamic_switching: A flag for enabling switching between service instances to provide a better UX to users.

The method/device according to the embodiments supports all networks such as T/S/C+Internet channel (DVB-I)+5G, and efficient switching between networks may be performed. In addition, the DVB-I client may receive actual media data and DVB-I service scheme information over all networks according to the embodiments. Specifically, starting with a single service definition (unique ID), a single service may be defined as a local service and a service instance according to a delivery method. In serviceType, multiple serviceinstanceType may be defined, and this service may be the same as one.

FIG. 26 shows an example of service instance switching according to embodiments.

Referring to FIG. 26, connection may be switched from OTT to 5GBC based on certain conditions according to the use case describing that "f) 5GBC may be given the highest priority in the case of fixed TV, and OTT may be given the highest priority, and 5GMS may be selected as the next best: According to the reception environment and characteristics of the terminal, the priorities of the service instances may be switched rationally and flexibly." or that "d) For example, a popular program with high traffic may connect to 5GBC." If the average reception bitrate of OTT maintains low video quality for a specific duration, service instance switching should be considered. In this case, the switching use case of the service instance may be implemented by comparing the reception environments of the terminal. When the reception environments are compared, there should be a comparison value for deterioration in quality. Service instances are compared in terms of the bitrate and video attribute through @ComparisonBitRate and @ComparisonContentAttribute-Type according to the embodiments to determine whether the condition for service instance switching is satisfied. For example, when the currently reception bitrate exceeds @ComparisonBitratePeriod for a specific period of time in the range of MinimumBitrate to ComparisonBitRate, it may be determined that the condition for switching is satisfied.

In this regard, when dynamic switching of a corresponding instance is allowed in the DVB-I client connected according to the existing priority according to the DVB-I phase 1 standard, an issue related to the existing terminal may arise. For example, the video with the lowest bitrate may also be defined in MPD for seamless DASH representation, and therefore there is no scenario in which service instances are switched even if the reception bitrate is lowered. Therefore, before checking the conditions of @ComparisonBitRate, a ComparisonContentAttributeType, and (a ComparisonBitratePeriod with priority as the highest priority, it should be first checked whether dynamic switching between service instances is allowed in order to support the backward compatibility of the DVB-I phase 1 receiver. Accordingly, @Dynamic_switching Bool type needs to be extended.

FIG. 27 shows an example of service instance switching according to embodiments.

In the case of FIG. 27, in the use case describing that "h) In the case of UHD support content, the service instance may be switched to a service instance with the best condition according to the bitrate of the effective network," and the use case describing that "i) The access priority of 5G aware App may be designated according to the terminal manufacturer and service provider and specific business logic," the following conditions may be created.

FIG. 28 shows a 5GBC instance and an OTT instance according to embodiments.

In a use case that requires UHD playback support according to a user's selection of UHD content playout or specific business logic, the operation may be switched from 5GBC, which basically supports HD, to OTT. When the extended @ComparisonContentAttributeType is defined as follows, the UHD service may be provided by switching to a service instance of OTT capable of supporting UHD.

According to embodiments, when receiving low-quality media data for a specific duration in OTT, switching to a high-quality 5G network may be performed. For example, 5GBC is free-to-air and may be received without using data. According to the user's intention, reception may be enabled.

In addition, when the range is out of 5GBC coverage, fallback to a network on which data is used may be automatically performed. This may not be what is intended by the user.

Network switching may not be limited to high/low quality, and may support various options. In other words, it is possible to process not only network switching according to the user's intention, but also network switching according to the environment change independent of the user's intention may be handled.

Furthermore, in switching between possible networks, such as 5GMS/5GBC/LTE/Wi-Fi/local home media router, the fallback may be performed using a method according to embodiments.

FIG. 29 shows a hybrid service scenario according to embodiments.

The DVB-I client, which is a device according to embodiments, may perform the discovery method according to embodiments for receiving a service list according to the delivery method (DVB-I standard based hybrid service scenario)

In the DVB-I scheme according to embodiments, a broadcaster may transmit a service on an Internet channel and T, S, and C channels simultaneously. The service provider and the device manufacturer capable of receiving a DVB-I service may acquire authentication for a service channel through regulation and provide an Internet channel through an existing linear service and a channel aggregator. A typical use case is shown in FIG. 29.

The Service may provide a DVB-S service through a DASH instance and a DVB-S supporting STB. The DVB-I client may select instance through Priority and may receive the same service through IP or satellite according to the selection.

DVB-I may build a DVB-I hybrid service environment by pre-installing the satellite STB/RF receiver/cable STB, which is installed to support these services, and receiving a DVB-I service list. In the case of DVB-I mobile, the environment is an only-IP environment. Accordingly, a service list may be received and an instance that may be received through IP may be selected.

Using the DVB-I service scheme according to the embodiments, the client may selectively receive a filtered service for the received local services through information such as target region/postcode/region ID/LCN mapping to support regionalization.

FIG. 30 shows a DVB-I service list discovery procedure according to embodiments.

Interfaces B1 and B2 of FIG. 30 represent the discovery procedure, and interfaces F1 and F2 represent a service list acquisition procedure. Related steps and the embodiment of the current standard are shown in FIG. 30.

In this current service scheme structure, the service discovery searches for all service lists in <ProviderOffering>, regardless of the delivery method, and selects and receives a service list according to specific criteria on the client side. In the current scheme, the service list is not classified according to the satellite STB/RF receiver/cable STB through which the list is received. Rather, the service list is received in the absence of a specific criterion. In this structure, there is a risk that the device receiving the satellite STB may receive the terrestrial list. In addition, since the DVB-I client has a load of filtering, it is heavy in terms of limited device capability.

In order to address the above-mentioned issues, the standard may be extended to acquire a list according to the delivery method during the DVB-I service discovery procedure.

Accordingly, the reception device may efficiently receive service entries corresponding to the pre-installed delivery method from the server.

FIGS. 31A, 31B, and 31C illustrate a DVB-I service list acquisition method according to a delivery method in DVB-I discovery according to embodiments.

The method of FIGS. 31a. 31b. 31c may provide the following effects. The DVB-I client may receive all the service lists and shift the load of filtering of a huge amount of data onto the server. In addition, the DVB-I client deliver related information through a query based on the pre-installed reception information (pre-installed delivery method/protocol). The server may receive an appropriate list according to the delivery method through filtering. In addition, in order to support IP-only devices in which DVB network is not pre-installed, the service list may be matched according to the appropriate priority of acceptable experience information defined by the service list.

The service list provider may provision the list according to a combination of various delivery methods, and should provide the user with information that may indicate whether the service provides a hybrid service or an acceptable experience and whether the service is compatible with and displayed on DVB-I clients with various capabilities.

A specific embodiment may be identified in the process of acquiring a service list entry point that matching the request of the DVB-I client as shown in FIG. 40. According to the information defined in the delivery method, the DVB-I client may display the function of selecting/displaying a service list.

@required: Indicates whether the delivery provides a hybrid service or an acceptable experience.

This information indicates whether the delivery type must be supported and installed on the DVB-I client in order to offer an acceptable experience, as defined by the service list provider. When the client can use a relevant broadcast signal or IP network to retrieve a DVB service, the corresponding delivery type may be installed. Also, this field may be referred to as @install Required.

@availability: Indicates whether to display service selection from the user without satisfying the required attribute.

This information indicates whether a corresponding service satisfies a condition for providing a service to the user. According to the indication of the field, the DVB-I client may check whether the information is displayed on the UI/UX.

According to a combination of the two values, sufficient information for selection may be provided to the user and a UI/UX for making a clear selection may be provided to the user.

@required indicates whether the delivery type is supported by the DVB-I client and available in order to offer an acceptable experience as defined by the service provider. The acceptable experience may refer to, for example, a hybrid service.

The delivery type according to the embodiments may include DASH, T, S, C, and 5G. Elements such as DASH delivery type, T delivery type, S delivery type, S delivery type, RTSP delivery type, and multicast TS delivery type may be displayed.

@required has a Boolean type and may have a value of True or False.

@availability indicates whether a delivery type is available and the services in the delivery type is recommendable in UI/UX when the related broadcast signal or IP network can be used by the client to retrieve DVB services.

@availability has a Boolean type and may have a value of True or False.

@priority indicates the priority of the service list relative to the other delivery types. A lower value of this attribute may indicate a higher priority.

For example, referring to FIG. 73, when DASHDelivery required is true and availability is yes (true), they indicate that these service lists and the delivery type of services acquired by these service lists are DASH. The DASH supporting terminal may acquire these service lists and provide a UI/UX related to a service for the service lists. Priority may be 1 and have a higher priority than other service lists. When recommended is "yes", these service lists may be recommended to a terminal. When DVBTDelivery required is false and availability is "yes (true)," they indicate that the delivery types of these service lists and services acquired by these service lists are T. That is, the T supporting terminal may acquire these service lists and provide a UI/UX related to the service. Priority is 2, and recommended is "yes."

A device according to embodiments may have a registry pre-installed on the client. The client may request a discovery query to the service list registry according to a pre-installed delivery method. Based on the interface, in response to the client's request, the server may deliver an endpoint for service lists. Information about whether multicast delivery is required, whether availability is provided, and what priority is assigned may be transmitted to the receiver (client). The client may discover and acquire a service based on the service list.

Figure 32:
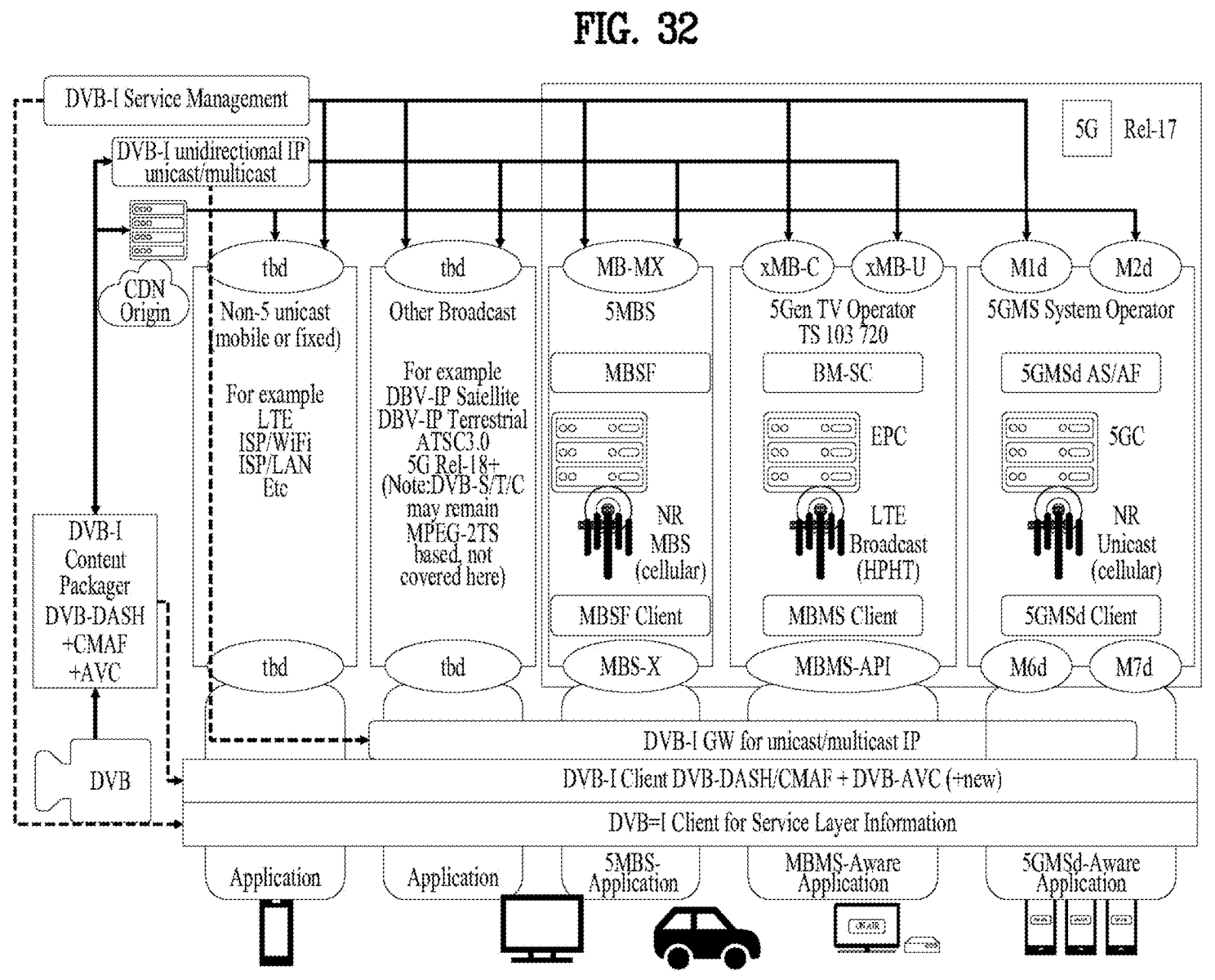

FIG. 32 shows the protocol structure in which DVB-I is implemented in a communication network (5G).

For example, the figure illustrates 3GPP 5G Broadcast Rel. 16, a communication network such as 5G, and a commercial DVB-I application.

Since Release 6 in 2005, a part to support MBMS has been defined. As of Release 14, 3GPP standardization is underway for the support of TV services based on UTRAN to support the following requirements.

3GPP support for Free-to-Air (FTA) services includes the followings.

Only broadcast service to UEs without MNO broadcast subscription: support of shared eMBMS functions: decoupling of content, MBMS services and MBMS transport functions: eMBMS service and transport capability for third parties: networks dedicated to TV broadcast over eMBMS: Single Frequency Network (SFN) with Inter-Site Distance (ISD): ISD related to cellular deployment; and Receive-Only Mode (ROM) service and device.

FIG. 32 illustrates methods for a DVB service provider to apply a DVB-I application over a 5G network. Methods for 5G broadcast include 5MBS through 5GNR and High Power High Tower through BMSC by applying the existing MBMS standard mutatis mutandis. When the DVB service/content provider and the 3rd party provider who has registered the service in the DVB-I service entry publish a service list through the DVB-I service, the DVB-I client may discover the corresponding services, and receive a media service over the 5G broadcast network.

FIG. 33 shows DVB-I in a 5GBC architecture according to embodiments.

A method/device according to embodiments may provide a DVB-I service through a 3GPP 5G broadcast network.

The current DVB-I service is defined as a structure in which, when a service provider registers service entry, a DVB-I client receives a list of lists through a DVB central service repository and selects a service list. As shown in FIG. 41, DVB-I service delivery over a 5GBC network is not defined as a delivery method in the current DVB-I service list. The patent disclosure intends to propose a solution for extending a delivery method at the same level as DVB-T/S/C in the DVB-I service list and allowing a DVB-I client, which may use the 5 GBC network, to recognize unique information about a service defined in compliance with the 3GPP standard and receive the service.

FIG. 75 shows DVB-I over a 5GBC architecture representing a method of receiving a service via an MBMS service bearer, an MBMS gateway, and an eNodeB by applying an HPHT method, similar to an existing DVB broadcast physical transmission method, and MBMS standard. Media transmission over this 5GBC network may allocate and issue service unique information, and thus a UE may receive and consume each service separately. Therefore, the unique information may be extended and defined in a DVB-I service list to connect to the 5GBC network connection, perform service discovery, and retrieve media data.

A content/service provider registers a service list (service) in a central service repository according to the DVB-I standard.

The same identification information about a service defined in the DVB-I service list is delivered to a BMSC through an xMB interface.

A delivery parameter type (DVB5GBCDelivery ParametersType) according to embodiments may deliver information about 5GBC delivery through UriBasedLocation, MinimumBitRate, TMGI, Frequency, serviceID, and TransactionID elements. This information may be used as an important identifier during interaction for service discovery between the MBMS client and the DVB-I client in FIG. 75 and may be utilized as essential information. In addition, even in a service provisioning process of the 5G broadcast transmitter BMSC and the content/service provider in FIG. 75, the corresponding identification information may be used as an important identifier at a service and transmission end.

Embodiments may solve problems arising from inclusion of DVB-I, which is the pull-based standard, in a 5GBC push-based transmission network. That is, according to the method/device of embodiments, if an identifier is pre-assigned and exchanged using a pull concept rather than a simple broadcast transmission and reception concept, and a push service is provided, then the DVB-I client may identify the identifier as a pull concept.

FIG. 34 shows a group message acquisition method through a service ID according to embodiments.

The method/device according to the embodiments may identify and obtain a group message based on an SCS/AS identifier, a service ID, and a transaction identifier.

FIG. 35 shows a group message acquisition process according to embodiments.

When a service discovery request of a DVB-I client/MBMS client is automatically or manually executed, a procedure for obtaining a group message of an MBMS resource is performed. In this procedure, through an agreement between an MNO and a service provider, the agreed request/response process including unique information predefined based on the current UE location information or IP geolocation information is performed. A request including a service ID and a transaction ID as shown in FIG. 35 is made.

A DVB-I list service discovery process according to embodiments is as follows.

The current DVB-I standard defines a service discovery query syntax as follows:

https://www.service-list-registry.com/
   query?<parameter1>=value1 &<parameter2>=value2
parameter: TargetCountry, regulatorListFlag, Delivery, Language, Genre ProviderName, isLocal (New), isWAN (new)
ex)        https://www.service-list      registry.com/
   query?<targetCountry>=UK&<regulatorListFlag>= true&<Delivery>=5gbc&is Local=true The current DVB-I standard defines the following procedure:

"CSR bootstrap (access to a service list server)->reception of service list entry points (reception of information capable of accessing a list of lists)->selection of a service list URL->reception of a service list (access to service lists and reception of a service list that a client wants)->recognition of a postcode-based region ID in the service list->selection of a service matching the region ID according to a current TV address->selection of a service instance that matches capability and priority."

The DVB-I standard includes all region services in a region of a country region in the service list without considering a method of receiving the service list using current location information. Since this method defines technology of receiving all region services regardless of the region/location of a user, even unnecessary data is received.

Additionally, when multiple values of a target country are inserted, there is a possibility of potential errors on the DVB-I client side due to massive data management and channel conflict issues. For example, when a DVB-I client application moves between countries, the DVB-I client application receives an additional list is received to access services in a corresponding country. For example, when installment is performed with TargetCountry=UK and movement to France is made, then TargetCountry=FR is added, and all region broadcasting lists for the two countries are received.

Recently, with CDN technology, data is received by accessing a data center in adjacent region/country, and there is flexible creation and deletion of proxy/edge from the perspective of 5GMS and BC. Therefore, service bootstrapping from a mobile perspective capable of recognizing a current position of a base station or a GPS may also be an "efficient" service approach.

Further, the current DVB-I standard does not define a method for default bootstrapping for mobile/5G services. Therefore, it is necessary to acquire an efficient service list in a situation in which there are various reception routes such as massive amount of lists, mobility, and 5G broadcasting. Extendable options include: 1) CSR bootstrapping: CSR query extension, 2) Service list offering scheme extension: location-based information or 5G service-related information extension, and 3) Service instance extension: service instance (new delivery)/source type extension for 5GBC.

Embodiments newly define a service default query for 5G/mobile services to receive a service list, including receivable service or service instances, through backend SQL using current 5G (res IP) information (isWAN) or GPS information (consent required, isLocal).

In order to receive a list of 5G broadcasting, receivable frequencies may be scanned based on a current location, and a DVB-I service repository including ?delivery=5GBC among parameters may be accessed. DVB-I delivers ServiceListEntry Point predefined in the DVB-I standard in response to the request. ServiceListEntry Point contains a list of lists corresponding to a "5GBC" value. In this case, a 5GBC list receivable based on current location information is delivered in a current list, and services receivable through an interface according to embodiments and unique information received through the interface according to embodiments are identified and presented on a DVB-I client service UI/UX through service (service instance) matching.

FIG. 36 shows a DVB-I list service discovery procedure according to embodiments.

The method/device according to the embodiments may generate a service discovery query as shown in FIG. 36 to perform service discovery. For example, in order to obtain a desired service through the query as shown in FIG. 78, a client according to embodiments may transmit a query requesting a service list or a list of service lists to a content service registry (CSR). The client may receive a list and a list of lists for the query in response to the query from the CSR.

The query according to embodiments is configured in the form shown in FIG. 36 and may include parameters as shown in FIG. 36.

Parameters according to embodiments may include TargetCountry, regulatorListFlag, Delivery or delivery type, Language, Genre ProviderName, Local (isLocal), and Network (isWAN).

The parameters are information about a service list desired by the client and may indicate a service list available in a target country of the client, a service list according to a delivery type of the client, a service list according to the language of the client, and a service list according to a region or network of the client.

Local 7800 may indicate whether information about the location and region of the client, GPS information, etc. is provided.

Network (wide area network (WAN)) 7800 may indicate whether information about the network of the client or about a delivery type is provided.

In other words, the network may indicate the delivery type that may be received at a geographic location of the client through IP information used to acquire information based on a current geographical location through a query of the WAN.

The query may be configured in the following form of a URL. For example, the client may create and transmit a query such as www.service-list registry.com/query?<targetCountry>=UK&<regulatorListFlag>=true&<Delivery>=5gbc&is Local=true.

Delivery may be referred to as a delivery type. When the delivery type is 5gbc, which is a 5G broadcast network, and isLocal information has a specific value, then a service list server or a content service registry may acquire isLocal information of the client from information included in a packet including media data (service data), transmit a service list matching Local of the client, and filter service lists for other regions, for the client that receives media data based on 5GBC.

FIG. 37 shows extension of a DVB-I service list offering delivery type for 5GBC according to embodiments.

5GBC according to embodiments may mean a standalone DVB-I service using 5G broadcast. The method/device according to the embodiments may provide a DVB-I media service based on a 5G broadcast scheme. A DVB-I service discovery method based on the 5G broadcast scheme is required.

DVB-5G delivery may be indicated through an element DVB-5GBCDelivery of the DVB-I service scheme according to embodiments.

An AbstractDelivery Type field indicates whether the delivery type should be supported and installed by a DVB-I client in order to provide an acceptable experience defined by a service list provider.

The delivery type is installed when a related broadcast signal or IP network can be used by the client to retrieve DVB services.

FIG. 38 shows a DVB 5GBC delivery type according to embodiments.

The delivery type of FIG. 37 may include an element as shown in FIG. 38.

FIG. 39 shows DVB-I service instance type (ServiceInstanceType) extension for supporting 5GBC according to embodiments.

The DVB-I service scheme according to embodiments may include an extension value of the service instance type as shown in FIG. 80.

FIG. 40 shows a DVB 5GBC delivery parameter type according to embodiments.

The DVB-I service scheme according to embodiments may include a DVB 5GBC (standalone DVB-I service using 5G broadcast) delivery parameter type as shown in FIG. 82.

FIG. 41 shows a 5GBC service acquisition procedure according to embodiments.

The method/device according to the embodiments may acquire a 5GBC service based on FIGS. 80 to 83

Referring to FIGS. 37 to 40, the method/device according to the embodiments may extend the DVB-I service list offering delivery type information to support 5GBC. For example, the delivery type may represent DVB-5GBCDeliverytype.

@required indicates whether a delivery type should be supported and installed by the DVB-I client in order to provide an acceptable experience as defined by the service list provider. When the client is capable of using a related broadcast signal or IP network in order to retrieve DVB services, the delivery type may be installed.

DVB 5GBC Delivery Type according to embodiments may include TMGI, Frequency, serviceID, and TransactionID elements.

The method/device according to embodiments may extend the DVB-I service instance type to support 5GBC.

The service instance type may include an 5GBC delivery parameter (DVB5GBCDelivery Parameters) element to support 5GBC.

DVB5GBCDelivery ParametersType according to embodiments may deliver information about 5GBC delivery through UriBasedLocation, MinimumBitRate, TMGI, Frequency, serviceID, and TransactionID elements. This information may be used as an important identifier during interaction for service discovery between an MBMS client and a DVB-I client in FIG. 75 and may be utilized as essential information. In addition, in the service provisioning process of the 5G broadcast transmitter BMSC and the content/service provider in FIG. 33, the information may be used as an important identifier at a service and transmission end.

A 5GBC acquisition process of the method/device according to the embodiments of FIG. 83 is as follows.

Figure 41A:
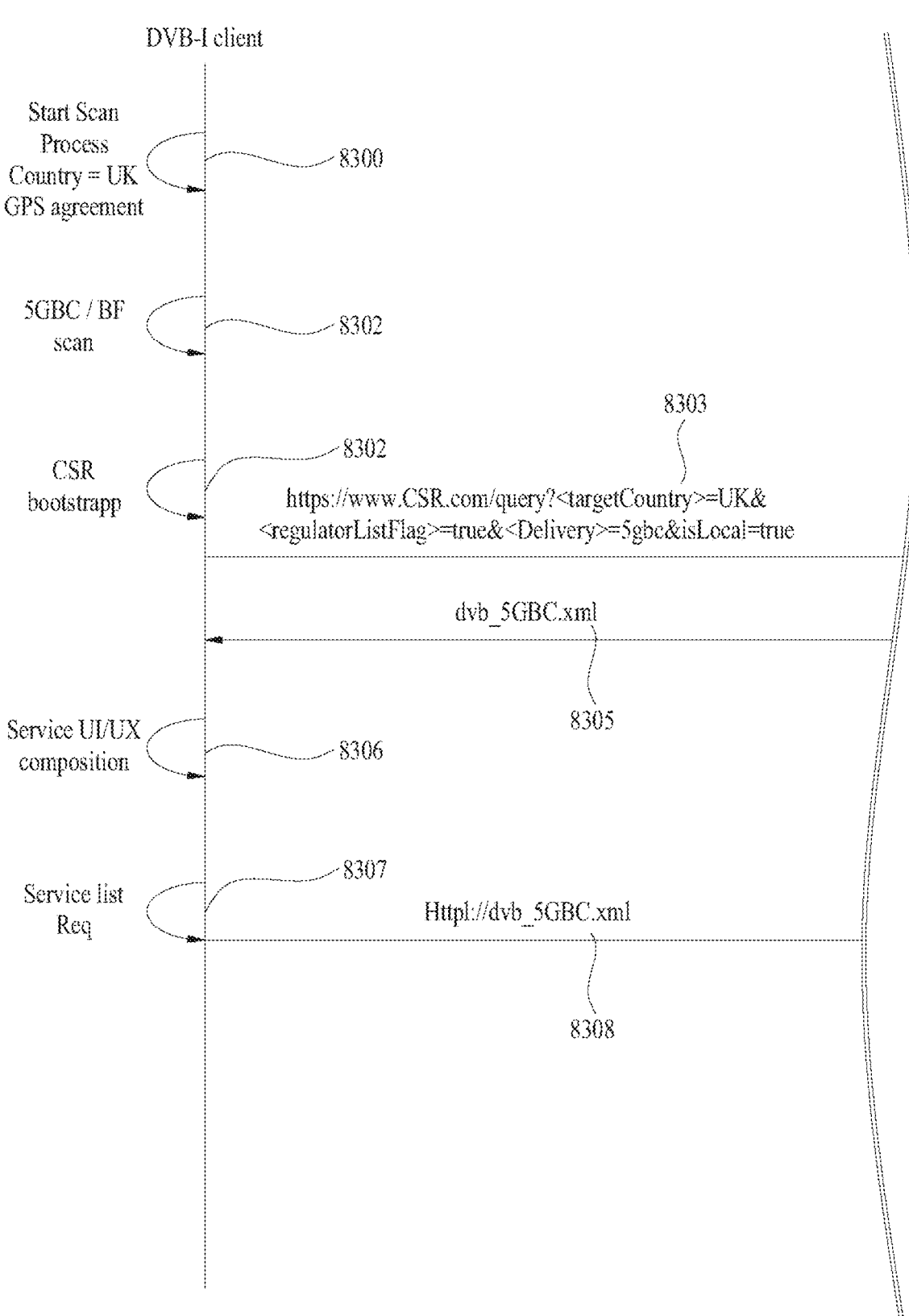

As shown in FIGS. 41A and 41B, the method/device according to the embodiments may acquire a 5GBC-based DVB-I service.

1) Scan start and acquisition of information about a terminal, wherein capabilities, a GPS, a country, and the like may be acquired;

2) 5GBC/RF scan, wherein a BC signal received through RF is perceived;

3) CSR bootstrap, wherein a condition is added to a query, through the information acquired in process 1) and selection of a user received from the terminal, and information such as delivery=5GBC and isLocal=true is added;

4) Receiving a list of lists of possible 5GBC signals, based on a current location reference;

5) Requesting a service list through a service list URL;

6) Acquiring the service list including 5GBC, and acquiring service instance information including a unique ID of 5GBC; and 7) Receiving a 5GBC service.

The DVB-I client represents a media data processing device according to embodiments.

CSR is a content service registry and may store a service list entry point (information representing the service list). The service list entry point may mean entry information through which the service list may be acquired.

A service list server may store the service list.

Through the following procedure between the client, the registry, and the service list server, the device according to the embodiments may acquire a list of service lists through service discovery and acquire a desired service list (service instance) based on the list.

According to embodiments, a service list is a list of lists and may include service list address information (URL), etc. The entire list may be referred to as the service list. Lists included in the service list (entire list) may include service instances containing information about each service. The client may acquire a service list for 5GBC and a service list including an ID of 5GBC and provide a 5GBC service to a user based on a service instance.

Accordingly, the terms such as lists, list, service list, list of service lists, etc. may be interpreted in various ways depending on the type of information about a service. The terms may include a service list containing information about a service instance and an entire service list into which these lists are incorporated. The type of object is not limited to the names of the terms, and the terms may be applied in various ways depending on information that the object includes.

In 8300, the client may start scan for service discovery. A region where the client is located may be the UK. The client may agree that location information (e.g., GPS) of the client should be used to selectively receive only services available in the UK.

In 8301, the client may scan an RF channel for RF reception in order to receive service data (referred to as media data) based on a 5G broadcast network.

In 8302, the client may perform CSR bootstrapping. Bootstrapping refers to an operation for access a CSR.

In 8303, CSR bootstrapping may refer to an operation of transmitting a URL such as in 8303 to the CSR. The bootstrap URL may include parameters such as target country, a delivery type, etc. in a CSR server. The delivery type (which may simply be referred to as delivery) may indicate that both 5GBC and Local have a specific value (e.g., True in the case of a Boolean type). This delivery type serves to inform the server to be bootstrapped of information indicating that the client currently consumes 5GBC-based media and wants to consume only media that matches Local of the client.

In 8304, the CSR (which may simply be referred to as a server or a registry) receives a query (bootstrap) from the client. The server (or registry) may transmit a response to the query of the client to the client. The server may store service list entry point information 8304. The service list entry point information may include service name information. The server may further include a service list registry entity 8304. The server may further include a provider offering 8304. The server may further include information about the type of content (which may be referred to as service data or a media type, etc.), a URL (which may be referred to as address information, etc.) related to the content, and information about a delivery type. For example, a service entry point containing a URL to access a service includes information indicating that 5GBC delivery is requested, frequency information for RF reception, ID information of a service for 5GBC, and information indicating whether DASH delivery is requested.

An identifier of a transport layer that delivers the service at a 5GBC transmission end may be included as an essential identifier during interaction between the MBMS client and the DVB-I client for service discovery.

In 8305, the server may transmit a response to the client. The response is a response to the 5GBC query and may include DVB 5GBC information.

In 8306, the client may generate a UI/UX based on the 5GBC service information received from the server and guide the user.

In 8607, the client may receive service list selection information from the user based on a UI/UX service. The client may transmit a service list request to the service list server.

In 8308, the client may transmit a URL 8308 to the service list server in order to receive the service list.

In 8309, the service list server may contain metadata for discovering the service. Metadata may contain a service instance including a name field representing a DVB UK 5G broadcast service, a unique identifier, a priority of the service instance, a DVB 5GBC delivery parameter, and frequency, 5GBC service ID, transaction ID, and DVB 5G delivery parameters.

The client may provide the service based on the service instance.

FIG. 41*b* shows a more detailed embodiment of FIG. 41*a*.

A procedure of acquiring the DVB-I service list entry point and the service list between the DVB-I client, the CSR, and the eservice list server may be performed as shown in FIGS. 41*a* and 41*b*.

The client may start a scanning process. For example, if a current location of the client is the UK, then the country is UK, and the client may consent to collection of GPS information for location-based service discovery. The client prepares to acquire a service list through 5GBC-based RF scanning. To access the CSR, the client may perform a CSR bootstrap process. For example, the client may create the following URL for bootstrapping: http://www.CSR.com/query?<targetCountry>=UK&<regulatorListFlag>=true&<Delivery>=5gbc&isLocal=true. The CSR may receive the bootstrap URL. The CSR may transmit service list entry points to the client in response to the bootstrap.

The service list entry point may include a service list registry entity. Provider offering of the service list entry point includes the name of a provider, and service list offering includes the name of a service list and may deliver a service list URI. For example, the content type of the service list URI is application/xml, and URI may indicate dvb_5gbc.xml information. Additionally, the service list entry point may deliver information about a delivery type. For example, dvb5gbc delivery is required (True), a TMGI element is 1, a Frequency element is 750, a service ID is 123, a transaction ID is 3, and a DASH delivery request is True. Since the current country location of the client is the UK, the target country of the service list entry point represents UK.

The client may acquire information about the service list, service, provider, delivery, etc. based on the service list entry point. The client may present the information about the service list based on a UI/UX. The user may request the service list through the client based on the UI/UX.

The client may make a request for the service list to the service list server. The service list server may transmit the service list to the client.

Based on the dvb_5gbc.xml information of the service list entry point, the service list server may transmit service list data about dvb_5gbc.xml to the client.

The service list related to dvb_5gbc.xml may be metadata for service discovery. The service list may include information about DVB UK (location of the client) 5G broadcast service (service depending on the delivery type of the client). For example, the service list may include a unique identifier for the UK service, priority information of the service instance, and a DVB5GBC delivery parameter, etc.

The DVB5GBC delivery parameter of the service list may deliver information related to delivery of the service described by the metadata of the service list through the TMGI, the frequency, the 5GBC service ID, and the transaction ID.

As shown in FIGS. 41*c* and 41*d*, in order to acquire a 5GBC (standalone DVB-I service using 5G broadcast) based service, the client may request and receive the entry point of the service list and acquire the 5GBC service list based on the received service list entry point. The client may receive the 5GBC service based on the 5GBC service list and provide the 5GBC service to the user.

FIG. 42 shows 3GPP 5G transmission system information and information for connection between DVB-I applications according to embodiments.

Currently, 3GPP 5GBC/Receive-only Mode (ROM) defines unique selector information for discovery of 5G ROM service and service announcement channels according to each level and attribute.

FIG. 42 shows the information necessary in the 3GPP ROM. Each piece of information is unique for service discovery in ROM reception and may be utilized as essential information for discovery of 3GPP SA services over a 5G network from a DVB-I perspective.

Each parameter is defined as follows.

tmgi is the ASCII hexadecimal representation for the TMGI of the ROM service, encoded in up to twelve characters. serviceArea indicates the list of service areas that are present in the userServiceDescription.

frequency is present in the userServiceDescription, coded as EARFCN, as defined in 3GPP TS 36.101.

subcarrierSpacing is the subcarrierSpacing value also present in the userServiceDescription, coded as subcarrier spacing according to 3GPP TS 36.211.

bandwidth is the bandwidth value, which may be restricted to be one of the bandwidth values specified in 3GPP TS 36.104.

serviceId indicates the serviceId in the service announcement channel that points to the referenced user service.

Figure 43:
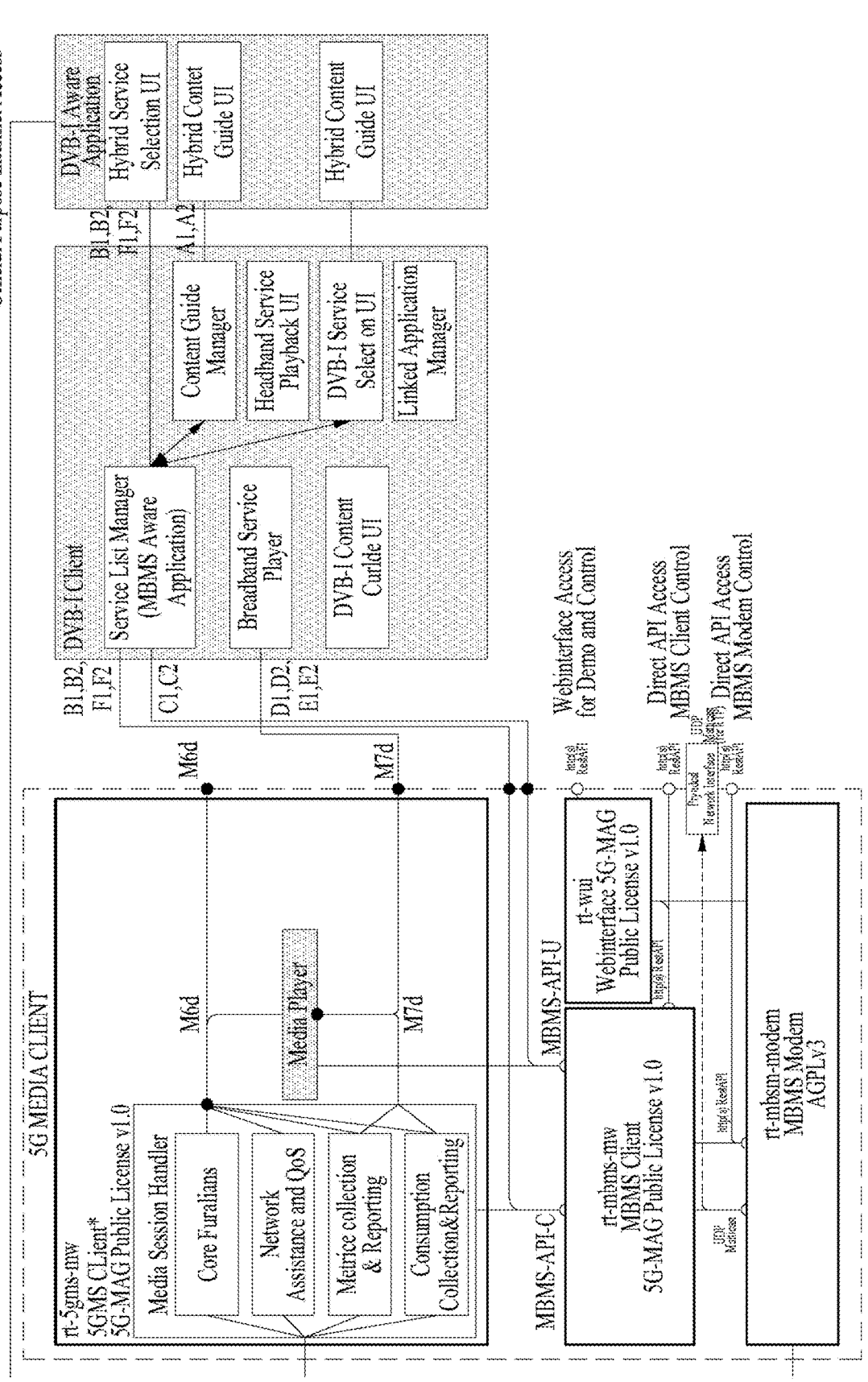
FIG. 43 shows a DVB-I over 5G receiver structure according to embodiments.

FIG. 43 shows a DVB-I over 5G receiver structure according to embodiments.

That is, it is a drawing of a DVB-I over 5G receiver, showing a reception module and interface I/O based on 3GPP Rel 16. The I/O for each module is described below:

MBMS modem (demodulator): This is a 5GBC reception only modem for 5G terrestrial broadcasting only reception. The input may be a 5G broadcast signal, the output may constitute a UDP multicast packet and the Rest API for direct interaction with the modem.

MBMS client: This module is responsible for UDP multicast packet de-packetizing and analysis of the FLUTE packet and service announcements (SAs). The input is a UDP multicast packet, and the output is SA and media segment cache.

5GMS Client: This is a module for receiving 5GMS unicast and may manage sessions. It is a module that includes a media player capable of playing out 5G packets. The input is a TCP packet or a media segment from an MBMS client and may be SA. The output may be media to be played or, when played by a DVB-I app, may be played on a third party player.

The DVB-I client is connected to the MBMS-API-C interface as shown in FIG. 43, and each interface may operate as an HTTP Rest API according to the DVB-I standard.

Figure 44:
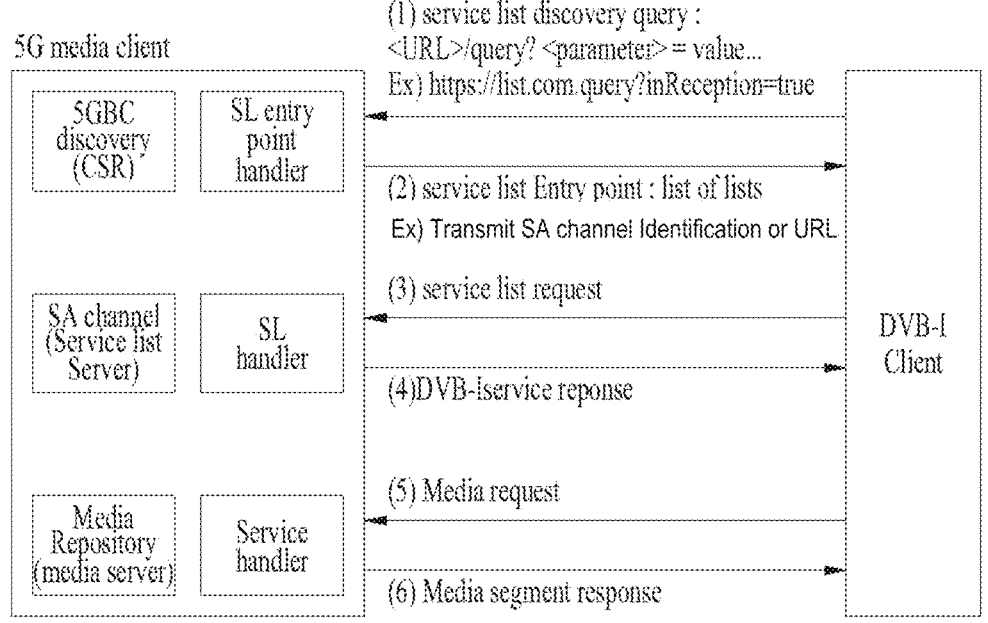
FIG. 44 shows a flow of DVB-I standard discovery-based 5G media discovery according to embodiments.

FIG. 44 shows a flow of DVB-I standard discovery-based 5G media discovery according to embodiments.

A method/device according to embodiments may include and perform operations for performing service discovery of a DVB-I standard-based 5G media client and a DVB-I client. A media processing device according to embodiments may be the 5G media client or the DVB-I client.

Unlike the structure of the conventional CSR, service list server, or media server (CDN), the 5G media client needs to directly process currently receivable signals and continuously scan service channels receivable over the signals.

Note that the current DVB-I specification defines the entities that perform service discovery as the client and the service discovery server (CSR), but in the scenario of DVB-I over 5G, the entities that perform service discovery are the client and the internal MBMS receiver. Therefore, the DVB-I client side must recognize the receivable status and service discovery and continuously check the same.

The DVB-I client performs a request based on the DVB-I standard, and the 5G media client must comply with the call flow that conforms to the DVB-I standard for the request. Therefore, the DVB-I client and the 5G media client may perform service discovery through the procedure of operations (1) to (6) as shown in FIG. 44. In addition, since the SA channel information of 3GPP and the DVB-I standard scheme template have different characteristics, additional modules may be included to perform related operations.

Since DVB-I client and 5G media client have different XML template structures, XML template matching to information that can be interpreted by the DVB-I client is required, and essential information must be selected. In operation (1), the DVB-I client may perform the same procedure as the request method for the Service List Registry, by accessing the inside of the 5G media client through the query parameter. The conventional Service List Registry (e.g. CSR) may provision static service coverage. However, DVB-I over 5GBC includes not only fixed TV but also mobile, cases and it is difficult to provide provisioning according to individual reception status because it is difficult to predict the transmission coverage of various 5GBCs in respective regions. Accordingly, provisioning for receiving services available at the current location may be performed directly between the 5G media client and the DVB-I client.

Therefore, the parameter "inReception" may be extended to extend the query method when accessing the internal 5G media client.

> https://www.service-list-registry. com/
> query?<parameter1>=value1&<parameter2>=value2
> parameter: TargetCountry; regulatorListFlag, Delivery, Language, Genre ProviderName, isLocal,isWAN,Postcode,inReception The description of the detailed process for each flow is given below:

> (1) Operation of requesting service discovery query (https://www.service-list-registry. com/ query?inRecption=true): The DVB-I client makes a request using the URL and query parameter predefined according to the DVB-I Service List Registry discovery method. It is a request for receiving service entries receivable by the current 5G media client. The SL entry point handler, which is a module that performs a function similar to DVB-I Service List Registry, generates entry point XML in the form of DVB-I standard scheme based on the information of SA. It also returns necessary information when receiving a DVB-I query. If access to the CSR or country-specific DVB-I service discovery server is valid, a DVB-I client with a non-ROM IP connection may check the presence of 5G service by performing an inReception query to the CSR or country-specific DVB-I service discovery server in operation (1).

(2) Operation of receiving service entry points: Entries currently receivable by the 5G media client through operation (1) are received. In this operation, accessible information including the unique ID addresses of the currently receivable SA channels may be included.

(3) Operation of requesting a service list: The SA channels within the service entry points received in (2) are accessed and SA service information is requested to acquire the corresponding list. The service list handler selects the service list information required for DVB-I service list discovery in an SA channel and generates the Service list XML.

(4) Operation of receiving DVB-I service list discovery scheme: Information for access to the media repository based on a scheme conforming to the DVB-I standard is received.

(5) Media request: The 5G media client makes a request to the media segment cache module that it currently receives over the 5G network.

(6) Media segment response: A media segment is received.

FIG. 45 shows a service list registry query method and service entry point extension method for accessing an MBMS SA channel in a DVB-I standard-based 5G media client according to embodiments.

When a request for a Service List Registry query is made to the internal 5G media client according to operation (1), the 5G media client returns XML containing information for access to the SA channel and conforming to the DVB-I service entry point to the DVB-I client. In this case, the information for access to the SA channel in the existing DVB-I client is currently absent and is required to be extended as shown below.

@ServiceListURI should contain information for accessing the SA channel of the 5G media client, and HTTP Restful access URI configuration is required according to the interface requirements of DVB-I. Therefore, the following template is needed: https://URL_string/(SA access channel information).

The unique information for accessing the SA channel within the 3GPP eMBMS standard is shown in FIG. 42. The DVB-I service list request template containing this information is mapped to the URL as follows:

[MBMS Information: URL-Implementation Example of Mapping]

https://rom.tmgi.3gpp.org&tmgi=901056&serviceArea-40201&frequency=6861 6&subCarrierSpacing=1.25&bandwidth=8

Therefore, when DVB-I accesses the @ServiceListURI location newly defined according to operation (3), the 5G media client may receive the accessible service list in the SA channel. It may access individual services in the received service list and valid service instances to receive channels and media.

As an additional option, operation (1) may be performed to "https://rom.tmgi.3gpp.org&tmgi=901056&serviceArea=40201 &frequency=68616&subCarrierSpacing=1.25&bandwidth=8" and a service list entry point including @ ServiceListURI may be returned.

FIG. 46 shows Extensions of DVB-I service over 5G types and service instance according to embodiments.

As shown in the receiver structure of FIG. 43, data that may provide DVB-I service discovery and media services is extracted from the 5G physical signal through demodulation and IP protocol de-packeting. The data packets are SA of 5G eMBMS and video/audio data. Currently, the DVB-I specification strongly recommends a DVB-DASH-based ABR support protocol. Therefore, media service providers over a 5G network should support service types and media data that comply with the profile of DVB DASH for service provisioning.

The DVB-I standard defines service types as follows. For example, a service supporting the HEVC service may be signaled by ServiceType, ContentAttribute, and VideoConformancePointsCS as disclosed below:

As shown in FIG. 46, a service list of services according to the respective service types may be signaled using ServiceType, ContentAttribute, and VideoConformancePointsCS.

Even for DVB-I over 5G supported services, the service type terms may be extended as shown below to support services suitable for the DASH protocol and the SA channels of 5G MBMS.

FIG. 47 shows a service type extension according to embodiments.

The extended termID= "5GStandalone" is a service type that is supportable by a 5G standalone terminal. The service type indicates that a service may be discovered and provided according to the SA channel of the eMBMS. An implementation example of providing the HEVC codec over a 5G network as per the ServiceTypeCS extension is given below:

service_type is 0x1F, the description thereof is HEVC digital television service (see note 4), and the DVB-i service list may be signaled as follows Service. ServiceType= "urn: dvb: metadata: cs: Service-TypeCS: 2022: 5GStandalone"

Service. ServiceInstance. ContentAttributres. VideoAttributes. PictureFormat= "urn: tva: metadata: cs: PictureFormatCS: 2015:1.2"<!HD--> or "urn: tva: metadata: cs: PictureFormatCS: 2015:1.3"<!--UHD-->"

Service. ServiceInstance. ContentAttributes. Video Attributes. FrameRate<="120"

Service. ServiceInstance.ContentAttributres. VideoAttributes. Coding contains any HEVC related term from urn: dvb: metadata: cs: VideoConformancePointsCS: 2017

From the service instance perspective, since the media protocol conforms to DVB DASH, the related protocol signaling and service matching information needs to be extended. Currently, DVB-I ServiceInstanceType is defined as follows. Also, the properties of each parameter are defined according to each delivery Type.

FIG. 48 shows a ServiceInstanceType according to embodiments.

As mentioned earlier, the packets are configured in the DVB DASH format, and therefore the media protocol type received through transmission over a Rel16-based 5G network should be defined according to the properties of the DASHDelivery Parameters Type.

FIG. 49 shows DASHDelivery Parameters Type according to embodiments.

Implementation Example

@UriBasedLocation=https://contentlocoation.com/
  mbmsrom.mpd
@MbmsRomUrl
mbms://rom.tmgi.3gpp.org&serviceArea-
  40201&frequency=68616&subCarrierSpacing=1.2
  5&bandwidth-8&serviceId=%    22television-service
  %22
An alternative form is:
https://rom.tmgi.3gpp.org&serviceArea=
  40201&frequency=68616&subCarrierS
  pacing=1.25&bandwidth=8&serviceId-%    22televi-
  sion-service %22.

According to the processes of FIGS. 43 and 44, the SA channel may be accessed through the unique service signaling of @MbmsRomUrl and the service may be received via the DASH engine according to @UriBasedLocation (MPD location).

Figure 50:
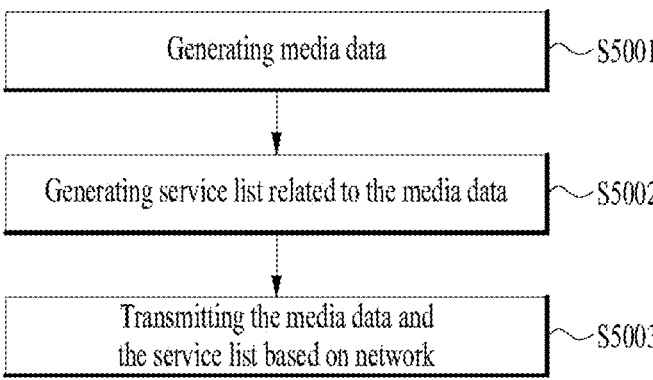
FIG. 50 shows a media data transmission method according to embodiments.

FIG. 50 shows a media data transmission method according to embodiments.

S5000: The media data transmission method according to the embodiments may include generating media data.

S5001: The media data transmission method according to the embodiments may further include generating a service list related to the media data. The service list may represent signaling information for discovering media data (or service or service data). The service list information represents the information in FIGS. 4, 19, 24, etc. The service list information may include the information in FIGS. 4 to 10. Based on this information, a method/device according to embodiments may display each service instance, each delivery type, and resolution through a UI/UX, as shown in FIG. 11.

S5002: The media data transmission method according to the embodiments may further include transmitting the media data and the service list based on a network. The media data may be transmitted based on a network and protocol such as those in FIGS. 1 to 3. The transmission method/device according to the embodiments may include content guide servers, service list servers, service list registries, content/service providers, playlist servers, MPD servers, stream servers, multicast servers, multicast gateways, and corresponding operations, as shown in FIG. 12. Content may be a unit of data included in a service. Media data may be construed as a term including service and content. An apparatus for carrying out the transmission method according to the embodiments is shown in FIG. 13. The service list may provide information for the operations in FIGS. 19 to 22 to avoid channel conflicts on the receiving side when multiple service lists are transmitted. The service list may contain the information in FIG. 24 to support a communication network as shown in FIG. 23.

Referring to FIG. 33, the method according to the embodiments refers to a media data processing method carried out on a side including a service registry, a content/service provider, and a 5G broadcast transmitter, in a DVB-I over 5G broadcast system.

Referring to FIGS. 1 and 3 to 4, the media data processing method may include generating media data, generating a service list related to the media data, and transmitting the media data and the service list based on a network.

Referring to FIG. 33, the network may include a communication network (5G), and the service list may be utilized to discover the media data and receive the media data based on the communication network.

Referring to FIG. 44, regarding a method for service list discovery of a DVB-I client for 5G broadcasting, the method according to the embodiments may further include receiving, from a media data processing apparatus (the DVB-I client), a service list discovery query for the media data. The service list discovery query may contain parameters related to reception of service entries receivable by a client for the communication network. The parameters may contain information about a target country, a delivery type, and a network for an entry point of the service list, and information about a location of the client. The parameters may further contain reception information indicating whether the parameters are receivable from the client for the communication network.

Referring to FIG. 44, the method according to the embodiments may further include transmitting, based on the service list discovery query, a service entry point comprising an entry receivable by the client for the communication network, and receiving a request for the service list based on the service entry point.

Referring to FIG. 45, the service entry point may contain information allowing for access to a channel of the communication network. The information may include a uniform resource locator (URL) containing at least one of service area information, frequency information, subcarrier spacing information, or bandwidth information for the client for the communication network. The information may further include a delivery type, communication network broadcast delivery information, or communication network multicast delivery information.

Referring to FIG. 47, the service list may include a standalone service type for a communication network. The standalone service type for the communication network may be a service type supportable by a terminal for the communication network, and may indicate supporting service discovery according to a channel for broadcast multicast.

Referring to FIG. 33, the DVB-I over 5G broadcast system may be referred to as a media data processing apparatus or media data transmission system, including a service registry, a content/service provider, and a 5G broadcast transmitter.

The media data processing apparatus may include a controller configured to generate a service list related to media data, and a broadcast transmitter configured to transmit the media data based on a communication network.

Figure 51:
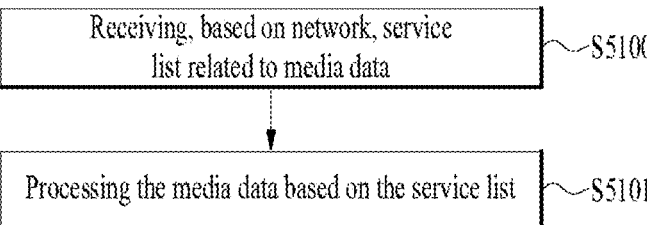
FIG. 51 shows a media data reception method according to embodiments.

FIG. 51 shows a media data reception method according to embodiments.

S5100: The media data reception method according to the embodiments may include receiving, based on a network, a service list related to media data. The media data may be received based on a network and protocol, such as those in FIGS. 1 to 3. The service list information represents the information in FIGS. 4, 19, 24, etc. The receiving operation according to the embodiments may refer to an operation in which a reception device (client) sends a query (request) for necessary information to a server and/or providers and receives corresponding response information, as shown in FIG. 12. The request/response procedure is performed according to each interface in FIG. 12. An apparatus performing the receiving operation according to the embodiments is shown in FIG. 13 and the like.

S5101: The media data reception method according to the embodiments may include processing the media data based on the service list. A UI/UX may display a reception status of a service. The service list information may include the information in FIGS. 4 to 10. Based on this information, a method/device according to embodiments may display each service instance, each delivery type, and resolution through a UI/UX, as shown in FIG. 11. The reception method according to the embodiments may include operations of FIGS. 19 to 22 to avoid channel conflicts. The reception method according to the embodiments may include controlling the service list to perform service instance switching as shown in FIG. 27.

Referring to FIG. 44, a media data processing method according to embodiments (i.e., a processing method of the receiver-side, namely, a DVB-I client or 5GBC receiver-related device) may be carried out in a reverse process to the transmitter-side media data processing method. Specifically, it may include receiving, based on a network, a service list related to media data, and processing the media data based on the service list Referring to FIG. 44, the receiving of the service list may include transmitting a service list discovery query, receiving a service list entry point based on the service list discovery query, and requesting the service list based on the service entry point.

Here, the network may include a communication network, and the service list may be used to discover the media data and to receive the media data based on the communication network. The service list discovery query may contain parameters related to reception of service entries receivable by a client for the communication network. The parameters may contain information about a target country, a delivery type, and a network for an entry point of the service list, and information about a location of the client. The parameters may further contain reception information indicating whether the parameters are receivable from the client for the communication network.

The service entry point may contain information allowing for access to a channel of the communication network. The information may include a uniform resource locator (URL) containing at least one of service area information, frequency information, subcarrier spacing information, or bandwidth information for the client for the communication network. The information may further include a delivery type, communication network broadcast delivery information, or communication network multicast delivery information.

Here, the service list may include a standalone service type for a communication network. The standalone service type for the communication network may be a service type supportable by a terminal for the communication network, and may indicate supporting service discovery according to a channel for broadcast multicast.

Referring to FIG. 44, a processing apparatus for carrying out the media data processing method, namely, a device related to a DVB-I client or a 5GBC receiver, may include a controller configured to receive a service list related to media data based on a network, and a player configured to process the media data based on the service list.

Referring to FIGS. 43 and 44, the DVB-I client may receive 5G-based media data via the 5G media client that receives 5G broadcast (5GBC) and 5G multicast service (5GMS) signals. This requires the DVB-I client to discover 5GBC and/or 5GMS based services quickly, accurately and efficiently. In addition, there are differences between SA channel specification of 3GPP and the DVB-I standard specification, and therefore services need to be discovered through a process that satisfy both specifications in order to play a desired service. The DVB-I client may transmit a query directly to 5G media client. 5GBC coverage may vary, and the expected clients may include a mobile device as well as a fixed TV. Therefore, since it is difficult for 5GBC to predict different receiver environments, it may be effective for the client to receive queries that reflect client characteristics. If a 5G broadcaster simply performs broadcasting, the DVB-I client may fail to discover the service. Accordingly, the device according to embodiments may generate a query in the form of https://www.service-list-registry. com/query?<parameter1>=value1&<parameter2>=value2 and transmit the same to the 5G client. The query may include the following parameters: TargetCountry, regulatorListFlag. Delivery, Language, Genre ProviderName, isLocal,isWAN, Postcode,inReception, wherein these parameters represent characteristics of the client querying for service discovery. In particular, the parameter 'inReception', which may be referred to as reception availability information, indicates a method to query whether the DVB-I client can discover the DVB-I services being received over the 5GBC.

In response to the query, the DVB-I client may receive a service entry point (which may be referred to as a service list entry point or the like) from the 5G media client, as shown in FIG. 45. As shown in FIG. 45, the service offering type information contained in the service entry point according to embodiments may include service entry information. For example, it may include service list URI information and delivery type, and may include 5GBC and 5GMS delivery type information, information indicative of whether a service received via the DVB-I over 5G is accessible.

Regarding a method of configuring a service list URI, the apparatus according to the embodiments may generate a service list URI based on information for access to a 3GPP eMBMS SA channel. When a URI for the SA access channel information is configured, a DVB-I client that receives the same may efficiently access the service instance and receive channels and media quickly, rather than processing service-related information on a module-by-module basis. In this way, the DVB-I client may easily receive a service list entry point including a service list URI.

The 3GPP eMBMS SA channel may be defined to include pre-provisioned DVB-I service identification information and the method for the inclusion may be mapped to a URI by aggregating the identifiers into a string.

The DVB-I client approaches a 5G client receiving the MBMS SA channel and performs a communication to filter the services through the URI string in the service list it has received.

In this way, when filtering the information in the service instance received by MBMS, the DVB-I client may process the identification information about the received SA channel through the URI. This method may be easily used for internal API execution or communication and reduce time and space complexity by managing each data with string and URI instead of storing and managing each data in the terminal inside the receiver.

The embodiments have been described in terms of a method and/or a device. The description of the method and the description of the device may complement each other.

Although embodiments have been described with reference to each of the accompanying drawings for simplicity, it is possible to design new embodiments by merging the embodiments illustrated in the accompanying drawings. If a recording medium readable by a computer, in which programs for executing the embodiments mentioned in the foregoing description are recorded, is designed by those skilled in the art, it may also fall within the scope of the appended claims and their equivalents. The devices and methods may not be limited by the configurations and methods of the embodiments described above. The embodiments described above may be configured by being selectively combined with one another entirely or in part to enable various modifications. Although preferred embodiments have been described with reference to the drawings, those skilled in the art will appreciate that various modifications and variations may be made in the embodiments without departing from the spirit or scope of the disclosure described in the appended claims. Such modifications are not to be understood individually from the technical idea or perspective of the embodiments.

Various elements of the devices of the embodiments may be implemented by hardware, software, firmware, or a combination thereof. Various elements in the embodiments may be implemented by a single chip, for example, a single hardware circuit. According to embodiments, the components according to the embodiments may be implemented as separate chips, respectively. According to embodiments, at least one or more of the components of the device according to the embodiments may include one or more processors capable of executing one or more programs. The one or more programs may perform any one or more of the operations/methods according to the embodiments or include instructions for performing the same. Executable instructions for performing the method/operations of the device according to the embodiments may be stored in a non-transitory CRM or other computer program products configured to be executed by one or more processors, or may be stored in a transitory CRM or other computer program products configured to be executed by one or more processors. In addition, the memory according to the embodiments may be used as a concept covering not only volatile memories (e.g., RAM) but also nonvolatile memories, flash memories, and PROMs. In addition, it may also be implemented in the form of a carrier wave, such as transmission over the Internet. In addition, the processor-readable recording medium may be distributed to computer systems connected over a network such that the processor-readable code may be stored and executed in a distributed fashion.

In this document, the term "/" and "," should be interpreted as indicating "and/or." For instance, the expression "A/B" may mean "A and/or B." Further, "A, B" may mean "A and/or B." Further, "A/B/C" may mean "at least one of A, B, and/or C." "A, B, C" may also mean "at least one of A, B, and/or C." Further, in the document, the term "or" should be interpreted as "and/or." For instance, the expression "A or B" may mean 1) only A. 2) only B. and/or 3) both A and B. In other words, the term "or" in this document should be interpreted as "additionally or alternatively."

Terms such as first and second may be used to describe various elements of the embodiments. However, various components according to the embodiments should not be limited by the above terms. These terms are only used to distinguish one element from another. For example, a first user input signal may be referred to as a second user input signal. Similarly, the second user input signal may be referred to as a first user input signal. Use of these terms should be construed as not departing from the scope of the various embodiments. The first user input signal and the second user input signal are both user input signals, but do not mean the same user input signal unless context clearly dictates otherwise.

The terminology used to describe the embodiments is used for the purpose of describing particular embodiments only and is not intended to be limiting of the embodiments. As used in the description of the embodiments and in the claims, the singular forms "a", "an", and "the" include plural referents unless the context clearly dictates otherwise. The expression "and/or" is used to include all possible combinations of terms. The terms such as "includes" or "has" are intended to indicate existence of figures, numbers, steps, elements, and/or components and should be understood as not precluding possibility of existence of additional existence of figures, numbers, steps, elements, and/or components. As used herein, conditional expressions such as "if" and "when" are not limited to an optional case and are intended to be interpreted, when a specific condition is satisfied, to perform the related operation or interpret the related definition according to the specific condition.

Operations according to the embodiments described in this specification may be performed by a transmission/reception device including a memory and/or a processor according to embodiments. The memory may store programs for processing/controlling the operations according to the embodiments, and the processor may control various operations described in this specification. The processor may be referred to as a controller or the like. In embodiments, operations may be performed by firmware, software, and/or combinations thereof. The firmware, software, and/or combinations thereof may be stored in the processor or the memory.

The operations according to the above-described embodiments may be performed by the transmission device and/or the reception device according to the embodiments. The transmission/reception device may include a transmitter/receiver configured to transmit and receive media data, a memory configured to store instructions (program code, algorithms, flowcharts and/or data) for the processes according to the embodiments, and a processor configured to control the operations of the transmission/reception device.

The processor may be referred to as a controller or the like, and may correspond to, for example, hardware, software, and/or a combination thereof. The operations according to the above-described embodiments may be performed by the processor. In addition, the processor may be implemented as an encoder/decoder for the operations of the above-described embodiments.

Various embodiments have been described in the best mode for carrying out the disclosure.

It will be apparent to those skilled in the art that various changes or modifications can be made to the embodiments within the scope of the embodiments. Thus, it is intended that the embodiments cover the modifications and variations of this disclosure provided they come within the scope of the appended claims and their equivalents.

The invention claimed is:

1. A method by a DVB-I client comprising:
transmitting a request for discovering a service list for a DVB-I service to a service list registry;
receiving an entry point for the service list;
transmitting a query for the service list to a service list server;
receiving the service list; and
obtaining a service list for a 5G broadcast by service discovery with a 5G client based on a query for the 5G client.

2. The method of claim 1,
wherein the service list is used to discover media data for the DVB-I service and to receive the media data based on a communication network,
wherein the service list discovery query contains parameters related to reception of service entries receivable by the DVB-I client for the communication network,
wherein the parameters contain information about a target country, a delivery type, and a network for an entry point of the service list, and information about a location of the DVB-I client, wherein the parameters further contain reception information indicating whether the parameters are receivable from the DVB-I client for the communication network.

3. The method of claim 2, wherein the service entry point contains information allowing for access to a channel of the communication network, wherein the information comprises a uniform resource locator (URL) containing at least one of service area information, frequency information, subcarrier spacing information, or bandwidth information for the client for the communication network, wherein the information further comprises a delivery type, communication network broadcast delivery information, or communication network multicast delivery information.

4. The method of claim 3, wherein the service list comprises a standalone service type for a communication network, wherein the standalone service type for the communication network is a service type supportable by a terminal for the communication network, the standalone service type indicative of supporting service discovery according to a channel for broadcast multicast.

5. A DVB-I client comprising:

a memory; and at least one processor connected to the memory, the at least one processor configured to:

transmit a request for discovering a service list for a DVB-I service to a service list registry;

receive an entry point for the service list;

transmit a query for the service list to a service list server;

receive the service list; and obtain a service list for a 5G broadcast by service discovery with a 5G client based on a query for the 5G client.

* * * * *